(12) United States Patent
Wu et al.

(10) Patent No.: US 12,238,705 B2
(45) Date of Patent: Feb. 25, 2025

(54) METHOD AND DEVICE IN USER EQUIPMENT AND BASE STATION FOR RADIO COMMUNICATIONS

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 547 days.

(21) Appl. No.: 17/406,095

(22) Filed: Aug. 19, 2021

(65) Prior Publication Data

US 2021/0385837 A1 Dec. 9, 2021

Related U.S. Application Data

(63) Continuation of application No. PCT/CN2020/076987, filed on Feb. 27, 2020, and a
(Continued)

(30) Foreign Application Priority Data

Feb. 22, 2019 (CN) .......................... 201910133929.4
Mar. 15, 2019 (CN) .......................... 201910196646.4

(51) Int. Cl.
*H04W 72/1268* (2023.01)
*H04W 72/0446* (2023.01)
(Continued)

(52) U.S. Cl.
CPC .... *H04W 72/1268* (2013.01); *H04W 72/0446* (2013.01); *H04W 72/0453* (2013.01); *H04W 72/21* (2023.01)

(58) Field of Classification Search
CPC ................................................ H04W 72/1268
See application file for complete search history.

(56) References Cited

U.S. PATENT DOCUMENTS 9,807,754 B2 10/2017 Li
2019/0387537 A1* 12/2019 Zhang ................... H04L 1/0026
2020/0120684 A1* 4/2020 Wu ........................ H04L 5/0046

FOREIGN PATENT DOCUMENTS

CN 101938748 A 1/2011
CN 103200684 A 7/2013
(Continued)

OTHER PUBLICATIONS

First Office Action of Chinses patent application No. CN201910133929.4 dated Feb. 7, 2023.
(Continued)

*Primary Examiner* — Abdeltif Ajid

(57) ABSTRACT

The present disclosure provides a method and device in user equipment and base station for radio communications. A first node receives a first signaling and a second signaling; transmits a first radio signal on the first channel. The first signaling and the second signaling respectively comprise first configuration information and second configuration information, and the first configuration information and the second configuration information are respectively for a first channel and a second channel; the first radio signal comprises a first sub-signal and a second sub-signal; a first bit block and a second bit block are respectively used to generate the first sub-signal and the second sub-signal. When control information is carried on an uplink physical-layer data channel, the above method can respectively control transmission reliability of the control information and the uplink physical-layer data channel more flexibly, thus improving transmission efficiency.

18 Claims, 9 Drawing Sheets

Related U.S. Application Data continuation of application No. PCT/CN2020/074323, filed on Feb. 5, 2020.

(51) Int. Cl.
*H04W 72/0453* (2023.01)
*H04W 72/21* (2023.01)

(56) References Cited

FOREIGN PATENT DOCUMENTS

| | | | |
|---|---|---|---|
| CN | 104541561 | A | 4/2015 |
| CN | 109155696 | A | 8/2016 |
| CN | 107733614 | A | 2/2018 |
| CN | 107925473 | A | 4/2018 |
| CN | 108271251 | A | 7/2018 |
| CN | 108604976 | A | 9/2018 |
| CN | 109041227 | A | 12/2018 |
| WO | 2017183002 | A1 | 10/2017 |
| WO | 2018145353 | A1 | 8/2018 |
| WO | WO-2018166188 | A1 * | 9/2018 ........... H04B 7/0617 |
| WO | 2018184295 | A1 | 10/2018 |
| WO | 2019028796 | A1 | 2/2019 |

OTHER PUBLICATIONS

First Search Report of Chinses patent application No. CN201910133929.4 dated Feb. 3, 2023.
Institute for Information Industry (III) Discussion on Configured Grant Enhancements 3GPP TSG RAN WG1 Meeting #95 R1-1813528 Nov. 3, 2018.
ISR received in application No. PCT/CN2020/074323 dated Apr. 26, 2020.
ISR received in application No. PCT/CN2020/076987 dated May 27, 2020.
CN201910196646.4 1st Office Action dated Feb. 26, 2021.
CN201910196646.4 First Search Report dated Feb. 22, 2021.
CN201910196646.4 Notification to Grant Patent Right for Invention dated Jul. 21, 2021.

* cited by examiner

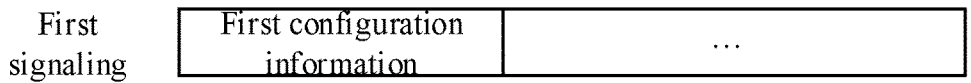
FIG. 6
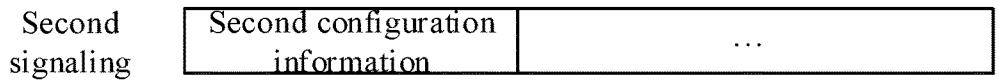
FIG. 7
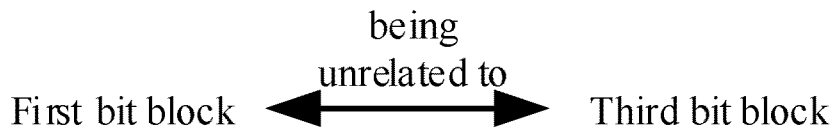
FIG. 8
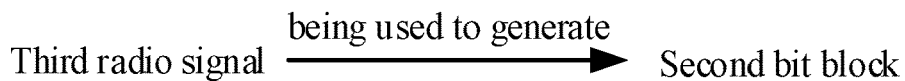
FIG. 9
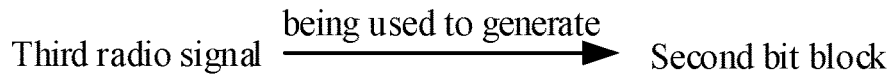
FIG. 10
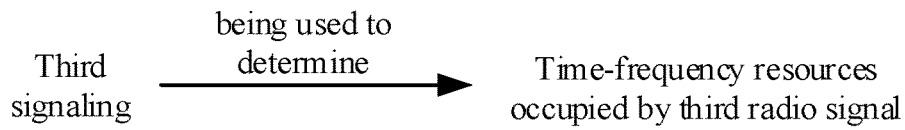
FIG. 11
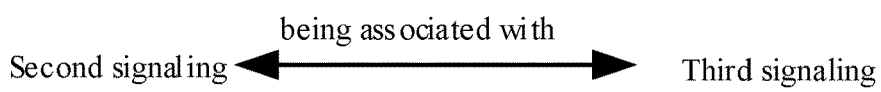
FIG. 12
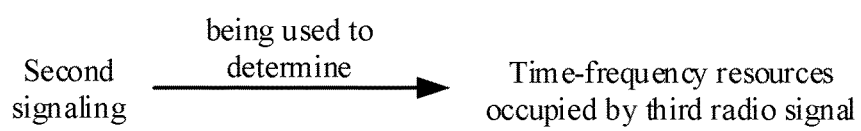
FIG. 13
Number of resource elements occupied by second sub-signal $= \min(\lceil \text{First-type value} \times \text{first offset} \rceil, \text{first limiting value})$
FIG. 14

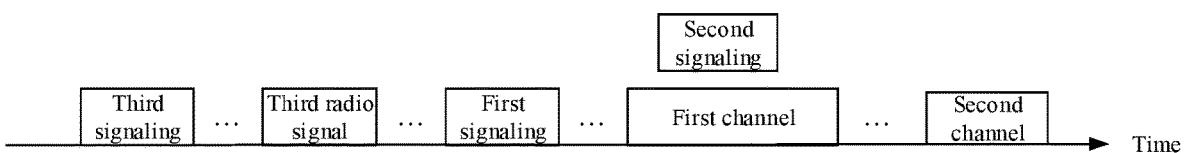
FIG. 15
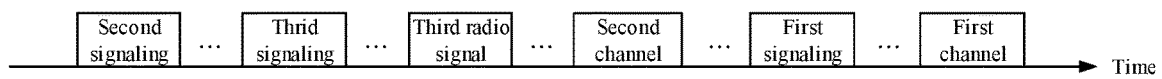
FIG. 16
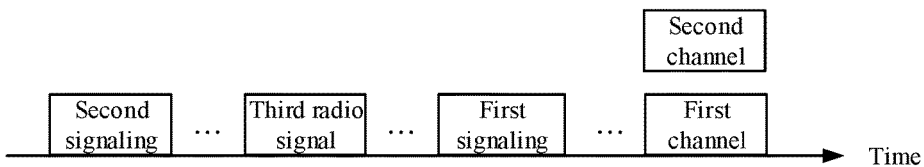
FIG. 17
FIG. 18
FIG. 19
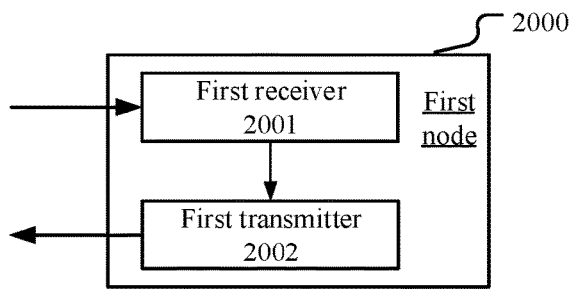
FIG. 20

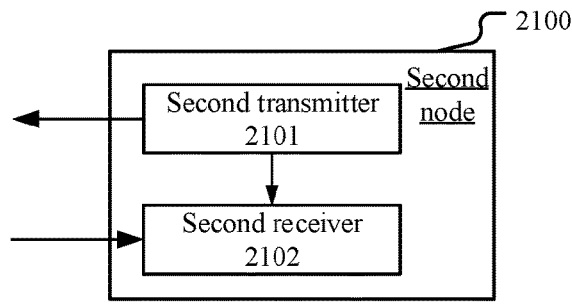
FIG. 21
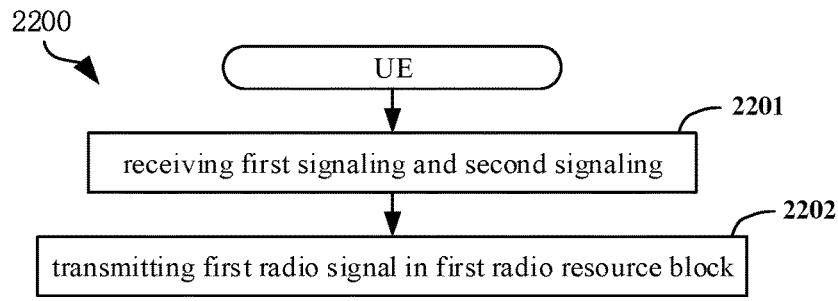
FIG. 22
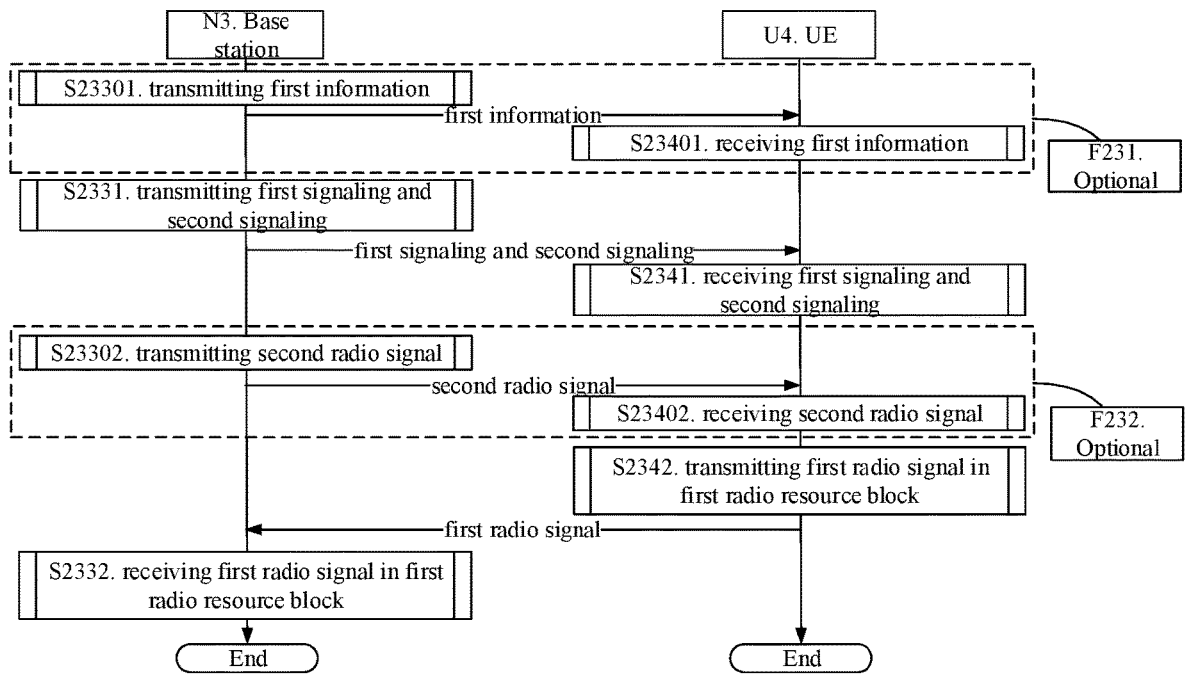
FIG. 23
First signaling $\xrightarrow{\text{being used to determine}}$ { first radio resource block, size of first bit block }
FIG. 24

Second signaling —being used to determine→ { second radio resource block, second bit block }
FIG. 25
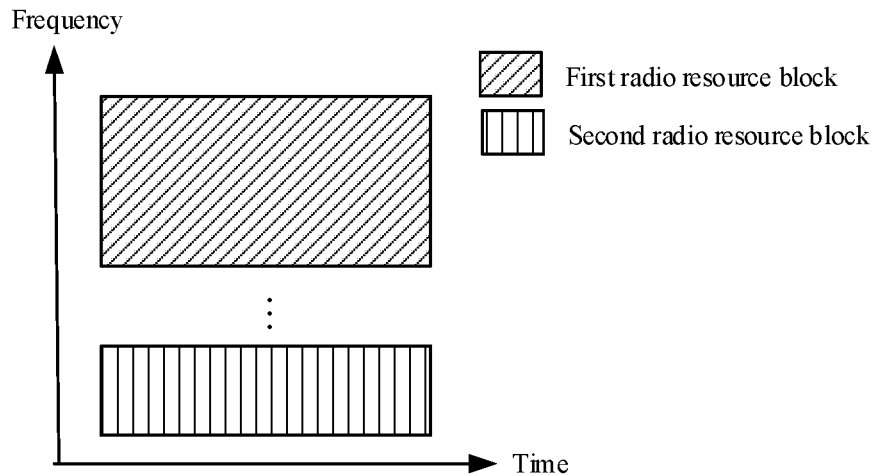
FIG. 26
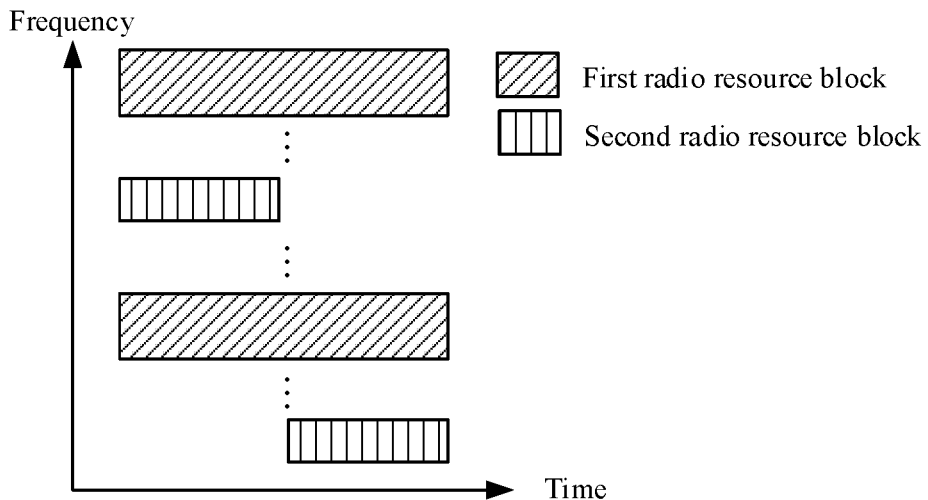
FIG. 27
Target parameter group = {Target scaling coefficient, ... }
First parameter group = {First scaling coefficient, ... }
Second parameter group = {Second scaling coefficient, ... }
FIG. 28

Target parameter group = {Target offset, ... }

First parameter group = {First offset, ... }

Second parameter group = {Second offset, ... }

FIG. 29

Target parameter group = {Target scaling coefficient, target offset, ... }
First parameter group = {First scaling coefficient, first offset, ... }
Second parameter group = {Second scaling coefficient, second offset, ... }

FIG. 30

Number of resource elements occupied by second sub-signal in first radio resource block = min( $\underbrace{\lceil \text{First-type value} \times \text{Number of bits comprised in second bit block} \rceil}_{\text{First value}}$, first limiting value )

FIG. 31

First-type value = Target offset × first-type reference value

FIG. 32

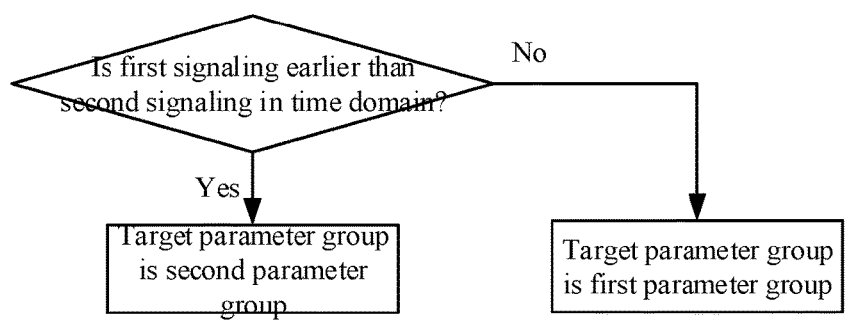

FIG. 33

METHOD AND DEVICE IN USER EQUIPMENT AND BASE STATION FOR RADIO COMMUNICATIONS

CROSS REFERENCE TO RELATED APPLICATIONS

This application is a continuation of International Application No. PCT/CN2020/074323, filed Feb. 5, 2020, which is claims the priority benefit of Chinese Patent Application No. 201910133929.4, filed on Feb. 22, 2019, and a continuation of International Application No. PCT/CN2020/076987, filed Feb. 27, 2020, which is claim the priority benefit of Chinese Patent Application No. 201910196646.4, filed on Mar. 15, 2019, the full disclosure of which is incorporated herein by reference.

BACKGROUND

Technical Field

The present disclosure relates to transmission methods and devices in wireless communication systems, and in particular to a method and device of radio signal transmission in a wireless communication system supporting cellular networks.

Related Art

Compared with conventional 3rd Generation Partner Project (3GPP) Long-term Evolution (LTE) system, 5G system supports more diverse application scenarios, such as enhanced Mobile BroadBand (eMBB), Ultra-Reliable and Low Latency Communications (URLLC), and massive Machine-Type Communications (mMTC). Different application scenarios put forward different requirements for transmission reliability, where the differences can reach several orders of magnitude.

In the conventional LTE system, when uplink control information conflicts with an uplink physical-layer data channel in time domain, the uplink control information can be transmitted on the uplink physical-layer data channel. A base station can ensure transmission reliability of the uplink control information through a number of Resource Elements (REs) occupied by the uplink control information on the uplink physical-layer data channel. In order to meet different reliability requirements of data and control information, in Release 15 (R15), the base station can dynamically adjust a number of REs occupied by each control information bit averagely in the uplink physical-layer data channel in a scheduling signaling.

SUMMARY

The inventors have found through researches that although the number of REs occupied by each control information bit averagely in the uplink physical-layer data channel can be adjusted in the scheduling signaling, when the scheduling signaling overhead is limited, transmission reliability of the control information is still closely related to transmission reliability of the uplink physical-layer data channel. Since the differences of requirements of transmission reliability among different application scenarios can be up to several orders of magnitude, this correlation will result in reduction of control information reliability or in a waste of air-interface resources.

To address the above problem, the present disclosure provides a solution. It should be noted that the embodiments of a first node in the present disclosure and the characteristics of the embodiments may be applied to a second node if no conflict is incurred, and vice versa. And the embodiments in the present disclosure and the characteristics in the embodiments can be arbitrarily combined if there is no conflict.

The inventors have found through researches that delay requirements vary greatly in different application scenarios. This will result in that a scheduling signaling corresponding to the uplink control information appears after a scheduling signaling of the uplink physical-layer data channel, so that the base station cannot consider requirements of the uplink control information in the scheduling signaling of the uplink physical-layer data channel, which will have a negative impact on transmission reliability of the uplink control information, especially the uplink control information for URLLC.

To address the above problem, the present disclosure provides a solution. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

The present disclosure provides a method in a first node for wireless communications, comprising:
  receiving a first signaling and a second signaling, the first signaling and the second signaling respectively comprising first configuration information and second configuration information, and the first configuration information and the second configuration information being respectively for a first channel and a second channel; and
    transmitting a first radio signal on the first channel;
    herein, the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, a problem to be solved in the present disclosure is: how to flexibly and dynamically control the transmission reliability of the uplink control information in the uplink physical layer data channel without increasing signaling overhead. The above method solves the problem by decoupling the transmission reliability of the uplink control information and transmission reliability of the uplink physical-layer data channel carrying the uplink control information, using a reference channel to determine a number of REs occupied by each control information bit averagely in the uplink physical-layer data channel.

In one embodiment, the above method is characterized in that: the second bit block comprises uplink control information, and the first channel is an uplink physical-layer data channel carrying uplink control information comprised in the second bit block; a number of REs occupied by each bit of the second bit block averagely on the first channel is not determined by the first configuration information, but by another channel, that is, the second configuration information.

In one embodiment, the above method is advantageous in that it lifts the restriction of transmission reliability of the uplink physical-layer data channel carrying the uplink control information on transmission reliability of uplink control information, and uses another channel that better matches the transmission reliability of the uplink control information to determine a number of REs occupied by each uplink control information bit averagely in the uplink physical layer data channel, which can respectively control the transmission reliability of the uplink control information and the uplink physical-layer data channel more flexibly.

According to one aspect of the present disclosure, comprising:

dropping transmitting a radio signal on the second channel.

According to one aspect of the present disclosure, comprising:

transmitting a second radio signal on the second channel;

herein, a third bit block is used to generate the second radio signal, and the third bit block is unrelated to the first bit block.

According to one aspect of the present disclosure, comprising:

receiving a third radio signal;

herein, the third radio signal is used to generate the second bit block.

According to one aspect of the present disclosure, comprising:

receiving a third signaling;

herein, the third signaling is used to determine time-frequency resources occupied by the third radio signal.

According to one aspect of the present disclosure, wherein the second signaling is associated with the third signaling.

According to one aspect of the present disclosure, wherein the second signaling is used to determine time-frequency resources occupied by the third radio signal.

According to one aspect of the present disclosure, wherein a first-type value and a first offset are used to determine a number of REs occupied by the second sub-signal; the first-type value is related to the second configuration information.

According to one aspect of the present disclosure, wherein the first node is a UE.

According to one aspect of the present disclosure, wherein the first node is a relay node.

The present disclosure provides a method in a second node for wireless communications, comprising:

transmitting a first signaling and a second signaling, the first signaling and the second signaling respectively comprising first configuration information and second configuration information, and the first configuration information and the second configuration information being respectively for a first channel and a second channel; and receiving a first radio signal on the first channel;

herein, the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

According to one aspect of the present disclosure, comprising:

dropping receiving a radio signal on the second channel.

According to one aspect of the present disclosure, comprising:

receiving a second radio signal on the second channel;

herein, a third bit block is used to generate the second radio signal, and the third bit block is unrelated to the first bit block.

According to one aspect of the present disclosure, comprising:

transmitting a third radio signal;

herein, the third radio signal is used to generate the second bit block.

According to one aspect of the present disclosure, comprising:

transmitting a third signaling;

herein, the third signaling is used to determine time-frequency resources occupied by the third radio signal.

According to one aspect of the present disclosure, wherein the second signaling is associated with the third signaling.

According to one aspect of the present disclosure, wherein the second signaling is used to determine time-frequency resources occupied by the third radio signal.

According to one aspect of the present disclosure, wherein a first-type value and a first offset are used to determine a number of REs occupied by the second sub-signal; the first-type value is related to the second configuration information.

According to one aspect of the present disclosure, wherein the second node is a base station.

According to one aspect of the present disclosure, wherein the second node is a relay node.

The present disclosure provides a first node for wireless communications, comprising:

a first receiver, receiving a first signaling and a second signaling, the first signaling and the second signaling respectively comprising first configuration information and second configuration information, and the first configuration information and the second configuration information being respectively for a first channel and a second channel; and a first transmitter, transmitting a first radio signal on the first channel;

herein, the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

The present disclosure provides a second node for wireless communications, comprising:

a second transmitter, transmitting a first signaling and a second signaling, the first signaling and the second signaling respectively comprising first configuration information and second configuration information, and the first configuration information and the second configuration information being respectively for a first channel and a second channel; and a second receiver, receiving a first radio signal on the first channel;

herein, the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

The present disclosure provides a method in a UE for wireless communications, comprising:

receiving a first signaling and a second signaling; and transmitting a first radio signal in a first radio resource block;

herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, a problem to be solved in the present disclosure is: when the uplink control information conflicts with the uplink physical-layer data channel in time domain and a scheduling signaling corresponding to the uplink control information appears after a scheduling signaling corresponding to the uplink physical-layer data channel, how to reliably transmit the uplink control information. The present disclosure solves the problem by adjusting a number of REs occupied by the uplink control information in the uplink physical-layer data channel according to a timing relation between the uplink control information and a scheduling signaling of the uplink physical-layer data channel.

In one embodiment, characteristics of the above method include: the first sub-signal carries uplink data, the second sub-signal carries uplink control information, the first radio resource block is radio resources allocated to an uplink physical layer data channel, and the first signaling and the second signaling are respectively scheduling signalings corresponding to the uplink physical-layer data channel and the uplink control information. Whether to adopt the first parameter group indicated by the first signaling to determine a number of REs occupied by the second sub-signal in the first radio resource block is related to a timing relation between the first signaling and the second signaling.

In one embodiment, advantages of the above method include: it avoids transmission quality degradation of the second bit block caused by that the base station does not take demands of the second bit block into account when transmitting the first signaling.

According to one aspect of the present disclosure, wherein the target parameter group comprises a target scaling coefficient; a number of REs occupied by the second sub-signal in the first radio resource block is not greater than a product of a number of REs comprised in the first radio resource block and the target scaling coefficient.

According to one aspect of the present disclosure, wherein the target parameter group comprises a target offset; a first-type value is used to determine a number of REs occupied by the second sub-signal in the first radio resource block, and the first-type value is related to the target offset.

According to one aspect of the present disclosure, wherein when the first signaling is not earlier than the second signaling in time domain, the target parameter group is the first parameter group.

According to one aspect of the present disclosure, wherein when the first signaling is earlier than the second signaling in time domain, the target parameter group is the second parameter group.

According to one aspect of the present disclosure, wherein when the first signaling is earlier than the second signaling in time domain, only the first signaling in the first signaling and the second signaling is used to determine the target parameter group out of the first parameter group and the second parameter group.

According to one aspect of the present disclosure, wherein when the first signaling is earlier than the second signaling in time domain, only the second signaling in the first signaling and the second signaling is used to determine the target parameter group out of the first parameter group and the second parameter group.

According to one aspect of the present disclosure, wherein when the first signaling is earlier than the second signaling in time domain, the first signaling and the second signaling are used to determine the target parameter group out of the first parameter group and the second parameter group.

According to one aspect of the present disclosure, wherein the first signaling is used to determine the second parameter group.

According to one aspect of the present disclosure, wherein the second parameter group is unrelated to the first signaling.

According to one aspect of the present disclosure, comprising:

receiving a second radio signal;

herein, the second signaling is used to determine time-frequency resources occupied by the second radio signal, and the second radio signal is used to generate the second bit block.

According to one aspect of the present disclosure, comprising:

receiving first information;

herein, the first information is used to determine K parameter groups, K being a positive integer greater than 1; the first parameter group is one of the K parameter groups; the first signaling indicates the first parameter group out of the K parameter groups.

The present disclosure provides a method in a base station for wireless communications, comprising:

transmitting a first signaling and a second signaling; and receiving a first radio signal in a first radio resource block;

herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

According to one aspect of the present disclosure, wherein the target parameter group comprises a target scaling coefficient; a number of REs occupied by the second sub-signal in the first radio resource block is not greater than a product of a number of REs comprised in the first radio resource block and the target scaling coefficient.

According to one aspect of the present disclosure, wherein the target parameter group comprises a target offset; a first-type value is used to determine a number of REs occupied by the second sub-signal in the first radio resource block, and the first-type value is related to the target offset.

According to one aspect of the present disclosure, wherein when the first signaling is not earlier than the second signaling in time domain, the target parameter group is the first parameter group.

According to one aspect of the present disclosure, wherein when the first signaling is earlier than the second signaling in time domain, the target parameter group is the second parameter group.

According to one aspect of the present disclosure, wherein when the first signaling is earlier than the second signaling in time domain, only the first signaling in the first signaling and the second signaling is used to determine the target parameter group out of the first parameter group and the second parameter group.

According to one aspect of the present disclosure, wherein when the first signaling is earlier than the second signaling in time domain, only the second signaling in the first signaling and the second signaling is used to determine the target parameter group out of the first parameter group and the second parameter group.

According to one aspect of the present disclosure, wherein when the first signaling is earlier than the second signaling in time domain, the first signaling and the second signaling are used to determine the target parameter group out of the first parameter group and the second parameter group.

According to one aspect of the present disclosure, wherein the first signaling is used to determine the second parameter group.

According to one aspect of the present disclosure, wherein the second parameter group is unrelated to the first signaling.

According to one aspect of the present disclosure, comprising:

transmitting a second radio signal;

herein, the second signaling is used to determine time-frequency resources occupied by the second radio signal, and the second radio signal is used to generate the second bit block.

According to one aspect of the present disclosure, comprising:

transmitting first information; and herein, the first information is used to determine K parameter groups, K being a positive integer greater than 1; the first parameter group is one of the K parameter groups; the first signaling indicates the first parameter group out of the K parameter groups.

The present disclosure provides a UE for wireless communications, comprising:

a first receiver, receiving a first signaling and a second signaling; and a first transmitter, transmitting a first radio signal in a first radio resource block;

herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

The present disclosure provides a base station for wireless communications, comprising:

a second transmitter, transmitting a first signaling and a second signaling; and a second receiver, receiving a first radio signal in a first radio resource block;

herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the present disclosure has the following advantages over conventional schemes:

it avoids the restriction of transmission reliability of a uplink physical-layer data channel on transmission reliability of uplink control information when the uplink control information is carried on the uplink physical-layer data channel.

it respectively controls transmission reliability of uplink control information and uplink physical-layer data channel more flexibly, thus improving transmission efficiency.

In one embodiment, the present disclosure has the following advantages over conventional schemes:

when uplink control information conflicts with an uplink physical-layer data channel in time domain, transmission quality degradation of the uplink control information caused by the inability to consider the demands of the uplink control information in a scheduling signaling corresponding to the uplink physical-layer data channel is avoided, thus ensuring transmission reliability of the uplink control information.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first signaling comprising first configuration information according to one embodiment of the present disclosure;

FIG. 7 illustrates a schematic diagram of a second signaling comprising second configuration information according to one embodiment of the present disclosure;

FIG. 8 illustrates a schematic diagram of a third bit block being unrelated to a first bit block according to one embodiment of the present disclosure;

FIG. 9 illustrates a schematic diagram of a third radio signal being used to generate a second bit block according to one embodiment of the present disclosure;

FIG. 10 illustrates a schematic diagram of a third radio signal being used to generate a second bit block according to one embodiment of the present disclosure;

FIG. 11 illustrates a schematic diagram of a third signaling being used to determine time-frequency resources occupied by a third radio signal according to one embodiment of the present disclosure;

FIG. 12 illustrates a schematic diagram of a second signaling being associated with a third signaling according to one embodiment of the present disclosure;

FIG. 13 illustrates a schematic diagram of a second signaling being used to determine time-frequency resources occupied by a third radio signal according to one embodiment of the present disclosure;

FIG. 14 illustrates a schematic diagram of a first-type value and a first offset being used to determine a number of REs occupied by a second sub-signal according to one embodiment of the present disclosure;

FIG. 15 illustrates a schematic diagram of a first-type value and a first offset being used to determine a number of REs occupied by a second sub-signal according to one embodiment of the present disclosure;

FIG. 16 illustrates a schematic diagram of a first-type value according to one embodiment of the present disclosure;

FIG. 17 illustrates a schematic diagram of a timing relation among a first signaling, a second signaling, a third signaling, a first channel, a second channel and a third radio signal according to one embodiment of the present disclosure;

FIG. 18 illustrates a schematic diagram of a timing relation among a first signaling, a second signaling, a third signaling, a first channel, a second channel and a third radio signal according to one embodiment of the present disclosure;

FIG. 19 illustrates a schematic diagram of a timing relation among a first signaling, a second signaling, a first channel, a second channel and a third radio signal according to one embodiment of the present disclosure;

FIG. 20 illustrates a structural block diagram of a processing device in a first node according to one embodiment of the present disclosure;

FIG. 21 illustrates a structural block diagram of a processing device in a second node according to one embodiment of the present disclosure;

FIG. 22 illustrates a flowchart of a first signaling, a second signaling and a first radio signal according to one embodiment of the present disclosure;

FIG. 23 illustrates a flowchart of transmission according to one embodiment of the present disclosure;

FIG. 24 illustrates a schematic diagram of a first signaling being used to determine a first radio resource block and a size of a first bit block according to one embodiment of the present disclosure;

FIG. 25 illustrates a schematic diagram of a second signaling being used to determine a second radio resource block and a second bit block according to one embodiment of the present disclosure;

FIG. 26 illustrates a schematic diagram of a resource mapping of a first radio resource block and a second radio resource block in time-frequency domain according to one embodiment of the present disclosure;

FIG. 27 illustrates a schematic diagram of a resource mapping of a first radio resource block and a second radio resource block in time-frequency domain according to one embodiment of the present disclosure;

FIG. 28 illustrates a schematic diagram of a target parameter group comprising a target scaling coefficient according to one embodiment of the present disclosure;

FIG. 29 illustrates a schematic diagram of a target parameter group comprising a target offset according to one embodiment of the present disclosure;

FIG. 30 illustrates a schematic diagram of a target parameter group comprising a target scaling coefficient and a target offset according to one embodiment of the present disclosure;

FIG. 31 illustrates a schematic diagram of a first-type value being used to determine a number of REs occupied by a second sub-signal in a first radio resource block according to one embodiment of the present disclosure;

FIG. 32 illustrates a schematic diagram of a relation between a first-type value and a target offset according to one embodiment of the present disclosure;

FIG. 33 illustrates a schematic diagram of a timing relation between the first signaling and the second signaling being used to determine the target parameter group according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
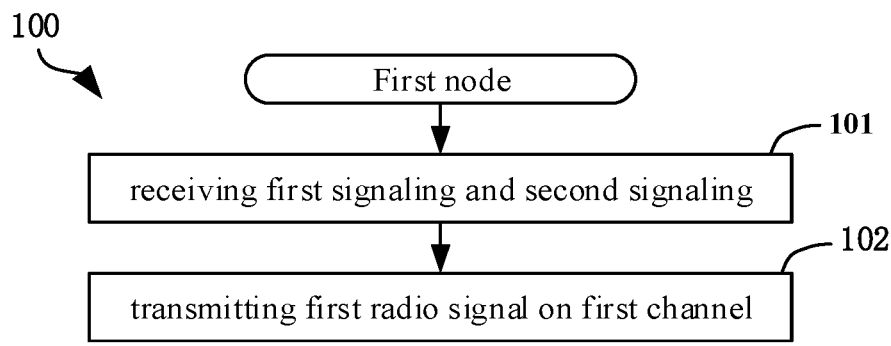
FIG. 1 illustrates a flowchart of a first signaling, a second signaling and a first radio signal according to one embodiment of the present disclosure.

Embodiment 1 illustrates a flowchart of a first signaling, a second signaling and a first radio signal according to one embodiment of the present disclosure, as shown in FIG. 1. In step 100 illustrated by FIG. 1, each box represents a step. In particular, the order of steps in boxes does not represent chronological order of characteristics between the steps.

In Embodiment 1, the first node in the present disclosure receives a first signaling and a second signaling in step 101; and transmits a first radio signal on a first channel in step 102. Herein, the first signaling and the second signaling respectively comprise first configuration information and second configuration information, and the first configuration information and the second configuration information are respectively for the first channel and a second channel; and the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the first signaling is a physical-layer signaling.

In one embodiment, the first signaling is a dynamic signaling.

In one embodiment, the first signaling comprises scheduling information of the first sub-signal.

In one embodiment, the second signaling is a physical-layer signaling.

In one embodiment, the second signaling is a dynamic signaling.

In one embodiment, the second signaling is a higher-layer signaling.

In one embodiment, the second signaling indicates the first configuration information.

In one embodiment, the second signaling indicates the second configuration information.

In one embodiment, the first bit block being used to generate the first sub-signal includes: the first sub-signal is an output obtained after bits in the first bit block sequentially through Channel Coding, Rate Matching, a Modulation Mapper, a Layer Mapper, a transform precoder, Precoding, a Resource Element Mapper, Generation and Modulation and Upconversion.

In one embodiment, the first bit block being used to generate the first sub-signal includes: the first sub-signal is an output obtained after bits in the first bit block sequentially through Channel Coding, Rate Matching, a Modulation Mapper, a Layer Mapper, Precoding, a Resource Element Mapper, Generation of multicarrier symbol, and Modulation and Upconversion.

In one embodiment, the first sub-signal is unrelated to the second bit block.

In one embodiment, the second bit block being used to generate the second sub-signal includes: the second sub-signal is an output obtained after bits in the second bit block sequentially through Channel Coding, Rate Matching, a Modulation Mapper, a Layer Mapper, a transform precoder, Precoding, a Resource Element Mapper, Generation of multicarrier symbol, and Modulation and Upconversion.

In one embodiment, the second bit block being used to generate the second sub-signal includes: the second sub-signal is an output obtained after bits in the second bit block sequentially through Channel Coding, Rate Matching, a Modulation Mapper, a Layer Mapper, Precoding, a Resource Element Mapper, Generation of multicarrier symbol, and Modulation and Upconversion.

In one embodiment, the second sub-signal is unrelated to the first bit block.

In one embodiment, all REs allocated to the first channel are reserved for the first bit block.

In one embodiment, all REs allocated to the first channel are reserved for a radio signal generated by the first bit block.

In one embodiment, part of REs allocated to the first channel are reserved for the first bit block; and another part of REs allocated to the first channel are reserved for the second bit block.

In one embodiment, part of REs allocated to the first channel are reserved for a radio signal generated by the first bit block; another part of REs allocated to the first channel are reserved for a radio signal generated by the second bit block.

In one embodiment, the second sub-signal only occupies REs reserved for the second bit block.

In one embodiment, the second sub-signal occupies part of REs reserved for the first bit block.

In one embodiment, all REs occupied by the second sub-signal are reserved for the first bit block.

In one embodiment, part of REs occupied by the second sub-signal are reserved for the second bit block, and another part of REs occupied by the second sub-signal are reserved for the first bit block.

In one embodiment, the first sub-signal only occupies REs reserved for the first bit block.

In one embodiment, the first configuration information and the second configuration information being respectively for the first channel and a second channel includes: the first configuration information and the second configuration information are respectively applied to the first channel and the second channel.

In one embodiment, the first configuration information and the second configuration information being respectively for the first channel and a second channel includes: the first configuration information and the second configuration information are respectively configuration information of the first channel and configuration information of the second channel.

In one embodiment, the first configuration information is only for the first channel in the first channel and the second channel.

In one embodiment, the first configuration information is only applied to the first channel in the first channel and the second channel.

In one embodiment, the second configuration information is only for the second channel in the first channel and the second channel.

In one embodiment, the second configuration information is only applied to the second channel in the first channel and the second channel.

In one embodiment, the first bit block comprises at least one bit.

In one embodiment, the first bit block comprises physical layer uplink data.

In one embodiment, the first bit block comprises one Transport Block (TB).

In one embodiment, the first bit block comprises at least one TB.

In one embodiment, the first bit block comprises a first information bit block and a first check bit block, the first check bit block is generated by a Cyclic Redundancy Check (CRC) bit block of the first information bit block.

In one subembodiment of the above embodiment, the first check bit block is a CRC bit block of the first information bit block.

In one subembodiment of the above embodiment, the first check bit block is a bit block after a CRC bit block of the first information bit block is scrambled.

In one embodiment, the first bit block comprises S1 first bit sub-blocks, S1 being a positive integer greater than 1; any given first bit sub-block in the S1 first bit sub-blocks comprises a given first information bit sub-block and a given first check bit sub-block, and the given first check bit sub-block is generated by a CRC bit block of the given first information bit sub-block.

In one embodiment, the number of REs occupied by each bit in the first bit block includes a ratio of a number of REs occupied by the first sub-signal to a number of bits comprised in the first bit block.

In one embodiment, the number of REs occupied by each bit in the first bit block includes a spectral efficiency of the first sub-signal.

In one embodiment, the number of REs occupied by each bit in the first bit block includes a spectral efficiency corresponding to a Modulation and Coding Scheme (MCS) configured for the first sub-signal.

In one embodiment, the number of REs occupied by each bit in the first bit block includes a spectral efficiency corresponding to an MCS index configured for the first sub-signal.

In one embodiment, the specific meaning of the spectral efficiency corresponding to the MCS can be found in Table 5.1.3.1-1, Table 5.1.3.1-2 and Table 5.1.3.1-3 in 3GPP TS38.214 (V15.3.0).

In one embodiment, the specific meaning of the spectral efficiency corresponding to the MCS index can be found in Table 5.1.3.1-1, Table 5.1.3.1-2 and Table 5.1.3.1-3 in 3GPP TS38.214 (V15.3.0).

In one embodiment, the number of REs occupied by each bit in the first bit block averagely includes a ratio of a number of REs allocated to the first channel to a number of bits comprised in the first bit block.

In one embodiment, the number of REs occupied by each bit in the first bit block averagely includes a ratio of a number of REs reserved for the first bit block in the first channel to a number of bits comprised in the first bit block.

In one embodiment, the first sub-signal only occupies REs allocated to the first channel.

In one embodiment, a number of REs occupied by each bit in the first bit block averagely is a positive real number.

In one embodiment, the second bit block comprises at least one bit.

In one embodiment, the second bit block carries Uplink Control Information (UCI).

In one embodiment, the second bit block carries Hybrid Automatic Repeat reQuest-Acknowledgement (HARQ-ACK).

In one embodiment, the second bit block carries a Scheduling Request (SR).

In one embodiment, the second bit block carries a Channel-state information reference signals Resource Indicator (CRI).

In one embodiment, the second bit block carries Channel State Information (CSI).

In one embodiment, the CSI comprises one or more of a CRI, a Precoding Matrix Indicator (PMI), a Reference Signal Received Power (RSRP), a Reference Signal Received Quality (RSRQ) and a Channel Quality Indicator (CQI).

In one embodiment, the second bit block comprises a second information bit block and a second check bit block, and the second check bit block is generated by a CRC bit block of the second information bit block.

In one subembodiment of the above embodiment, the second check bit block is a CRC bit block of the second information bit block.

In one subembodiment of the above embodiment, the second check bit block is a bit block obtained after a CRC bit block of the second information bit block is scrambled.

In one embodiment, the second bit block comprises S2 second bit sub-blocks, S2 being a positive integer greater than 1; for a given second bit sub-block in the S2 second bit sub-blocks, the given second bit sub-block comprises a given information bit sub-block and a given check bit sub-block, and the given check bit sub-block is generated by a CRC bit block of the given information bit sub-block.

In one subembodiment of the above embodiment, the given second bit sub-block is any of the S2 second bit sub-blocks.

In one embodiment, the number of REs occupied by each bit in the second bit block averagely includes a ratio of a number of REs occupied by the second sub-signal to a number of bits comprised in the second bit block.

In one embodiment, the number of REs occupied by each bit in the second bit block averagely includes a spectral efficiency of the second sub-signal.

In one embodiment, the number of REs occupied by each bit in the second bit block averagely includes a ratio of a number of REs reserved for the second bit block in the first channel to a number of bits comprised in the second bit block.

In one embodiment, the second sub-signal only occupies REs allocated to the first channel.

In one embodiment, a number of REs occupied by each bit in the second bit block averagely is a positive real number.

In one embodiment, the RE is a Resource Element (RE).

In one embodiment, the RE occupies a multicarrier symbol in time domain, and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, a number of REs occupied by each bit in the second bit block averagely is unrelated to the first configuration information.

In one embodiment, a number of REs occupied by each bit in the second bit block averagely is related to the first configuration information.

In one subembodiment of the above embodiment, the first configuration information is used to determine a maximum value of a number of REs occupied by each bit in the second bit block averagely.

In one subembodiment of the above embodiment, the first configuration information is used to determine a maximum value of a number of REs occupied by the second sub-signal.

In one embodiment, a number of REs occupied by the second sub-signal is related to the second configuration information.

In one embodiment, the second configuration information is used to determine a number of REs occupied by the second sub-signal.

In one embodiment, the second configuration information and a number of bits comprised in the second bit block are used together to determine a number of REs occupied by the second sub-signal.

In one embodiment, a number of bits comprised in the second bit block is unrelated to the second configuration information.

In one embodiment, a number of bits comprised in the second bit block is unrelated to the first configuration information.

In one embodiment, a number of bits comprised in the second bit block is related to the second configuration information.

In one embodiment, a number of REs occupied by the second sub-signal is unrelated to the first configuration information.

In one embodiment, a number of REs occupied by the second sub-signal is related to the first configuration information.

In one subembodiment of the above embodiment, the first configuration information is used to determine a maximum value of a number of REs occupied by the second sub-signal.

In one embodiment, a number of REs occupied by each bit in the first bit block averagely is unrelated to the second configuration information.

In one embodiment, a number of REs occupied by each bit in the first bit block averagely is related to the second configuration information.

In one embodiment, a number of REs occupied by the first sub-signal is related to the first configuration information.

In one embodiment, the first configuration information is used to determine a number of REs occupied by the first sub-signal.

In one embodiment, a number of bits comprised in the first bit block is related to the first configuration information.

In one embodiment, the first configuration information is used to determine a number of bits comprised in the first bit block bit.

In one embodiment, the first configuration information is used to determine a TB size (TBS) of each TB comprised in the first bit block.

In one embodiment, a number of REs allocated to the first channel and an MCS allocated to the first channel are used to determine to a TBS of each TB comprised in the first bit block.

In one embodiment, a number of REs allocated to the first channel and not allocated to a DMRS and an MCS allocated to the first channel are used to determine to a TBS of each TB comprised in the first bit block.

In one embodiment, a number of REs occupied by the first sub-signal is unrelated to the second configuration information.

In one embodiment, a number of REs occupied by the first sub-signal is related to the second configuration information.

In one embodiment, the first configuration information and the second configuration information are used together to determine a number of REs occupied by the first sub-signal.

In one embodiment, the second configuration information is used to determine a number of REs occupied by the second sub-signal, and a number of REs occupied by the first sub-signal is a difference between a number of REs allocated to the first channel and a number of REs occupied by the second sub-signal.

In one embodiment, the second configuration information is used to determine a number of REs occupied by the second sub-signal, and a number of REs occupied by the first sub-signal is a difference between a number of REs allocated to the first channel but not allocated to a reference signal and a number of REs occupied by the second sub-signal.

In one embodiment, a number of bits comprised in the first bit block is unrelated to the second configuration information.

In one embodiment, the number of REs occupied by each bit in the first bit block averagely being related to the first configuration information includes: the first configuration information is used to determine a number of REs occupied by each bit in the first bit block averagely.

In one embodiment, the number of REs occupied by each bit in the first bit block averagely being related to the first configuration information includes: the first configuration information is used to determine a ratio of a number of REs occupied by the first sub-signal to a number of bits comprised in the first bit block.

In one embodiment, the number of REs occupied by each bit in the first bit block averagely being related to the first configuration information includes: the first configuration information is used to determine a number of bits comprised in the first bit block and a number of REs occupied by the first sub-signal.

In one embodiment, the number of REs occupied by each bit in the first bit block averagely being related to the first configuration information includes: the first configuration information is used to determine a number of bits comprised in the first bit block bit.

In one embodiment, the number of REs occupied by each bit in the first bit block averagely being related to the first configuration information includes: an MCS configured to the first channel and a number of REs configured to the first channel are used to determine a number of bits comprised in the first bit block.

In one embodiment, the number of REs occupied by each bit in the first bit block averagely being related to the first configuration information includes: the first configuration information is used to determine a number of REs occupied by the first sub-signal.

In one embodiment, the number of REs occupied by each bit in the first bit block averagely being related to the first configuration information includes: the first configuration information is used to determine a number of REs allocated to the first channel.

In one embodiment, the number of REs occupied by each bit in the first bit block averagely being related to the first configuration information includes: the first configuration information is used to determine a number of REs allocated to the first channel and not allocated to a reference signal.

In one embodiment, the number of REs occupied by each bit in the first bit block averagely being related to the first configuration information includes: the first configuration information is used to determine a number of REs reserved for the first sub-signal in the first channel.

In one embodiment, the number of REs occupied by each bit in the first bit block averagely being related to the first configuration information includes: the first configuration information is used to determine an MCS corresponding to the first sub-signal.

In one embodiment, the number of REs occupied by each bit in the first bit block averagely being related to the first configuration information includes: an MCS corresponding to the first sub-signal is an MCS configured to the first channel.

In one embodiment, the first configuration information and the second configuration information are used together to determine a number of REs occupied by each bit in the first bit block averagely.

In one embodiment, the first configuration information is used to determine a number of bits comprised in the first bit block, and the first configuration information and the second configuration information are used to determine a number of REs occupied by the first sub-signal.

In one embodiment, the number of REs occupied by each bit in the second bit block averagely being related to the second configuration information includes: the second configuration information is used to determine a number of REs occupied by each bit in the second bit block averagely.

In one embodiment, the number of REs occupied by each bit in the second bit block averagely being related to the second configuration information includes: the second configuration information is used to determine a ratio of a number of REs occupied by the second sub-signal to a number of bits comprised in the second bit block.

In one embodiment, the number of REs occupied by each bit in the second bit block averagely being related to the second configuration information includes: the second configuration information is used to determine a number of REs occupied by the second sub-signal.

In one embodiment, the number of REs occupied by each bit in the second bit block averagely being related to the second configuration information includes: the second configuration information is used to determine a number of REs reserved for the second sub-signal in the first channel.

In one embodiment, the number of REs occupied by each bit in the second bit block averagely being related to the second configuration information includes: the second configuration information is used to determine a code rate of a channel coding corresponding to the second sub-signal.

In one embodiment, the number of REs occupied by each bit in the second bit block averagely being related to the second configuration information includes: the second configuration information is used to determine a length of an output bit block of a rate matching corresponding to the second sub-signal.

In one embodiment, a number of bits comprised in the second bit block and the second configuration information are used to determine a length of an output bit block of a rate matching corresponding to the second sub-signal.

In one embodiment, the first channel is a physical-layer channel.

In one embodiment, the first channel is an uplink physical-layer data channel (i.e., an uplink channel capable of bearing a physical layer data).

In one embodiment, the first channel is a Physical Uplink Shared CHannel (PUSCH).

In one subembodiment, the first channel is a short PUSCH (sPUSCH).

In one subembodiment, the first channel is a New Radio PUSCH (NR-PUSCH).

In one embodiment, the first channel is an uplink physical-layer data channel carrying UCI.

In one embodiment, the first channel is a PUSCH carrying UCI.

In one embodiment, the first channel is an sPUSCH carrying UCI.

In one embodiment, the first channel is a PUSCH based on UL scheduling.

In one embodiment, the first channel is a PUSCH based on configured grant.

In one embodiment, the second channel is a physical-layer channel.

In one embodiment, the second channel is an uplink physical-layer data channel (i.e., an uplink channel capable of bearing a physical-layer data).

In one embodiment, the second channel is a PUSCH.

In one embodiment, the second channel is an sPUSCH.

In one embodiment, the second channel is an NR-PUSCH.

In one embodiment, the second channel is a PUSCH based on UL scheduling.

In one embodiment, the second channel is a PUSCH based on configured grant.

In one embodiment, the second channel is an uplink physical-layer control channel (i.e., an uplink channel only capable of bearing a physical-layer signaling).

In one embodiment, the second channel is a PUCCH.

In one embodiment, the second channel is an sPUCCH.

In one embodiment, the second channel is an NR-PUCCH.

In one embodiment, the first channel is an uplink physical-layer data channel, and the second channel is an uplink physical-layer data channel.

In one embodiment, the first channel is an uplink physical-layer data channel, and the second channel is an uplink physical-layer control channel.

In one embodiment, the first channel is a PUSCH, and the second channel is a PUSCH.

In one embodiment, the first channel is a PUSCH, and the second channel is a PUCCH.

In one embodiment, a first radio resource block is reserved for the second bit block, time-domain resources occupied by the first radio resource block are not orthogonal to time-domain resources occupied by the first channel, and the first radio resource block is a PUCCH resource.

In one embodiment of the above embodiment, time-domain resources occupied by the first radio resource are completely overlapped with time-domain resources occupied by the first channel.

In one embodiment of the above embodiment, time-domain resources occupied by the first radio resource are partially overlapped with time-domain resources occupied by the first channel.

In one embodiment, the first channel and the second channel belong to a same carrier in frequency domain.

In one embodiment, the first channel and the second channel belong to a same Bandwidth Part (BWP) in frequency domain.

In one embodiment, the first channel and the second channel belong to different carriers in frequency domain.

In one embodiment, the first channel and the second channel belong to different BWPs in a same carrier infrequency domain.

Embodiment 2

Figure 2:
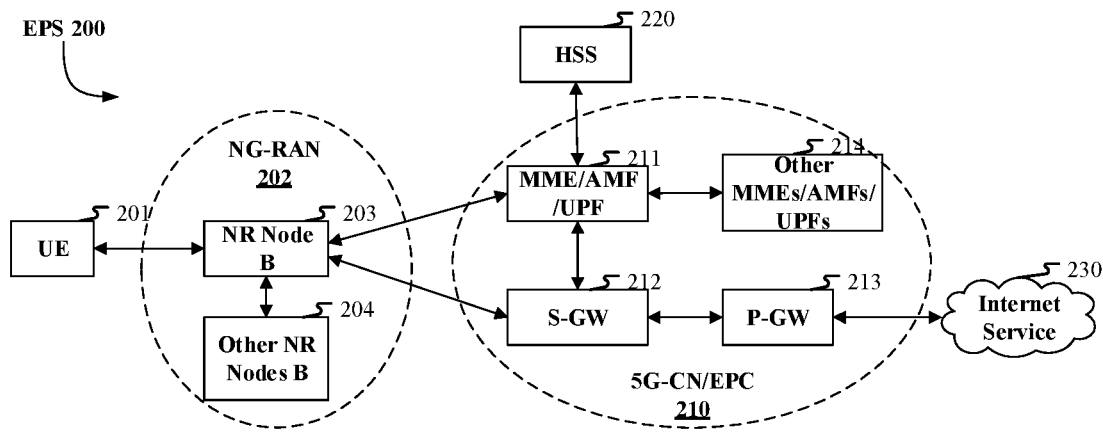
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The EPS 200 may comprise one or more UEs 201, an NG-RAN 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201—oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MM4E)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services.

In one embodiment, the second node in the present disclosure comprises the gNB 203.

In one embodiment, the first node in the present disclosure comprises the UE 201.

In one embodiment, the UE in the present disclosure comprises the UE 201.

In one embodiment, the base station in the present disclosure comprises the gNB 203.

In one embodiment, a transmitter of the first signaling in the present disclosure comprises the gNB 203.

In one embodiment, a receiver of the first signaling in the present disclosure comprises the UE 201.

In one embodiment, a transmitter of the second signaling in the present disclosure comprises the gNB 203.

In one embodiment, a receiver of the second signaling in the present disclosure comprises the UE 201.

In one embodiment, a transmitter of the first radio signal in the present disclosure comprises the UE 201.

In one embodiment, a receiver of the first radio signal in the present disclosure comprises the gNB 203.

In one embodiment, the gNB 203 corresponds to the base station in the present disclosure.

In one embodiment, the UE 201 corresponds to the UE in the present disclosure.

Embodiment 3

Figure 3:
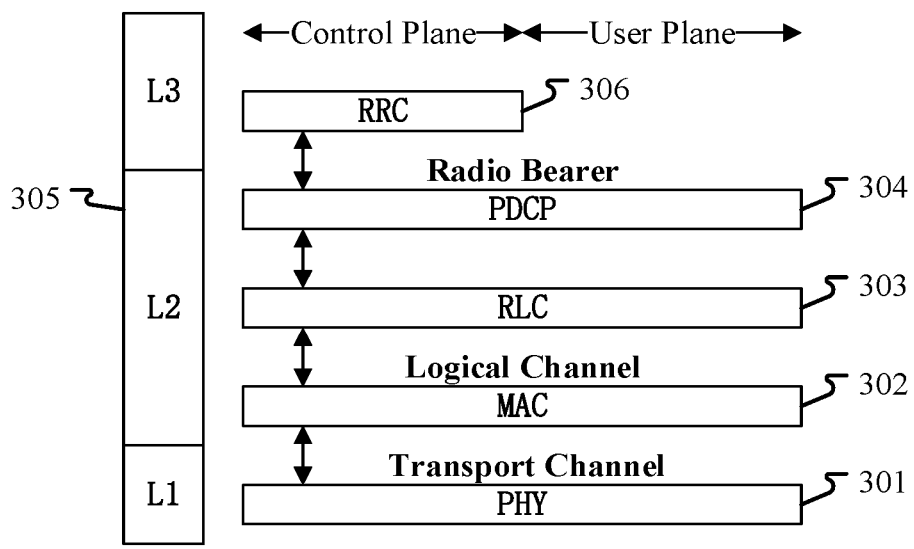
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY 301.

In one embodiment, the first signaling in the present disclosure is generated by the RRC sublayer 306.

In one embodiment, the first signaling in the present disclosure is generated by the MAC sublayer 302.

In one embodiment, the second signaling in the present disclosure is generated by the PHY 301.

In one embodiment, the second signaling in the present disclosure is generated by the RRC sublayer 306.

In one embodiment, the second signaling in the present disclosure is generated by the MAC sublayer 302.

In one embodiment, the first radio signal in the present disclosure is generated by the PHY 301.

In one embodiment, the second radio signal in the present disclosure is generated by the PHY 301.

In one embodiment, the third radio signal in the present disclosure is generated by the PHY 301.

In one embodiment, the third signaling in the present disclosure is generated by the PHY 301.

In one embodiment, the third signaling in the present disclosure is generated by the RRC sublayer 306.

In one embodiment, the third signaling in the present disclosure is generated by the MAC sublayer 302.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first sub-signal in the present disclosure is generated by the PHY 301.

In one embodiment, the second sub-signal in the present disclosure is generated by the PHY 301.

In one embodiment, the second radio signal in the present disclosure is generated by the PHY 301.

In one embodiment, the first information in the present disclosure is generated by the RRC sublayer 306.

In one embodiment, the first information in the present disclosure is generated by the MAC sublayer 302.

Embodiment 4

Figure 4:
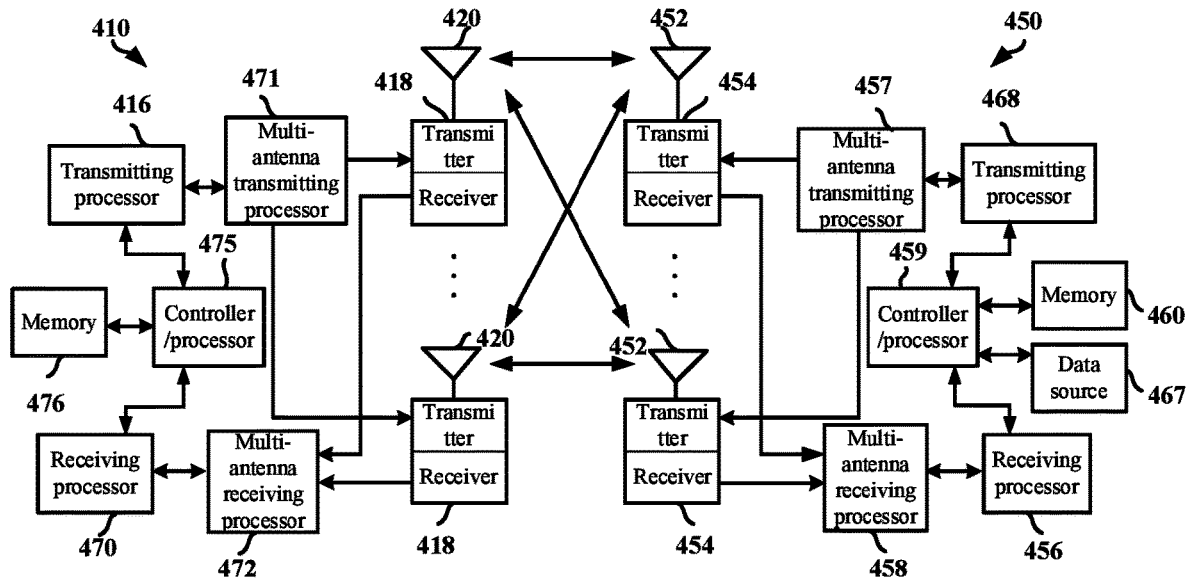
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450—targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink(DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.?? The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure and the second signaling in the present disclosure; transmits the first radio signal in the present disclosure on the first channel in the present disclosure; herein, the first signaling and the second signaling respectively comprise first configuration information and second configuration information; the first configuration information and the second configuration information are respectively for the first channel and a second channel; the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the second communication device 450 comprises a memory that stores a computer readable instruction program. The computer readable instruction program generates an action when executed by at least one processor. The action includes: receiving the first signaling in the present disclosure and the second signaling in the present disclosure; transmitting the first radio signal in the present disclosure on the first channel in the present disclosure; herein, the first signaling and the second signaling respectively comprise first configuration information and second configuration information; the first configuration information and the second configuration information are respectively for the first channel and a second channel; the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present disclosure and the second signaling in the present disclosure; receives the first radio signal in the present disclosure on the first channel in the present disclosure; herein, the first signaling and the second signaling respectively comprise first configuration information and second configuration information, and the first configuration information and the second configuration information are respectively for the first channel and a second channel; and the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the first communication device 410 comprises a memory that stores a computer readable instruction program. The computer readable instruction program generates an action when executed by at least one processor. The action includes: transmitting the first signaling in the present disclosure and the second signaling in the present disclosure; receiving the first radio signal in the present disclosure on the first channel in the present disclosure; herein, the first signaling and the second signaling respectively comprise first configuration information and second configuration information, and the first configuration information and the second configuration information are respectively for the first channel and a second channel; and the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the second node in the present disclosure comprises the first communication device 410.

In one embodiment, the first node comprises the second communication device 450 in the present disclosure.

In one embodiment, at least one of the antenna 452, the receiver 454, the receiving processor 456, the multi-antenna receiving processor 458, the controller/processor 459, the memory 460, or the data source 467 is used to receive the first signaling in the present disclosure; at least one of the antenna 420, the transmitter 418, the transmitting processor 416, the multi-antenna transmitting processor 471, the controller/processor 475, or the memory 476 is used for transmitting the first signaling in the present disclosure.

In one embodiment, at least one of the antenna 452, the receiver 454, the receiving processor 456, the multi-antenna receiving processor 458, the controller/processor 459, the memory 460, or the data source 467 is used for receiving the second signaling in the present disclosure; at least one of the antenna 420, the transmitter 418, the transmitting processor 416, the multi-antenna transmitting processor 471, the controller/processor 475, or the memory 476 is used for transmitting the second signaling in the present disclosure.

In one embodiment, at least one of the antenna 420, the receiver 418, the receiving processor 470, the multi-antenna receiving processor 472, the controller/processor 475, or the memory 476 is used to receive the first radio signal in the present disclosure on the first channel in the present disclosure; at least one of the antenna 452, the transmitter 454, the transmitting processor 468, the multi-antenna transmitting processor 457, the controller/processor 459, the memory 460, or the data source 467 is used to transmit the first radio signal in the present disclosure on the first channel in the present disclosure.

In one embodiment, at least one of the antenna 420, the receiver 418, the receiving processor 470, the multi-antenna receiving processor 472, the controller/processor 475, or the memory 476 is used to receive the second radio signal in the present disclosure on the second channel in the present disclosure; at least one of the antenna 452, the transmitter 454, the transmitting processor 468, the multi-antenna transmitting processor 457, the controller/processor 459, the memory 460, or the data source 467 is used to transmit the second radio signal in the present disclosure on the second channel in the present disclosure.

In one embodiment, at least one of the antenna 420, the receiver 418, the receiving processor 470, the multi-antenna receiving processor 472, the controller/processor 475, or the memory 476 is used to drop receiving a radio signal on the second channel in the present disclosure; at least one of the antenna 452, the transmitter 454, the transmitting processor 468, the multi-antenna transmitting processor 457, the controller/processor 459, the memory 460, or the data source 467 is used to transmit a radio signal on the second channel in the present disclosure.

In one embodiment, at least one of the antenna 452, the receiver 454, the receiving processor 456, the multi-antenna receiving processor 458, the controller/processor 459, the memory 460, or the data source 467 is used to receive the third radio signal of the present disclosure; at least one of the antenna 420, the transmitter 418, the transmitting processor 416, the multi-antenna transmitting processor 471, the controller/processor 475, or the memory 476 is used to transmit the third radio signal of the present disclosure.

In one embodiment, at least one of the antenna 452, the receiver 454, the receiving processor 456, the multi-antenna receiving processor 458, the controller/processor 459, the memory 460, or the data source 467 is used to receive the third signaling of the present disclosure. at least one of the antenna 420, the transmitter 418, the transmitting processor 416, the multi-antenna transmitting processor 471, the controller/processor 475, or the memory 476 is used to transmit the third signaling of the present disclosure.

In one embodiment, the UE 450 comprises at least one processor and at least one memory. The at least one memory comprises computer program codes; the at least one memory and the computer program codes are configured to be used in collaboration with the at least one processor. The UE 450 at least: receives the first signaling and the second signaling in the present disclosure; transmits the first radio signal in the present disclosure in the first radio resource block in the present disclosure; herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the UE 450 comprises a memory that stores a computer readable instruction program. The computer readable instruction program generates an action when executed by at least one processor. The action includes: receiving the first signaling and the second signaling in the present disclosure; transmitting the first radio signal in the present disclosure in the first radio resource block in the present disclosure; herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the gNB 410 comprises at least one processor and at least one memory. The at least one memory comprises computer program codes; the at least one memory and the computer program codes are configured to be used in collaboration with the at least one processor. The gNB 410 at least: transmits the first signaling and the second signaling in the present disclosure; receives the first radio signal in the present disclosure in the first radio resource block in the present disclosure; herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the gNB 410 comprises a memory that stores a computer readable instruction program. The computer readable instruction program generates an action when executed by at least one processor. The action includes: transmitting the first signaling and the second signaling in the present disclosure; receiving the first radio signal in the present disclosure in the first radio resource block in the present disclosure; herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the gNB 410 corresponds to the base station in the present disclosure.

In one embodiment, the UE 450 corresponds to the UE in the present disclosure.

In one embodiment, at least one of the antenna 420, the receiver 418, the receiving processor 470, the multi-antenna receiving processor 472, the controller/processor 475, or the memory 476 is used to receive the first radio signal in the present disclosure in the first radio resource block in the present disclosure; at least one of the antenna 452, the transmitter 454, the transmitting processor 468, the multi-antenna transmitting processor 457, the controller/processor 459, the memory 460, or the data source 467 is used to receive the first radio signal in the present disclosure in the first radio resource block in the present disclosure.

In one embodiment, at least one of the antenna 452, the receiver 454, the receiving processor 456, the multi-antenna receiving processor 458, the controller/processor 459, the memory 460, or the data source 467 is used to receive the second radio signal of the present disclosure; at least one of the antenna 420, the transmitter 418, the transmitting processor 416, the multi-antenna transmitting processor 471, the controller/processor 475, or the memory 476 is used to transmit the second radio signal of the present disclosure.

In one embodiment, at least one of the antenna 452, the receiver 454, the receiving processor 456, the multi-antenna receiving processor 458, the controller/processor 459, the memory 460, or the data source 467 is used to receive the first information in the present disclosure; at least one of the antenna 420, the transmitter 418, the transmitting processor 416, the multi-antenna transmitting processor 471, the controller/processor 475, or the memory 476 is used to transmit the first information in the present disclosure.

Embodiment 5

Figure 5:
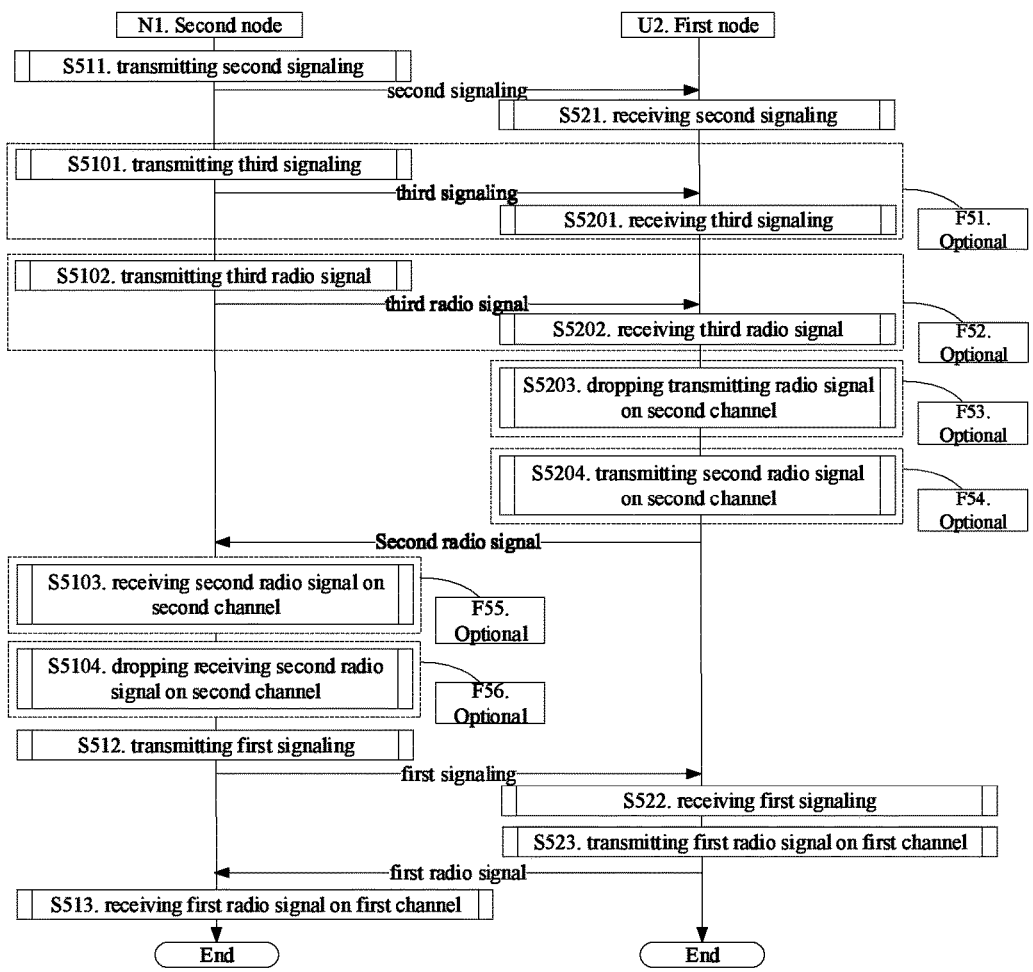
FIG. 5 illustrates a flowchart of transmission according to one embodiment of the present disclosure.

Embodiment 5 illustrates a flowchart of wireless transmissions according to one embodiment in the present disclosure, as shown in FIG. 5. In FIG. 5, a second node N1 and a first node U2 are communication nodes transmitted via an air interface. In FIG. 5, steps in boxes marked by F51 to F56 are respectively optional, where boxes marked by F53 and F54 cannot exist at the same time, and boxes marked by F55 and F56 cannot exist at the same time.

The second node N1 transmits a second signaling in step S511; transmits a third signaling in step S5101; transmits a third radio signal in step S5102; receives a second radio signal on a second channel in step S5103; drops receiving on a second channel in step S5104; transmits a first signaling in step S512; and receives a first radio signal on a first channel in step S513.

The first node U2 receives a second signaling in step S521; receives a third signaling in step S5201; receives a third radio signal in step S5202; drops transmitting on a second channel in step S5203; and transmits a second radio signal on a second channel in step S5204; receives a first signaling in step S522; and transmits a first radio signal on a first channel in step S523.

In Embodiment 5, the first signaling and the second signaling respectively comprise first configuration information and second configuration information, and the first configuration information and the second configuration information are respectively for the first channel and a second channel; the first radio signal comprises a first sub-signal and a second sub-signal; a first bit block is used by the first node U2 to generate the first sub-signal, and a second bit block is used by the first node U2 to generate the second sub-signal; a number of REs occupied by each bit in the first bit block averagely is related to the first configuration information; a number of REs occupied by each bit in the second bit block averagely is related to the second configuration information; a third bit block is used by the first node U2 to generate the second radio signal, and the third bit block is unrelated to the first bit block; the third radio signal is used by the first node U2 to generate the second bit block.

In one embodiment, the first node U2 is the first node in the present disclosure.

In one embodiment, the second node N1 is the second node in the present disclosure.

In one embodiment, the first node U2 drops transmitting on the second channel; and the box marked by F53 in FIG. 5 exists, while the box marked by F54 in FIG. 5 does not exist.

In one subembodiment of the above embodiment, the second channel is an uplink physical-layer control channel (i.e., an uplink channel only capable of bearing a physical-layer signaling).

In one subembodiment of the above embodiment, the second channel is a PUCCH.

In one subembodiment of the above embodiment, the second channel is an uplink physical-layer data channel (i.e., a downlink channel capable of bearing physical-layer data).

In one subembodiment of the above embodiment, the second channel is a PUSCH.

In one subembodiment of the above embodiment, the second channel is a PUSCH based on configured grant.

In one embodiment, the first node U2 transmits the second radio signal on the second channel; and the box marked by F3 in FIG. 5 does not exist, while box marked by F54 in FIG. 5 exists.

In one subembodiment of the above embodiment, the second channel is an uplink physical-layer data channel (i.e., a downlink channel capable of bearing physical-layer data).

In one subembodiment of the above embodiment, the second channel is a PUSCH.

In one subembodiment of the above embodiment, the second channel is a PUSCH based on UL scheduling.

In one embodiment, the first node in the present disclosure transmits the second radio signal on the second channel, the second signaling comprises scheduling information of the second radio signal; scheduling information of the second radio signal comprise one or more of occupied time-domain resources, occupied frequency-domain resources, a scheduled MCS, configuration information of DeModulation Reference Signals (DMRS), a Hybrid Automatic Repeat reQuest (HARQ) process number, a Redundancy Version (RV), and a New Data Indicator (NDI).

In one embodiment, the second node N1 drops receiving on the second channel; the box marked by F56 in FIG. 5 exists, while the box marked by F55 in FIG. 5 does not exist.

In one subembodiment of the above embodiment, the second channel is an uplink physical-layer control channel (i.e., an uplink channel only capable of bearing a physical-layer signaling).

In one subembodiment of the above embodiment, the second channel is a PUCCH.

In one subembodiment of the above embodiment, the second channel is an uplink physical-layer data channel (i.e., a downlink channel capable of bearing physical-layer data).

In one subembodiment of the above embodiment, the second channel is a PUSCH.

In one subembodiment of the above embodiment, the second channel is a PUSCH based on configured grant.

In one embodiment, the second node N1 receives the second radio signal on the second channel; the box marked by F56 in FIG. 5 does not exist, while the box marked by F55 in FIG. 5 exists.

In one embodiment, the second channel is an uplink physical-layer data channel (i.e., a downlink channel capable of bearing physical-layer data).

In one subembodiment of the above embodiment, the second channel is a PUSCH.

In one subembodiment of the above embodiment, the second channel is a PUSCH based on UL scheduling.

In one embodiment, the second node in the present disclosure monitors a radio signal on the second channel, a result of the monitoring is used by the second node for judging whether to receive the second radio signal or to drop receiving a radio signal on the second channel.

In one subembodiment of the above embodiment, the monitoring refers to an energy detection, that is, energy of a radio signal is sensed on the second channel and is averaged in time to obtain received energy. If the received energy is greater than a first given threshold, it is judged that the second radio signal is received on the second channel; otherwise a reception of a radio signal is dropped on the second channel.

In one subembodiment of the above embodiment, the monitoring refers to a coherent detection, that is a coherent reception is performed on the second channel and energy of a signal obtained after the coherent reception is measured. If the energy of the signal obtained after the coherent reception is greater than a second given threshold, it is judged that the second radio signal is received on the second channel; otherwise a reception of a radio signal is dropped on the second channel.

In one subembodiment of the above embodiment, the monitoring refers to a blind detection, that is, a signal is received on the second channel and a decoding operation is performed. If the decoding is determined correct according to a check bit, it is judged that the second radio signal is received on the second channel; otherwise a reception of a radio signal is dropped on the second channel.

In one embodiment, the second node in the present disclosure monitors a radio signal on the second channel, a result of the monitoring is used by the second node for judging whether the second radio signal is received on the second channel.

In one subembodiment of the above embodiment, the monitoring refers to an energy detection, that is, energy of a radio signal is sensed on the second channel and is averaged in time to obtain received energy. If the received energy is greater than a first given threshold, it is judged that the second radio signal is received on the second channel; otherwise it is judged that the second radio signal is not received on the second channel.

In one subembodiment of the above embodiment, the monitoring refers to a coherent detection, that is a coherent reception is performed on the second channel and energy of a signal obtained after the coherent reception is measured. If the energy of the signal obtained after the coherent reception is greater than a second given threshold, it is judged that the second radio signal is received on the second channel; otherwise it is judged that the second radio signal is not received on the second channel.

In one subembodiment of the above embodiment, the monitoring refers to a blind detection, that is, a signal is received on the second channel and a decoding operation is performed. If the decoding is determined correct according to a check bit, it is judged that the second radio signal is received on the second channel; otherwise it is judged that the second radio signal is not received on the second channel.

In one embodiment, the third signaling is used by the first node U2 to determine time-frequency resources occupied by the third radio signal.

In one subembodiment of the above embodiment, the second signaling is associated with the third signaling.

In one embodiment, the second signaling is used by the first node U2 to determine time-frequency resources occupied by the third radio signal.

In one embodiment, a first-type value and a first offset are used by the first node U2 to determine a number of REs occupied by the second sub-signal; and the first-type value is related to the second configuration information.

In one embodiment, the first signaling is transmitted on a downlink physical layer control channel (i.e., a downlink channel only capable of bearing a physical layer signaling).

In one embodiment, the second signaling is transmitted on a downlink physical layer control channel (i.e., a downlink channel only capable of bearing physical layer signaling).

In one embodiment, the third signaling is transmitted on a downlink physical layer control channel (i.e., a downlink channel only capable of bearing a physical layer signaling).

In one embodiment, the downlink physical-layer control channel is a Physical Downlink Control Channel (PDCCH).

In one embodiment, the downlink physical-layer control channel is a short PDCCH (sPDCCH).

In one embodiment, the downlink physical layer control channel is a New Radio PDCCH (NR-PDCCH).

In one embodiment, the first signaling is transmitted on a downlink physical layer data channel (i.e., a downlink channel capable of bearing physical layer data).

In one embodiment, the second signaling is transmitted on a downlink physical layer data channel (i.e., a downlink channel capable of bearing physical layer data).

In one embodiment, the third signaling is transmitted on a downlink physical layer data channel (i.e., a downlink channel capable of bearing physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

Embodiment 6

Embodiment 6 illustrates a schematic diagram of a first signaling comprising first configuration information according to one embodiment of the present disclosure, as shown in FIG. 6.

In one embodiment, the first signaling is a physical-layer signaling.

In one embodiment, the first signaling is a dynamic signaling.

In one embodiment, the first signaling is a layer 1 (L1) signaling.

In one embodiment, the first signaling is a L1 control signaling.

In one embodiment, the first signaling is a dynamic signaling used for an UpLink Grant.

In one embodiment, the first signaling is a dynamic signaling used for a Configured UL grant.

In one embodiment, the first signaling is a dynamic signaling used for a Configured UL grant activation.

In one embodiment, the first signaling comprises Downlink Control Information (DCI).

In one embodiment, the first signaling comprises DCI for an UpLink Grant.

In one embodiment, the first signaling comprises DCI for a Configured UL grant.

In one embodiment, the first signaling comprises DCI for a Configured UL grant activation.

In one embodiment, the first signaling comprises DCI for Configured UL grant Type 2 activation.

In one embodiment, the first signaling is UE-specific.

In one embodiment, the first signaling comprises DCI identified by a Cell-Radio Network Temporary Identifier (C-RNTI).

In one embodiment, the first signaling comprises DCI that a CRC is scrambled by a C-RNTI.

In one embodiment, the first signaling comprises DCI identified by a Configured Scheduling (CS)-RNTI.

In one embodiment, the first signaling comprises DCI that a CRC is scrambled by a CS-RNTI.

In one embodiment, the first signaling comprises DCI identified by an MCS-C-RNTI.

In one embodiment, the first signaling comprises DCI that a CRC is scrambled by an MCS-C-RNTI.

In one embodiment, the first signaling is a higher-layer signaling.

In one embodiment, the first signaling is an RRC signaling.

In one embodiment, the first signaling is a Medium Access Control layer Control Element (MAC CE) signaling.

In one embodiment, the first signaling comprises scheduling information of the first sub-signal in the present disclosure.

In one embodiment, scheduling information of the first sub-signal in the present disclosure comprises one or more of occupied time-domain resources, occupied frequency-domain resources, a scheduled MCS, a configuration information of DMRS, an HARQ process number, an RV, and an NDI.

In one embodiment, the first configuration information comprises one or more of occupied time-domain resources, occupied frequency-domain resources, a scheduled MCS, configuration information of DMRS, an HARQ process number, an RV, and an NDI of the first channel.

In one embodiment, the first configuration information comprises scheduling information of the first sub-signal in the present disclosure.

Embodiment 7

Embodiment 7 illustrates a schematic diagram of a second signaling comprising second configuration information according to one embodiment of the present disclosure, as shown in FIG. 7.

In one embodiment, the second signaling is a physical-layer signaling.

In one embodiment, the second signaling is a dynamic signaling.

In one embodiment, the second signaling is a L1 signaling.

In one embodiment, the second signaling is a L1 control signaling.

In one embodiment, the second signaling is a dynamic signaling used for UpLink Grant.

In one embodiment, the second signaling is a dynamic signaling used for Configured UL grant.

In one embodiment, the second signaling is a dynamic signaling used for a Configured UL grant activation.

In one embodiment, the second signaling is a dynamic signaling used for Downlink Grant.

In one embodiment, the second signaling comprises DCI.

In one embodiment, the second signaling comprises DCI for an UpLink Grant.

In one embodiment, the second signaling comprises DCI for a Configured UL grant.

In one embodiment, the second signaling comprises DCI for a Configured UL grant activation.

In one embodiment, the second signaling comprises DCI for a Configured UL grant Type 2 activation.

In one embodiment, the second signaling comprises DCI for a DownLink Grant.

In one embodiment, the second signaling is UE-specific.

In one embodiment, the second signaling comprises DCI identified by a C-RNTI.

In one embodiment, the second signaling comprises DCI that a CRC is scrambled by a C-RNTI.

In one embodiment, the second signaling comprises DCI identified by a CS-RNTI.

In one embodiment, the second signaling comprises DCI that a CRC is scrambled by a CS-RNTI.

In one embodiment, the second signaling comprises DCI identified by an MCS-C-RNTI.

In one embodiment, the second signaling comprises DCI that a CRC is scrambled by an MCS-C-RNTI.

In one embodiment, the second signaling comprises DCI identified by a Semi-Persistent-Channel State Information-RNTI (SP-CSI-RNTI).

In one embodiment, the second signaling comprises DCI that a CRC is scrambled by an SP-CSI-RNTI.

In one embodiment, the second signaling is a higher-layer signaling.

In one embodiment, the second signaling is an RRC signaling.

In one embodiment, the second signaling is a MAC CE signaling.

In one embodiment, the second configuration information comprises one or more of occupied time-domain resources, occupied frequency-domain resources, a scheduled MCS, configuration information of DMRS, a HARQ process number, an RV and an NDI of the second channel.

In one subembodiment of the above embodiment, the second channel is an uplink physical-layer data channel (i.e., an uplink channel capable of bearing physical-layer data).

In one subembodiment of the above embodiment, the second channel is a PUSCH.

In one embodiment, the second configuration information comprises one or more of occupied time-domain resources, occupied frequency-domain resources, occupied code-domain resources, a cyclic shift, an Orthogonal Cover Code, an OCC length, an OCC index, a PUCCH format, a largest supported bit rate, a largest supported payload of the second channel.

In one subembodiment of the above embodiment, the second channel is an uplink physical-layer control channel (i.e., an uplink channel only capable of bearing a physical-layer signaling).

In one subembodiment of the above embodiment, the second channel is a PUCCH.

In one embodiment, the second configuration information comprises scheduling information of the second sub-signal in the present disclosure.

In one embodiment, the second channel is an uplink physical-layer data channel (i.e., an uplink channel capable of bearing physical-layer data).

In one subembodiment of the above embodiment, the second channel is a PUSCH.

In one subembodiment of the above embodiment, the first node in the present disclosure transmits the second radio signal on the second channel.

Embodiment 8

Embodiment 8 illustrates a schematic diagram of a third bit block being unrelated to a first bit block according to one embodiment of the present disclosure, as shown in FIG. 8.

In embodiment 8, the first node in the present disclosure transmits the second radio signal in the present disclosure on the second channel in the present disclosure, and the third bit block is used to generate the second radio signal.

In one embodiment, the third bit block being used to generate the second radio signal includes: the second radio signal is an output obtained after bits in the third bit block sequentially through Channel Coding, Rate Matching, a Modulation Mapper, a Layer Mapper, a transform precoder, Precoding, a Resource Element Mapper, Generation of multicarrier symbol, and Modulation and Upconversion.

In one embodiment, the third bit block being used to generate the second radio signal includes: the second radio signal is an output obtained after bits in the third bit block sequentially through Channel Coding, Rate Matching, a Modulation Mapper, a Layer Mapper, Precoding, a Resource Element Mapper, Generation of multicarrier symbol, and Modulation and Upconversion.

In one embodiment, the third bit block comprises at least one bit.

In one embodiment, the third bit block comprises physical layer uplink data.

In one embodiment, the third bit block comprises a TB.

In one embodiment, the third bit block comprises at least one TB.

In one embodiment, the third bit block being unrelated to the first bit block includes: a TB comprised in the third bit block is different from a TB comprised in the first bit block.

In one embodiment, the third bit block being unrelated to the first bit block includes: any TB comprised in the third bit block is different from any TB comprised in the first bit block.

In one embodiment, the third bit block being unrelated to the first bit block includes: the third bit block and the first bit block correspond to different HARQ process numbers.

In one embodiment, the third bit block being unrelated to the first bit block includes: the second radio signal and the first sub-signal in the present disclosure correspond to different HARQ process numbers.

In one embodiment, the third bit block being unrelated to the first bit block includes: the first sub-signal in the present disclosure is not a retransmission of the third bit block.

In one embodiment, the third bit block being unrelated to the first bit block includes: the second radio signal is not a retransmission of the third bit block.

Embodiment 9

Embodiment 9 illustrates a schematic diagram of a third radio signal being used to generate a second bit block according to one embodiment of the present disclosure, as shown in FIG. 9.

In one embodiment, the third radio signal being used to generate the second bit block includes: the second bit block indicates whether the third radio signal is correctly received.

In one embodiment, the third radio signal being used to generate the second bit block includes: the third radio signal comprises a fourth bit block, and the fourth bit block comprises a TB; the second bit block indicates whether the fourth bit block is correctly received.

In one embodiment, the third radio signal is transmitted on a downlink physical layer data channel (i.e., a downlink channel capable of bearing physical layer data).

In one embodiment, the third radio signal is transmitted on a PDSCH.

Embodiment 10

Embodiment 10 illustrates a schematic diagram of a third radio signal being used to generate a second bit block according to one embodiment of the present disclosure, as shown in FIG. 10.

In one embodiment, the third radio signal comprises a DMRS.

In one embodiment, the third radio signal comprises a Channel-State Information Reference Signal (CSI-RS).

In one embodiment, the third radio signal being used to generate the second bit block includes: a measurement performed on the third radio signal is used to generate the second bit block.

In one embodiment, the third radio signal comprises a first reference signal, and a measurement performed on the first reference signal is used to generate the second bit block.

In one embodiment, the third radio signal comprises a first reference signal, a measurement performed on the first reference signal is used to generate a first channel quality, and the second bit block carries the first channel quality.

In one subembodiment of the above embodiment, the first channel quality comprises a CQI.

In one subembodiment of the above embodiment, the first channel quality comprises a CRI.

In one subembodiment of the above embodiment, the first channel quality comprises a PMI.

In one subembodiment of the above embodiment, the first channel quality comprises an RSRP.

In one subembodiment of the above embodiment, the first channel quality comprises an RSRQ.

Embodiment 11

Embodiment 11 illustrates a schematic diagram of a third signaling being used to determine time-frequency resources occupied by a third radio signal according to one embodiment of the present disclosure, as shown in FIG. 11.

In one embodiment, the third signaling is a physical-layer signaling.

In one embodiment, the third signaling is a dynamic signaling.

In one embodiment, the third signaling is a dynamic signaling used for an UpLink Grant.

In one embodiment, the third signaling is a dynamic signaling used for a Downlink Grant.

In one embodiment, the third signaling comprises DCI.

In one embodiment, the third signaling is UE-specific.

In one embodiment, the third signaling comprises DCI identified by a C-RNTI.

In one embodiment, the third signaling comprises DCI that a CRC is scrambled by a C-RNTI.

In one embodiment, the third signaling comprises DCI identified by a CS-RNTI.

In one embodiment, the third signaling comprises DCI that a CRC is scrambled by a CS-RNTI.

In one embodiment, the third signaling comprises DCI identified by an MCS-C-RNTI.

In one embodiment, the third signaling comprises DCI that a CRC is scrambled by an MCS-C-RNTI.

In one embodiment, the third signaling comprises DCI identified by an SP-CSI-RNTI.

In one embodiment, the third signaling comprises DCI that a CRC is scrambled by an SP-CSI-RNTI.

In one embodiment, the third signaling is a higher-layer signaling.

In one embodiment, the third signaling is an RRC signaling.

In one embodiment, the third signaling is a MAC CE signaling.

In one embodiment, the third signaling indicates time-frequency resources occupied by the third radio signal.

In one embodiment, the third signaling explicitly indicates time-frequency resources occupied by the third radio signal.

In one embodiment, the third signaling implicitly indicates time-frequency resources occupied by the third radio signal.

In one embodiment, the third signaling comprises scheduling information of the third radio signal.

In one embodiment, scheduling information of the third radio signal comprises one or more of occupied time-domain resources, occupied frequency-domain resources, a scheduled MCS, configuration information of DMRS, an HARQ process number, an RV and an NDI.

In one embodiment, the third radio signal comprises a first reference signal, and the third signaling indicates configuration information of the first reference signal.

In one embodiment, configuration information of the first reference signal comprises one or more of occupied time-domain resources, occupied frequency-domain resources, occupied code-domain resources, an RS sequence, a mapping mode, a DMRS type, a cyclic shift, an Orthogonal Cover Code (OCC), $w_f(k')$, and $w_t(l')$. The $w_f(k')$ and the $w_t(l')$ are spread spectrum sequences in frequency domain and time domain respectively, and the specific meaning of the $w_f(k')$ and the $w_t(l')$ can be found in 3GPP TS38.211, section 7.4.1.

In one embodiment, the third radio signal comprises a first reference signal, and the third signaling indicates an index of reference signal resources corresponding to the first reference signal.

In one embodiment, reference signal resources corresponding to the first reference signal comprise a CSI-RS resource.

Embodiment 12

Embodiment 12 illustrates a schematic diagram of a second signaling being associated with a third signaling according to one embodiment of the present disclosure, as shown in FIG. 12. In Embodiment 12, the second signaling comprises the second configuration information in the present disclosure, and the second configuration information is for the second channel in the present disclosure; the third signaling is used to determine time-frequency resources occupied by the third radio signal in the present disclosure.

In one embodiment, the second signaling being associated with the third signaling includes: the second signaling and the third signaling have a same signaling identifier.

In one embodiment, signaling identifiers of the second signaling and the third signaling are respectively a candidate signaling identifier in a first candidate signaling identifier set, the first candidate signaling identifier set comprises at least one candidate signaling identifier, the first candidate signaling identifier set comprises a C-RNTI, a CS-RNTI, an MCS-C-RNTI and an SP-CSI-RNTI.

In one embodiment, the second signaling being associated with the third signaling includes: the second signaling indicates a first MCS index, the third signaling indicates a second MCS index, a same MCS index table is used for interpreting the first MCS index and the second MCS index.

In one subembodiment of the above embodiment, the same MCS index table is one of Table 5.1.3.1-1, Table 5.1.3.1-2 or Table 5.1.3.1-3 in 3GPP TS38.214.

In one subembodiment of the above embodiment, the first MCS index and the second MCS index are respectively an $I_{MCS}$, and the specific meaning of the $I_{MCS}$ can be found in 3GPP TS38.214.

In one subembodiment of the above embodiment, the first MCS index indicates an MCS of the second radio signal.

In one subembodiment of the above embodiment, the first MCS index indicates an MCS of a radio signal transmitted on the second channel.

In one subembodiment of the above embodiment, the second MCS index indicates an MCS of the third radio signal.

In one subembodiment of the above embodiment, the second signaling comprises a first field, and the third signaling comprises a second field; the first field in the second signaling and the second field in the third signaling respectively indicate the first MCS index and the second MCS index; the first field in the second signaling comprises all or partial information in a Modulation and coding scheme field, and the second field in the third signaling comprises all or partial information in a Modulation and coding scheme field.

In one embodiment, the specific meaning of the Modulation and coding scheme field can be found in 3GPP TS38.212.

In one embodiment, the second signaling being associated with the third signaling includes: the second information indicates a second reference signal resource, the third signaling indicates a third reference signal resource, and the second reference signal resource is associated with the third reference signal resource.

In one subembodiment of the above embodiment, the second reference signal resource comprises a Sounding Reference Signal (SRS) resource.

In one subembodiment of the above embodiment, the second reference signal resource comprises an SRS resource set.

In one subembodiment of the above embodiment, the second reference signal resource comprises a CSI-RS resource.

In one subembodiment of the above embodiment, the second reference signal resource comprises a CSI-RS resource set.

In one subembodiment of the above embodiment, the second reference signal resource comprises a Synchronization Signal/Physical Broadcast Channel block (SS/PBCH block) resource.

In one subembodiment of the above embodiment, the third reference signal resource comprises a CSI-RS resource.

In one subembodiment of the above embodiment, the third reference signal resource comprises a CSI-RS resource set.

In one subembodiment of the above embodiment, the third reference signal resource comprises an SS/PBCH block resource.

In one subembodiment of the above embodiment, the second reference signal resource being associated with the third reference signal resource includes: the first node in the present disclosure uses a same spatial-domain receive filter to receive a reference signal on the second reference signal resource and the third reference signal resource.

In one subembodiment of the above embodiment, the second reference signal resource being associated with the third reference signal resource includes: a transmitting antenna port of a reference signal transmitted on the second reference signal resource is QCL with a transmitting antenna port of a reference signal transmitted on the third reference signal resource.

In one subembodiment of the above embodiment, the second reference signal resource being associated with the third reference signal resource includes: the first node in the present disclosure uses a same spatial-domain filter to transmit a reference signal on the second reference signal resource and receive a reference signal on the third reference signal resource.

In one subembodiment of the above embodiment, the second signaling comprises a third field, and the third signaling comprises a fourth field; the third field in the second signaling and the fourth field in the third signaling respectively indicate the second reference signal resource and the third reference signal resource; the third field in the second signaling comprises part or all of information in an SRS resource indicator field, and the fourth field in the third signaling comprises all or part of information in a Transmission configuration indication field.

In one subembodiment of the above embodiment, the second reference signal resource is used to determine a spatial relation of a radio signal transmitted on the second channel.

In one subembodiment of the above embodiment, the third reference signal resource is used to determine a spatial relation of the third radio signal.

In one subembodiment of the above embodiment, a transmitting antenna port of the third radio signal is QCL with a transmitting antenna port of a reference signal transmitted on the third reference signal resource.

In one embodiment, the specific meanings of the SRS resource indicator field and the Transmission configuration indication can be found in 3GPP TS38.212.

In one embodiment, the specific meaning of the spatial relation can be found in 3GPP TS38.214.

In one embodiment, the antenna port is an antenna port, and the specific meaning of the antenna port can be found in 3GPP TS38.211, section 4.4.

In one embodiment, a channel went through by a radio signal transmitted on one antenna port can be used to infer a channel went through by another radio signal transmitted by the one antenna port.

In one embodiment, a channel went through by a radio signal transmitted on one antenna port cannot be used for inferring a channel went through by another radio signal transmitted by the one antenna port.

In one embodiment, the channel comprises one or more of Channel Impulse Response (CIR), a Precoding Matrix Indicator (PMI), a Channel Quality Indicator (CQI), and a Rank Indicator (RI).

In one embodiment, the specific meaning of the QCL can be found in 3GPP TS38. 211, section 4.4.

In one embodiment, two antenna ports being QCL refers to: large-scale properties of a channel that a radio signal transmitted by one of the two antenna ports goes through can be used for inferring large-scale properties of a channel that a radio signal transmitted by the other of the two antenna ports goes through.

In one embodiment, the large-scale properties comprise one or more of delay spread, Doppler spread, Doppler shift, average gain, average delay and Spatial Rx parameters.

In one embodiment, the second signaling being associated with the third signaling includes: the second signaling and the third signaling are both located within a first time window in time domain; and the first time window is a consecutive duration.

In one subembodiment of the above embodiment, time-domain resources occupied by the second signaling are used to determine the first time window.

In one subembodiment of the above embodiment, a time interval between any time in the first time window and any time within time-domain resources occupied by the second signaling is not greater than a first threshold.

In one subembodiment of the above embodiment, a time interval between a start time of the first time window and a start time of time-domain resources occupied by the second signaling is not greater than a first threshold.

In one subembodiment of the above embodiment, a time interval between an end time of the first time window and an end time of time-domain resources occupied by the second signaling is not greater than a first threshold.

In one subembodiment of the above embodiment, a time interval between a start time of the first time window and an end time of time-domain resources occupied by the second signaling is not greater than a first threshold.

In one subembodiment of the above embodiment, a time interval between an end time of the first time window and a start time of time-domain resources occupied by the second signaling is not greater than a first threshold.

In one subembodiment of the above embodiment, time-domain resources occupied by the third signaling are used to determine the first time window.

In one subembodiment of the above embodiment, a time interval between any time in the first time window and any time within time-domain resources occupied by the third signaling is not greater than a second threshold.

In one subembodiment of the above embodiment, a time interval between a start time of the first time window and a start time of time-domain resources occupied by the third signaling is not greater than a first threshold.

In one subembodiment of the above embodiment, a time interval between an end time of the first time window and an end time of time-domain resources occupied by the third signaling is not greater than a first threshold.

In one subembodiment of the above embodiment, a time interval between a start time of the first time window and an end time of time-domain resources occupied by the third signaling is not greater than a first threshold.

In one subembodiment of the above embodiment, a time interval between an end time of the first time window and a start time of time-domain resources occupied by the third signaling is not greater than a first threshold.

In one subembodiment of the above embodiment, the first time window comprises at least one multicarrier symbol.

In one subembodiment of the above embodiment, the first time window comprises at least one slot.

In one embodiment, the second signaling being associated with the third signaling includes: the second signaling and the third signaling are both located within a first sub-band in frequency domain.

In one subembodiment of the above embodiment, the first sub-band is a carrier.

In one subembodiment of the above embodiment, the first sub-band comprises at least one carrier.

In one subembodiment of the above embodiment, the first sub-band is a BWP.

In one subembodiment of the above embodiment, the first subband comprises at least one BWP.

In one subembodiment of the above embodiment, the first sub-band comprises at least one consecutive subcarrier.

In one embodiment, the second signaling being associated with the third signaling includes: the third signaling explicitly indicates the second signaling.

In one embodiment, the second signaling being associated with the third signaling includes: the third signaling implicitly indicates the second signaling.

In one embodiment, the second signaling being associated with the third signaling includes: the third signaling explicitly indicates time-frequency resources occupied by the second signaling.

In one embodiment, the second signaling being associated with the third signaling includes: the third signaling implicitly indicates time-frequency resources occupied by the second signaling.

Embodiment 13

Embodiment 13 illustrates a schematic diagram of a second signaling being used to determine time-frequency resources occupied by a third radio signal according to one embodiment of the present disclosure, as shown in FIG. 13.

In one embodiment, the second signaling indicates time-frequency resources occupied by the third radio signal.

In one embodiment, the second signaling explicitly indicates time-frequency resources occupied by the third radio signal.

In one embodiment, the second signaling implicitly indicates time-frequency resources occupied by the third radio signal.

In one embodiment, the second signaling comprises scheduling information of the third radio signal.

In one subembodiment of the above embodiment, the second channel in the present disclosure is a PUCCH.

In one embodiment, the third radio signal comprises a first reference signal, and the second signaling indicates configuration information of the first reference signal.

In one embodiment, the third radio signal comprises a first reference signal, and the second signaling indicates an index of a reference signal resource corresponding to the first reference signal.

In one embodiment, the second signaling comprises a fifth field, and the fifth field in the second signaling indicates the second channel in the present disclosure.

In one subembodiment of the above embodiment, the fifth field in the second signaling comprises all or partial information in a PUCCH resource indicator field.

In one subembodiment of the above embodiment, the fifth field in the second signaling comprises all or partial information in a PDSCH-to-HARQ_feedback timing indicator field.

In one embodiment, the specific meaning of the PUCCH resource indicator field can be found in 3GPP TS38. 212.

In one embodiment, the specific meaning of the PDSCH-to-HARQ_feedback timing indicator field can be found in 3GPP TS38. 212.

Embodiment 14

Embodiment 14 illustrates a schematic diagram of a first-type value and a first offset being used to determine a number of REs occupied by a second sub-signal according to one embodiment of the present disclosure, as shown in FIG. 14. In Embodiment 14, a number of REs occupied by the second sub-signal is a minimum value between an integer obtained after a product of the first-type value and the first offset is rounded up and a first limiting value.

In one embodiment, an integer obtained after a given value is rounded up is equal to a minimum integer not less than the given value.

In one embodiment, the first offset is a non-negative real number.

In one embodiment, the first offset is a positive real number.

In one embodiment, the first offset is greater than 1.

In one embodiment, the first offset is equal to 1.

In one embodiment, the first offset is less than 1.

In one embodiment, the first offset is equal to 0.

In one embodiment, the first offset is greater than 0.

In one embodiment, the first offset is $\beta_{offset}^{HARQ-ACK}$.

In one embodiment, the specific meaning of the $\beta_{offset}^{HARQ-ACK}$ can be found in 3GPP TS38.212, section 6.3.2.

In one embodiment, the first offset is $\beta_{offset}^{CSI-1}$.

In one embodiment, the specific meaning of the $\beta_{offset}^{CSI-1}$ can be found in 3GPP TS38.212, section 6.3.2.

In one embodiment, the first offset is $\beta_{offset}^{CSI-2}$.

In one embodiment, the specific meaning of the $\beta_{offset}^{CSI-2}$ can be found in 3GPP TS38.212, section 6.3.2.

In one embodiment, the first offset is $\beta_{offset}^{AUL-UCI}$.

In one embodiment, the specific meaning of the $\beta_{offset}^{AUL-UCI}$ can be found in 3GPP TS36.212 (V15.3.0), section 5.2.

In one embodiment, the first offset is determined by higher-layer parameters betaOffsetACK-Index1, betaOffsetACK-Index2 and betaOffsetACK-Index3.

In one embodiment, the specific meanings of the higher-layer parameters betaOffsetACK-Index1, betaOffsetACK-Index2 and betaOffsetACK-Index3 can be found in 3GPP TS38.213, section 9.3 and in 3GPP TS38.331.

In one embodiment, the first offset is determined by higher-layer parameters betaOffsetCSI-Part1-Index1 and betaOffsetCSI-Part1-Index2.

In one embodiment, the specific meanings of the higher-layer parameters betaOffsetCSI-Part1-Index1 and betaOffsetCSI-Part1-Index2 can be found in 3GPP TS38.213, section 9.3 and in 3GPP TS38.331.

In one embodiment, the first offset is determined by higher-layer parameters betaOffsetCSI-Part2-Index1 and betaOffsetCSI-Part2-Index2.

In one embodiment, the specific meanings of the higher-layer parameters betaOffsetCSI-Part2-Index1 and betaOffsetCSI-Part2-Index2 can be found in 3GPP TS38.213, section 9.3 and in 3GPP TS38.331.

In one embodiment, the first signaling in the present disclosure indicates the first offset.

In one embodiment, the first signaling in the present disclosure comprises a sixth field, the sixth field in the first signaling indicates the first offset, and the sixth field in the first signaling comprises all or partial information in a beta_offset indicator field.

In one embodiment, the second signaling in the present disclosure indicates the first offset.

In one embodiment, the second signaling in the present disclosure comprises a sixth field, the sixth field in the second signaling indicates the first offset, and the sixth field in the second signaling comprises all or partial information in a beta_offset indicator field.

In one embodiment, the third signaling in the present disclosure indicates the first offset.

In one embodiment, the third signaling in the present disclosure comprises a sixth field, the sixth field in the third signaling indicates the first offset, and the sixth field in the third signaling comprises all or partial information in a beta_offset indicator field.

In one embodiment, the specific meaning of the beta_offset indicator field can be found in 3GPP TS38.212.

In one embodiment, the first offset is one of the K candidate offsets, K being a positive integer greater than 1.

In one subembodiment of the above embodiment, the first signaling in the present disclosure indicates the first offset out of the K candidate offsets.

In one subembodiment of the above embodiment, the second signaling in the present disclosure indicates the first offset out of the K candidate offsets.

In one subembodiment of the above embodiment, the third signaling in the present disclosure indicates the first offset out of the K candidate offsets.

In one embodiment, the first limiting value is a positive integer.

In one embodiment, the first limiting value is $\lceil \alpha \Sigma_{l=l_0}^{N^{PUSCH}_{symb,all}-1} M_{sc}^{UCI}(l) \rceil$, where the $\alpha$ is a higher-layer parameter scaling, the $l_0$ is an index of a first multicarrier symbol allocated to the first channel but not to a DMRS and later than a first DMRS symbol of the first channel in time domain, the $N^{PUSCH}_{symb,all}$ is a number of multicarrier symbols occupied by the first channel, the $M_{sc}^{UCI}(l)$ is a number of REs that can be occupied by UCI on a l-th multicarrier symbol. The specific meanings of the $\lceil \alpha \Sigma_{l=l_0}^{N^{PUSCH}_{symb,all}-1} M_{sc}^{UCI}(l) \rceil$, the $N^{PUSCH}_{symb,all}$ and the $M_{sc}^{UCI}(l)$ can be found in 3GPP TS38.212, section 6.3.2.4.

In one embodiment, the first limiting value is $\lceil \alpha \Sigma_{l=0}^{N^{PUSCH}_{symb,all}-1} M_{sc}^{UCI}(l) \rceil - Q'_{ACK}$, and the $Q'_{ACK}$ is a number of REs occupied by an HARQ-ACK. The specific meanings of the $\lceil \alpha \Sigma_{l=0}^{N^{PUSCH}_{symb,all}-1} M_{sc}^{UCI}(l) \rceil - Q'_{ACK}$, the $\alpha$, the $N^{PUSCH}_{symb,all}$, the $M_{sc}^{UCI}(l)$ and the $Q'_{ACK}$ can be found in 3GPPTS38.212, section 6.3.2.4.

In one embodiment, the first limiting value is $\Sigma_{l=0}^{N^{PUSCH}_{symb,all}-1} M_{sc}^{UCI}(l) - Q'_{ACK}$. The specific meanings of the $\lceil \alpha \Sigma_{l=0}^{N^{PUSCH}_{symb,all}-1} M_{sc}^{UCI}(l) \rceil - Q'_{ACK}$, the $N^{PUSCH}_{symb,all}$, the $M_{sc}^{UCI}(l)$ and the $Q'_{ACK}$ can be found in 3GPP TS38.212, section 6.3.2.4.

In one embodiment, the first limiting value is $\lceil \alpha \Sigma_{l=0}^{N^{PUSCH}_{symb,all}-1} M_{sc}^{UCI}(l) \rceil - Q'_{ACK} - Q'_{CSI-1}$, and the $Q'_{CSI-1}$ is a number of REs occupied by CSI part 1. The specific meanings of the $\lceil \alpha \Sigma_{l=0}^{N^{PUSCH}_{symb,all}-1} M_{sc}^{UCI}(l) \rceil - Q'_{ACK} - Q'_{CSI-1}$, the $\alpha$, the $N^{PUSCH}_{symb,all}$, the $M_{sc}^{UCI}(l)$, the $Q'_{ACK}$ and the $Q'_{CSI-1}$ can be found in 3GPP TS38.212, section 6.3.2.4.

In one embodiment, the first limiting value is $M_{sc}^{PUSCH} \cdot N_{symb}^{PUSCH}$, the $M_{sc}^{PUSCH}$ is a bandwidth configured by a latest AUL activation DCI, the $N_{symb}^{PUSCH}$ is a number of multicarrier symbols allocated to the first channel. The specific meanings of the $M_{sc}^{PUSCH}$ and $N_{symb}^{PUSCH}$ can be found in 3GPP TS36.212, section 5.2.2.

Embodiment 15

Embodiment 15 illustrates a schematic diagram of a first-type value and a first offset being used to determine a number of REs occupied by a second sub-signal according to one embodiment of the present disclosure, as shown in FIG. 15. In Embodiment 15, a number of REs occupied by the second sub-signal is an integer obtained after a product of the first-type value and the first offset is rounded up.

Embodiment 16

Embodiment 16 illustrates a schematic diagram of a first-type value according to one embodiment of the present disclosure, as shown in FIG. 16. In Embodiment 16, the first-type value is equal to a product of a first-type reference value and a number of bits comprised in the second bit block in the present disclosure; the first-type reference value is related to the second configuration information in the present disclosure. The second configuration information is for the second channel in the present disclosure.

In one embodiment, the first-type value is a positive real number.

In one embodiment, the first-type value is related to a number of REs allocated to the second channel.

In one embodiment, the first-type value is related to a number REs allocated to the second channel and not allocated to a reference signal.

In one embodiment, the first-type value is related to an MCS allocated to the second channel.

In one embodiment, the first-type value is related to a third bit size, and a number of REs allocated to the second channel and an MCS allocated to the second channel are used to determine the third bit size.

In one subembodiment of the above embodiment, the second channel is a PUSCH.

In one subembodiment of the above embodiment, the third bit size is a size of bits comprised in the third bit block in the present disclosure.

In one subembodiment of the above embodiment, the third bit block in the present disclosure comprises at least one TB, and the third bit size is equal to a sum of TBS(s) of the at least one TB plus a sum of length(s) of CRC bit(s) of the at least one TB.

In one subembodiment of the above embodiment, the second channel is reserved for a given bit block, and the third bit size is a size of bits comprised in the given bit block.

In one subembodiment of the above embodiment, the second channel is reserved for a given bit block, the given bit block comprises at least one TB, and the third bit size is equal to a sum of TBS(s) of the at least one TB plus a sum of length(s) of CRC bit(s) of the at least one TB.

In one subembodiment of the above embodiment, the first-type reference value is related to the third bit size.

In one subembodiment of the above embodiment, the first-type reference value is a ratio of a number of REs allocated to the second channel to the third bit size.

In one subembodiment of the above embodiment, the first-type reference value is a ratio of a number of REs allocated to the second channel but not allocated to a reference signal to the third bit size.

In one embodiment, the first-type value is related to a fourth bit size, and the fourth bit size is a maximum payload of the second channel.

In one subembodiment of the above embodiment, the second channel is a PUCCH.

In one subembodiment of the above embodiment, the fourth bit size is indicated by a higher-layer parameter maxPayloadMinus1.

In one subembodiment of the above embodiment, the fourth bit size is indicated by a higher-layer parameter maxPayloadMinus1 corresponding to the second channel.

In one subembodiment of the above embodiment, the fourth bit size is indicated by a seventh field in a first information element, and an eighth field in the first information element indicates an index of the second channel; the first information element comprises part or all of information in a PUCCH-ResourceSet, the seventh field in the first information element comprises part or all of information in a maxPayloadMinus1 field in a PUCCH-ResourceSet, and the eighth field in the first information element comprises part or all of information in a resourceList field in a PUCCH-ResourceSet; an index of the second channel is a PUCCH-ResourceId.

In one subembodiment of the above embodiment, the first-type reference value is related to the fourth bit size.

In one subembodiment of the above embodiment, the first-type reference value is a ratio of a number of REs allocated to the second channel to the fourth bit size.

In one subembodiment of the above embodiment, the first-type reference value is a ratio of a number of REs allocated to the second channel but not allocated to a reference signal to the fourth bit size.

In one embodiment, the specific meanings of the PUCCH-ResourceSet, the maxPayloadMinus1 field, the resourceList field and PUCCH-ResourceId can be found in 3GPP TS38.331.

In one embodiment, the first-type value is unrelated to the first configuration information in the present disclosure.

In one embodiment, the first-type reference value is a positive real number.

In one embodiment, the first-type reference value is related to a number of REs allocated to the second channel.

In one embodiment, the first-type reference value is related to a number of REs allocated to the second channel but not allocated to a reference signal.

In one embodiment, the first-type reference value is related to an MCS allocated to the second channel.

In one embodiment, the first-type reference value is unrelated to the first configuration information in the present disclosure.

In one embodiment, the first-type reference value is equal to $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$ is a size of code blocks comprised in a Uplink Shared Channel (UL-SCH) on the second channel, the $K_r$ is a size of bits comprised in an r-th code block, the $N_{symb,all}^{PUSCH}$ is a size of multicarrier symbols allocated to the second channel, and the $M_{sc}^{UCI}(l)$ is a number of REs that can be occupied by UCI on an l-th multicarrier symbol. The specific meanings of the $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$, the $K_r$, the $N_{symb,all}^{PUSCH}$ and the $M_{sc}^{UCI}(l)$ can be found in 3GPP TS38. 212, section 6.3.2.4.

In one embodiment, the first-type reference value is equal to $$\frac{1}{R \cdot Q_m},$$

the R is a code rate allocated to the second channel, and the $Q_m$ is a modulation order allocated to the second channel. The specific meanings of the $$\frac{1}{R \cdot Q_m},$$

the R and the $Q_m$ can be found in 3GPP TS38.212, section 6.3.2.4.

In one embodiment, a size of bits comprised in the second bit block comprises a size of CRC bits.

Embodiment 17

Embodiment 17 illustrates a schematic diagram of timing relations among a first signaling, a second signaling, a third signaling, a first channel, a second channel and a third radio signal according to one embodiment of the present disclosure, as shown in FIG. 17. In Embodiment 17, the third signaling is earlier than the third radio signal in time domain, the third radio signal is earlier than the first signaling in time domain, the first signaling is earlier than the first channel in time domain, time-domain resources occupied by the second signaling are not orthogonal to time-domain resources occupied by the first channel, and the first channel is earlier than the second channel in time domain.

In one embodiment, an end time of time-domain resources occupied by the first channel is not earlier than an end time of time-domain resources occupied by the second signaling.

Embodiment 18

Embodiment 18 illustrates a schematic diagram of timing relations among a first signaling, a second signaling, a third signaling, a first channel, a second channel and a third radio signal according to one embodiment of the present disclosure, as shown in FIG. 18. In Embodiment 18, the second signaling is earlier than the third signaling in time domain, the third signaling is earlier than the third radio signal in time domain, the third radio signal is earlier than the second channel in time domain, the second channel is earlier than the first signaling in time domain, and the first signaling is earlier than the first channel in time domain.

Embodiment 19

Embodiment 19 illustrates a schematic diagram of timing relations among a first signaling, a second signaling, a first channel, a second channel and a third radio signal according to one embodiment of the present disclosure, as shown in FIG. 19. In Embodiment 19, the second signaling is earlier than the third radio signal in time domain, the third radio signal is earlier than the first signaling in time domain, the first signaling is earlier than the first channel in time domain, and the time-domain resources occupied by the first channel are not orthogonal to time-domain resources occupied by the second channel.

In one embodiment, a start time of time-domain resources occupied by the second channel is not earlier than a start time of time-domain resources occupied by the first channel.

In one embodiment, an end time of time-domain resources occupied by the second channel is not later than an end time of time-domain resources occupied by the first channel.

Embodiment 20

Embodiment 20 illustrates a structural block diagram of a processing device in a first node according to one embodiment of the present disclosure, as shown in FIG. 20. In FIG. 20, the processing device 2000 in a first node comprises a first receiver 2001 and a first transmitter 2002.

In Embodiment 20, the first receiver 2001 receives a first signaling and a second signaling; the first transmitter 2002 transmits a first radio signal on the first channel.

In Embodiment 20, the first signaling and the second signaling respectively comprise first configuration information and second configuration information, and the first configuration information and the second configuration information are respectively for a first channel and a second channel; the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the first transmitter 2002 drops transmitting on the second channel.

In one embodiment, the first transmitter 2002 transmits a second radio signal on the second channel; herein, a third bit block is used to generate the second radio signal, and the third bit block is unrelated to the first bit block.

In one embodiment, the first receiver 2001 receives a third radio signal; herein, the third radio signal is used to generate the second bit block.

In one embodiment, the first receiver 2001 receives a third signaling; herein, the third signaling is used to determine time-frequency resources occupied by the third radio signal.

In one embodiment, the second signaling is associated with the third signaling.

In one embodiment, the second signaling is used to determine time-frequency resources occupied by the third radio signal.

In one embodiment, a first-type value and a first offset are used to determine a number of REs occupied by the second sub-signal; and the first-type value is related to the second configuration information.

In one embodiment, the first node 2000 is a UE.

In one embodiment, the first node 2000 is a relay node.

In one embodiment, the first receiver 2001 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 2002 comprises at least one of the antenna 452, the transmitter 454, the transmitting processor 468, the multi-antenna transmitting processor 457, the controller/processor 459, the memory 460, or the data source 467 in Embodiment 4.

Embodiment 21

Embodiment 21 illustrates a structural block diagram of a processing device in a second node according to one embodiment of the present disclosure, as shown in FIG. 21. In FIG. 21, the processing device 2100 in a second node comprises a third transmitter 2101 and a second receiver 2102.

In Embodiment 21, the second transmitter 2101 transmits a first signaling and a second signaling; and the second receiver 2102 receives a first radio signal on the first channel.

In Embodiment 21, the first signaling and the second signaling respectively comprise first configuration information and second configuration information, and the first configuration information and the second configuration information are respectively for a first channel and a second channel; the first radio signal comprises a first sub-signal and a second sub-signal; a first bit block is used to generate the first sub-signal, and a second bit block is used to generate the second sub-signal; a number of REs occupied by each bit in the first bit block averagely is related to the first configuration information; a number of REs occupied by each bit in the second bit block averagely is related to the second configuration information.

In one embodiment, the second receiver 2102 drops receiving on the second channel.

In one embodiment, the second receiver 2102 receives a second radio signal on the second channel; herein, a third bit block is used to generate the second radio signal, and the third bit block is unrelated to the first bit block.

In one embodiment, the second transmitter 2101 transmits a third radio signal; herein, the third radio signal is used to generate the second bit block.

In one embodiment, the second transmitter 2101 transmits a third signaling; herein, the third signaling is used to determine time-frequency resources occupied by the third radio signal.

In one embodiment, the second signaling is associated with the third signaling.

In one embodiment, the second signaling is used to determine time-frequency resources occupied by the third radio signal.

In one embodiment, a first-type value and a first offset are used to determine a number of REs occupied by the second sub-signal; and the first-type value is related to the second configuration information.

In one embodiment, the second node 2100 is a base station.

In one embodiment, the second node 2100 is a relay node.

In one embodiment, the second transmitter 2101 comprises at least one of the antenna 420, the transmitter 418, the transmitting processor 416, the multi-antenna transmitting processor 471, the controller/processor 475, or the memory 476 in Embodiment 4.

In one embodiment, the second receiver 2102 comprises at least one of the antenna 420, the receiver 418, the receiving processor 470, the multi-antenna receiving processor 472, the controller/processor 475, the memory 476 in Embodiment 4.

Embodiment 22

Embodiment 22 illustrates a flowchart of a first signaling, a second signaling and a first radio signal according to one embodiment of the present disclosure, as shown in FIG. 22. In step 2200 illustrated by FIG. 22, each box represents a step. and in particular, the order of steps in boxes does not represent chronological order of characteristics between the steps.

In Embodiment 22, the UE in the present disclosure receives a first signaling and a second signaling in step 2201; transmits a first radio signal in a first radio resource block in step 2202. Herein, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the first signaling is a physical-layer signaling.

In one embodiment, the first signaling is a dynamic signaling.

In one embodiment, the first signaling is a higher-layer signaling.

In one embodiment, the first signaling is an RRC signaling.

In one embodiment, the second signaling is a physical-layer signaling.

In one embodiment, the second signaling is a dynamic signaling.

In one embodiment, the first bit block comprises at least one bit.

In one embodiment, the first bit block comprises one Transport Block (TB).

In one embodiment, the first bit block is a TB.

In one embodiment, the first bit block comprises a first information bit block and a first check bit block, the first check bit block is generated by a Cyclic Redundancy Check (CRC) bit block of the first information bit block.

In one subembodiment of the above embodiment, the first check bit block is a CRC bit block of the first information bit block.

In one subembodiment of the above embodiment, the first check bit block is a bit block after a CRC bit block of the first information bit block is scrambled.

In one embodiment, a size of the first bit block refers to a size of bits comprised in the first bit block.

In one embodiment, a size of the first bit block refers to a Transport Block Size (TBS).

In one embodiment, a size of the first bit block refers to a TBS of a TB comprised in the first bit block.

In one embodiment, the second bit block comprises at least one bit.

In one embodiment, the second bit block carries Uplink Control Information (UCI).

In one embodiment, the second bit block carries a Hybrid Automatic Repeat reQuest-Acknowledgement (HARQ-ACK).

In one embodiment, the second bit block carries a Scheduling Request (SR).

In one embodiment, the second bit block carries a Channel-state information reference signals Resource Indicator (CRI).

In one embodiment, the second bit block carries Channel-State Information (CSI).

In one embodiment, the CSI comprises one or more of a CRI, a Precoding Matrix Indicator (PMI), a Reference Signal Received Power (RSRP), a Reference Signal Received Quality (RSRQ) and a Channel Quality Indicator (CQI).

In one embodiment, the second bit block comprises a second information bit block and a second check bit block, and the second check bit block is generated by a CRC bit block of the second information bit block.

In one subembodiment of the above embodiment, the second check bit block is a CRC bit block of the second information bit block.

In one subembodiment of the above embodiment, the second check bit block is a bit block after a CRC bit block of the second information bit block is scrambled.

In one embodiment, the RE is a Resource Element (RE).

In one embodiment, the RE occupies a multicarrier symbol in time domain, and a subcarrier in frequency domain.

In one embodiment, the multicarrier symbol generation is an Orthogonal Frequency Division Multiplexing (OFDM) symbol generation.

In one embodiment, the multicarrier symbol generation is a Single Carrier-Frequency Division Multiple Access (SC-FDMA) symbol generation.

In one embodiment, the multicarrier symbol generation is a Discrete Fourier Transform Spread OFDM (DFT-S-OFDM) symbol generation.

In one embodiment, the first radio signal comprises the first sub-signal and the second sub-signal.

In one embodiment, the first radio signal comprises only the second sub-signal in the first sub-signal and the second sub-signal.

In one embodiment, the first sub-signal carrying the first bit block includes: the first sub-signal is an output after bits in the first bit block sequentially through Cyclic Redundancy Check (CRC) Attachment, Segmentation, Coding block (CB) level CRC Attachment, Channel Coding, Rate Matching, Concatenation, Scrambling, a Modulation Mapper, a Layer Mapper, a transform precoder, Precoding, a Resource Element Mapper, multicarrier symbol generation, and Modulation and Upconversion.

In one embodiment, the first sub-signal carrying the first bit block includes: the first sub-signal is an output after bits in the first bit block is sequentially through Cyclic Redundancy Check (CRC) Attachment, Segmentation, Coding block (CB) level CRC Attachment, Channel Coding, Rate Matching, Concatenation, Scrambling, a Modulation Mapper, a Layer Mapper, Precoding, a Resource Element Mapper, multicarrier symbol generation, and Modulation and Upconversion.

In one embodiment, the first sub-signal carrying the first bit block includes: the first bit block is used to generate the first sub-signal.

In one embodiment, the first sub-signal is unrelated to the second bit block.

In one embodiment, the second sub-signal carrying the second bit block includes: the second sub-signal is an output obtained after bits in the second bit block sequentially through CRC attachment, channel coding, rate matching, a Modulation Mapper, a Layer Mapper, a transform precoder, Precoding, a Resource Element Mapper, Generation of multicarrier symbol, and Modulation and Upconversion.

In one embodiment, the second sub-signal carrying the second bit block includes: the second sub-signal is an output of bits in the second bit block sequentially through CRC Attachment, channel coding, rate matching, a Modulation Mapper, a Layer Mapper, Precoding, a Resource Element Mapper, Generation of multicarrier symbol, and Modulation and Upconversion.

In one embodiment, the second sub-signal carrying the second bit block includes: the second bit block is used to generate the second sub-signal.

In one embodiment, the second sub-signal is unrelated to the first bit block.

In one embodiment, the first sub-signal and the second sub-signal occupy mutually-orthogonal REs in the first radio resource block.

In one embodiment, the first radio signal comprises a third sub-signal, and the third sub-signal carries a fourth bit block.

In one subembodiment of the above embodiment, the fourth bit block is unrelated to the second signaling.

In one subembodiment of the above embodiment, the second signaling is used to determine the fourth bit block.

In one subembodiment of the above embodiment, the fourth bit block comprises at least one bit.

In one subembodiment of the above embodiment, the fourth bit block carries UCI.

In one subembodiment of the above embodiment, the fourth bit block carries an HARQ-ACK.

In one subembodiment of the above embodiment, the fourth bit block carries a CRI.

In one subembodiment of the above embodiment, the fourth bit block carries a CSI.

In one subembodiment of the above embodiment, the second radio signal in the present disclosure comprises a fourth sub-signal and a downlink reference signal. The fourth sub-signal carries a third bit block, and the second bit block indicates whether the third bit block is correctly received; a measurement performed on the downlink reference signal is used to determine the fourth bit block.

In one subembodiment of the above embodiment, the third sub-signal is unrelated to the second bit block, and the second sub-signal is unrelated to the fourth bit block.

In one subembodiment of the above embodiment, the target parameter group is used to determine a number of REs occupied by the third sub-signal in the first radio resource block.

In one subembodiment of the above embodiment, the target parameter group is used to determine a number of coded modulation symbols per layer of the third sub-signal.

In one subembodiment of the above embodiment, the first parameter group is used to determine a number of REs occupied by the third sub-signal in the first radio resource block.

In one subembodiment of the above embodiment, the first parameter group is used to determine a number of coded modulation symbols per layer of the third sub-signal.

In one subembodiment of the above embodiment, the third sub-signal and the first sub-signal occupy mutually-orthogonal REs in the first radio resource block, and the third sub-signal and the second sub-signal occupy mutually-orthogonal REs in the first radio resource block.

In one embodiment, a number of REs occupied by the second sub-signal in the first radio resource block is a number of coded modulation symbols per layer of the second sub-signal.

In one embodiment, the first parameter group comprises at least one parameter.

In one embodiment, the second parameter group comprises at least one parameter.

In one embodiment, the target parameter group comprises at least one parameter.

In one embodiment, there exists one parameter in the first parameter group not belonging to the second parameter group.

In one embodiment, there exists one parameter in the second parameter group not belonging to the first parameter group.

In one embodiment, a number of parameters comprised in the first parameter group is equal to a number of parameters comprised in the second parameter group, and parameters comprised in the first parameter group respectively correspond to parameters comprised in the second parameter group; there exists a parameter in the second parameter group being not equal to a parameter corresponding to the first parameter group.

In one embodiment, a timing relation between the first signaling and the second signaling is used to determine the target parameter group out of the first parameter group and the second parameter group.

In one embodiment, a timing relation between the first signaling and the second signaling includes: a precedence relation between a start time of time-domain resources occupied by the first signaling and a start time of time-domain resources occupied by the second signaling.

In one embodiment, a timing relation between the first signaling and the second signaling includes: a precedence relation between an end time of time-domain resources occupied by the first signaling and an end time of time-domain resources occupied by the second signaling.

In one embodiment, a timing relation between the first signaling and the second signaling includes: a precedence relation between a start time of time-domain resources occupied by the first signaling and an end time of time-domain resources occupied by the second signaling.

In one embodiment, a timing relation between the first signaling and the second signaling includes: a precedence relation between an end time of time-domain resources occupied by the first signaling and a start time of time-domain resources occupied by the second signaling.

In one embodiment, the UE drops transmitting in the second radio resource block.

Embodiment 23

Embodiment 23 illustrates a flowchart of wireless transmission according to one embodiment in the present disclosure, as shown in FIG. 23. In FIG. 23, a base station N3 is a maintenance base station for a serving cell of a UE U4. In FIG. 23, the steps in blocks marked by F231 and F232 are respectively optional.

The N3 transmits first information in step S23301; transmits a first signaling and a second signaling in step S2331; transmits a second radio signal in step S23302; and receives a first radio signal in a first radio resource block in step S2332.

The U4 receives first information in step S23401; receives a first signaling and a second signaling in step S2341; receives a second radio signal in step S23402; and transmits a first radio signal in a first radio resource block in step S2342.

In Embodiment 23, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the N3 is the base station in the present disclosure.

In one embodiment, the U4 is the UE in the present disclosure.

In one embodiment, the second signaling is used to determine time-frequency resources occupied by the second radio signal, and the second radio signal is used to generate the second bit block.

In one embodiment, the first information is used to determine K parameter groups, K being a positive integer greater than 1; the first parameter group is one of the K parameter groups; the first signaling indicates the first parameter group out of the K parameter groups.

In one embodiment, the target parameter group comprises a target scaling coefficient; a number of REs occupied by the second sub-signal in the first radio resource block is not greater than a product of a number of REs comprised in the first radio resource block and the target scaling coefficient.

In one embodiment, the target parameter group comprises a target offset; a first-type value is used to determine a number of REs occupied by the second sub-signal in the first radio resource block, and the first-type value is related to the target offset.

In one embodiment, the target parameter group comprises only the target scaling coefficient out of the target scaling coefficient and the target offset.

In one embodiment, the target parameter group comprises only the target offset out of the target scaling coefficient and the target offset.

In one embodiment, the target parameter group comprises the target scaling coefficient and the target offset.

In one embodiment, the target parameter group comprises at least one of the target offset or the target scaling coefficient, the first parameter group comprises at least one of a first offset or a first scaling coefficient, and the second parameter group comprises at least one of a second offset or a second scaling coefficient.

In one subembodiment of the above embodiment, the target parameter group comprises only the target scaling coefficient out of the target offset and the target scaling coefficient, the first parameter group comprises only the first scaling coefficient out of the first offset and the first scaling coefficient, and the second parameter group comprises only the second scaling coefficient out of the second offset and the second scaling coefficient. When the target parameter is the first parameter group, the target scaling coefficient is the first scaling coefficient; when the target parameter is the second parameter group, the target scaling coefficient is the second scaling coefficient.

In one subembodiment of the above embodiment, the target parameter group comprises only the target offset out of the target offset and the target scaling coefficient, the first parameter group comprises only the first offset out of the first offset and the first scaling coefficient, and the second parameter group comprises only the second offset out of the second offset and the second scaling coefficient. When the target parameter is the first parameter group, the target offset is the first offset; when the target parameter is the second parameter group, the target offset is the second offset.

In one subembodiment of the above embodiment, the target parameter group comprises the target offset and the target scaling coefficient, the first parameter group comprises the first offset and the first scaling coefficient, and the second parameter group comprises the second offset and the second scaling coefficient. When the target parameter group is the first parameter group, and the target offset and the target scaling coefficient are respectively the first offset and the first scaling coefficient; when the target parameter group is the second parameter group, and the target offset and the target scaling coefficient are respectively the second offset and the second scaling coefficient.

In one embodiment, when the first signaling is not earlier than the second signaling in time domain, the target parameter group is the first parameter group.

In one embodiment, when the first signaling is earlier than the second signaling in time domain, the target parameter group is the second parameter group.

In one embodiment, when the first signaling is earlier than the second signaling in time domain, only the first signaling in the first signaling and the second signaling is used to determine the target parameter group out of the first parameter group and the second parameter group.

In one embodiment, when the first signaling is earlier than the second signaling in time domain, only the second signaling in the first signaling and the second signaling is used to determine the target parameter group out of the first parameter group and the second parameter group.

In one embodiment, when the first signaling is earlier than the second signaling in time domain, the first signaling and the second signaling are used to determine the target parameter group out of the first parameter group and the second parameter group.

In one embodiment, the first signaling is used to determine the second parameter group.

In one embodiment, the second parameter group is unrelated to the first signaling.

In one embodiment, the first signaling is transmitted on a downlink physical layer control channel (i.e., a downlink channel only capable of bearing a physical layer signaling).

In one embodiment, the second signaling is transmitted on a downlink physical layer control channel (i.e., a downlink channel capable of bearing a physical layer signaling).

In one embodiment, the downlink physical-layer control channel is a Physical Downlink Control Channel (PDCCH).

In one embodiment, the downlink physical-layer control channel is a short PDCCH (sPDCCH).

In one embodiment, the downlink physical-layer control channel is a New Radio PDCCH (NR-PDCCH).

In one embodiment, the downlink physical-layer control channel is a Narrow Band PDCCH (NB-PDCCH).

In one embodiment, the first signaling is transmitted on a downlink physical-layer data channel (i.e., a downlink channel capable of bearing physical layer data).

In one embodiment, the first information is transmitted on a downlink physical layer data channel (i.e., a downlink channel capable of bearing physical layer data).

In one embodiment, the downlink physical-layer data channel is a Physical Downlink Shared CHannel (PDSCH).

In one embodiment, the downlink physical-layer data channel is a short PDSCH (sPDSCH).

In one embodiment, the downlink physical-layer data channel is a New Radio PDSCH (NR-PDSCH).

In one embodiment, the downlink physical-layer data channel is a Narrow Band PDSCH (NB-PDSCH).

In one embodiment, the first radio signal is transmitted on an uplink physical-layer data channel (i.e., an uplink channel capable of bearing physical layer data).

In one embodiment, the UL physical-layer data channel is a Physical Uplink Shared CHannel (PUSCH).

In one subembodiment, the UL physical-layer data channel is an sPUSCH.

In one embodiment, the uplink physical layer data channel is an NR-PUSCH.

In one embodiment, the UL physical-layer data channel is a Narrow Band PUSCH (NB-PUSCH).

Embodiment 24

Embodiment 24 illustrates a schematic diagram of a first signaling being used to determine a first radio resource block and a size of a first bit block according to one embodiment of the present disclosure, as shown in FIG. 24.

In one embodiment, the first signaling is a physical-layer signaling.

In one embodiment, the first signaling is a dynamic signaling.

In one embodiment, the first signaling is a layer 1 (L1) signaling.

In one embodiment, the first signaling is a L1 control signaling.

In one embodiment, the first signaling is a dynamic signaling used for an UpLink Grant.

In one embodiment, the first signaling is a dynamic signaling used for a Configured UL grant.

In one embodiment, the first signaling is a dynamic signaling used for a Configured UL grant activation.

In one embodiment, the first signaling comprises DCI.

In one embodiment, the first signaling comprises DCI for an UpLink Grant.

In one embodiment, the first signaling comprises DCI for a Configured UL grant.

In one embodiment, the first signaling comprises DCI for a Configured UL grant activation.

In one embodiment, the first signaling comprises DCI for a Configured UL grant Type 2 activation.

In one embodiment, the first signaling is UE-specific.

In one embodiment, the first signaling comprises DCI identified by a Cell Radio Network Temporary Identifier (C-RNTI).

In one embodiment, the first signaling comprises DCI that a CRC is scrambled by a C-RNTI.

In one embodiment, the first signaling comprises DCI identified by a CS-RNTI.

In one embodiment, the first signaling comprises DCI that a CRC is scrambled by a CS-RNTI.

In one embodiment, the first signaling comprises DCI identified by an MCS-C-RNTI.

In one embodiment, the first signaling comprises DCI that a CRC is scrambled by an MCS-C-RNTI.

In one embodiment, the first signaling is a higher-layer signaling.

In one embodiment, the first signaling is an RRC signaling.

In one embodiment, the first signaling is a MAC CE signaling.

In one embodiment, the first signaling indicates the first radio resource block.

In one embodiment, the first signaling explicitly indicates the first radio resource block.

In one embodiment, the first signaling comprises a first field, and the first field of the first signaling indicates frequency-domain resources occupied by the first radio resource block.

In one subembodiment of the above embodiment, the first field in the first signaling comprises all or partial information in a Frequency domain resource assignment field.

In one embodiment, the first signaling comprises a second field, and the second field of the first signaling indicates time-domain resources occupied by the first radio resource block.

In one subembodiment of the above embodiment, the second field in the first signaling comprises all or partial information in a Time domain resource assignment field.

In one embodiment, the specific meaning of the Frequency domain resource assignment field can be found in 3GPP TS38.212.

In one embodiment, the specific meaning of the Time domain resource assignment field can be found in 3GPP TS38.212.

In one embodiment, the first signaling indicates scheduling information of the first radio signal in the present disclosure.

In one embodiment, scheduling information of the first radio signal comprise one or more of occupied time-domain resources, occupied frequency-domain resources, a scheduled MCS, configuration information of DeModulation Reference Signals (DMRS), a Hybrid Automatic Repeat reQuest (HARQ) process number, a Redundancy Version (RV), and a New Data Indicator (NDI) of the first radio signal.

In one embodiment, the configuration information of DMRS comprises one or more of occupied time domain resources, occupied frequency domain resources, occupied code domain resources, an RS sequence, a mapping mode, a DMRS type, a cyclic shift, an Orthogonal Cover Code (OCC) of the DMRS, $w_f(k')$ and $w_t(l')$. The $w_f(k')$ and the $w_t(l')$ are spread spectrum sequences in frequency domain and time domain respectively, and the specific meaning of the $w_f(k')$ and the $w_t(l')$ can be found in 3GPP TS38.211, section 6.4.1.

In one embodiment, the first signaling indicates a size of the first bit block.

In one embodiment, the first signaling implicitly indicates a size of the first bit block.

In one embodiment, a size of the first bit block is related to a number of REs comprised in the first radio resource block.

In one embodiment, a size of the first bit block is related to a scheduled MCS of the first radio signal.

In one embodiment, the first signaling indicates the first radio resource block and a scheduled MCS of the first radio signal, and a number of REs comprised in the first radio signal and a scheduled MCS of the first radio signal are used together to determine a size of the first bit block.

In one embodiment, the first signaling indicates the first parameter group in the present disclosure.

In one embodiment, the first signaling explicitly indicates the first parameter group in the present disclosure.

In one embodiment, the first signaling comprises a fourth field, and the fourth field in the first signaling indicates the first parameter group in the present disclosure.

In one subembodiment of the above embodiment, the fourth field in the first signaling comprises all or partial information in a beta_offset indicator field.

In one subembodiment of the above embodiment, the fourth field in the first signaling indicates the first parameter group out of the K parameter groups in the present disclosure.

In one embodiment, the specific meaning of the beta_offset indicator field can be found in 3GPP TS38.212.

Embodiment 25

Embodiment 25 illustrates a schematic diagram of a second signaling being used to determine a second radio resource block and a second bit block according to one embodiment of the present disclosure, as shown in FIG. 25.

In one embodiment, the second signaling is a physical-layer signaling.

In one embodiment, the second signaling is a dynamic signaling.

In one embodiment, the second signaling is a L1 signaling.

In one embodiment, the second signaling is a L1 control signaling.

In one embodiment, the second signaling is a dynamic signaling used for a Downlink Grant.

In one embodiment, the second signaling comprises DCI.

In one embodiment, the second signaling comprises DCI for a DownLink Grant.

In one embodiment, the second signaling is UE-specific.

In one embodiment, the second signaling comprises DCI identified by a C-RNTI.

In one embodiment, the second signaling comprises DCI that a CRC is scrambled by a C-RNTI.

In one embodiment, the second signaling comprises DCI identified by an MCS-C-RNTI.

In one embodiment, the second signaling comprises DCI that a CRC is scrambled by an MCS-C-RNTI.

In one embodiment, the second signaling indicates the second radio resource block.

In one embodiment, the second signaling explicitly indicates the second radio resource block.

In one embodiment, the second signaling implicitly indicates the second radio resource block.

In one embodiment, the second signaling comprises a third field, and the third field in the second signaling indicates the second radio resource block.

In one subembodiment of the above embodiment, the third field in the second signaling comprises all or partial information in a PUCCH resource indicator field.

In one subembodiment of the above embodiment, the third field in the second signaling comprises all or partial information in a PDSCH-to-HARQ_feedback timing indicator field.

In one embodiment, the specific meaning of the PUCCH resource indicator field can be found in 3GPP TS38. 212.

In one embodiment, the specific meaning of the DSCH-to-HARQ_feedback timing indicator field can be found in 3GPP TS38. 212.

In one embodiment, the second signaling indicates an index of the second radio resource block, and an index of the second radio resource block is an index of a Physical Uplink Control CHannel (PUCCH) resource.

In one embodiment, the second signaling indicates scheduling information of the second radio signal in the present disclosure, and the second bit block indicates whether the second radio signal is correctly received.

In one embodiment, the second radio signal in the present disclosure comprises a downlink reference signal, the second signaling indicates configuration information of the downlink reference signal, and a measurement performed on the downlink reference signal is used to determine the second bit block.

Embodiment 26

Embodiment 26 illustrates a schematic diagram of a resource mapping of a first radio resource block and a second radio resource block in time-frequency domain according to one embodiment of the present disclosure, as shown in FIG. 26. In Embodiment 26, the first radio resource block is not orthogonal to the second radio resource block in time domain.

In one embodiment, the first radio resource block comprises a time-frequency resource block.

In one embodiment, the first radio resource block only comprises a time-frequency resource block.

In one embodiment, the first radio resource block comprises only the time-frequency resource block out of a time-frequency resource block and a code-domain resource.

In one embodiment, the time-frequency block comprises at least one RE.

In one embodiment, the time-frequency resource block comprises at least one multi-carrier symbol in time domain.

In one embodiment, the time-frequency resource block comprises at least one sub-carrier in frequency domain.

In one embodiment, the time-frequency resource block comprises at least one Resource Block (RB) in frequency domain.

In one embodiment, the time-frequency resource block comprises at least one Physical Resource Block (PRB) infrequency domain.

In one embodiment, the first radio resource block comprises at least one the RE in time-frequency domain.

In one embodiment, the first radio resource block comprises at least one multi-carrier symbol in time domain.

In one embodiment, the first radio resource block comprises at least one consecutive multi-carrier symbols in time domain.

In one embodiment, the first radio resource block comprises at least one sub-carrier in frequency domain.

In one embodiment, the first radio resource block comprises at least one RB in frequency domain.

In one embodiment, the first radio resource block comprises at least consecutive PRB in frequency domain.

In one embodiment, the first radio resource block comprises at least one PRB in frequency domain.

In one embodiment, the first radio resource block comprises at least one consecutive PRB in frequency domain.

In one embodiment, the second radio resource block comprises a time-frequency resource block.

In one embodiment, the second radio resource block comprise a time-frequency resource block and a code-domain resource.

In one embodiment, the code-domain resource comprises one or more of pseudo-random sequences, low-PAPR sequences, a cyclic shift, an Orthogonal Cover Code (OCC), an OCC length, an OCC index, an orthogonal sequence, $r_{u,v}^{(\alpha,\delta)}(n)$, $w_i(m)$), and $w_n(m)$. The $r_{u,v}^{(\alpha,\delta)}(n)$ is a pseudo-random sequence or a low-PAPR sequence, and the $w_i(m)$ and the $w_n(m)$ are respectively orthogonal sequences. The specific meanings of the $r_{u,v}^{(\alpha,\delta)}(n)$, the $w_i(m)$ and the $w_n(m)$ can be found in 3GPP TS38.211, section 6.3.2.

In one embodiment, the second radio resource block comprises at least one the RE in time-frequency domain.

In one embodiment, the second radio resource block comprises at least one multi-carrier symbol in time domain.

In one embodiment, the second radio resource block comprises at least one consecutive multi-carrier symbols in time domain.

In one embodiment, the second radio resource block comprises at least one sub-carrier in frequency domain.

In one embodiment, the second radio resource block comprises at least one RB in frequency domain.

In one embodiment, the second radio resource block comprises at least consecutive RBs in frequency domain.

In one embodiment, the second radio resource block comprises at least one PRB in frequency domain.

In one embodiment, the second radio resource block comprises at least one consecutive PRBs in frequency domain.

In one embodiment, the second radio resource block is a PUCCH resource.

In one embodiment, time-domain resources occupied by the first radio resource block and the second radio resource block are completely the same.

In one embodiment, time-domain resources occupied by the first radio resource block and the second radio resource block are partially overlapped.

In one embodiment, an end time of time-domain resources occupied by the first radio resource block is not later than an end time of time-domain resources occupied by the second radio resource block.

In one embodiment, a start time of time-domain resources occupied by the first radio resource block is not earlier than a start time of time-domain resources occupied by the second radio resource block.

In one embodiment, time-domain resources occupied by the first radio resource block and the second radio resource block belong to a same slot.

In one embodiment, time-domain resources occupied by the first radio resource block and the second radio resource block belong to a same mini-slot.

In one embodiment, time-domain resources occupied by the first radio resource block and the second radio resource block belong to a same sub-slot.

In one embodiment, time-domain resources occupied by the first radio resource block and the second radio resource block belong to a same subframe.

In one embodiment, the first radio resource block and the second radio resource block belong to a same carrier in frequency domain.

In one embodiment, the first radio resource block and the second radio resource block belong to a same Bandwidth Part (BWP) in frequency domain.

In one embodiment, the first radio resource block and the second radio resource block belong to different carriers in frequency domain.

In one embodiment, the first radio resource block and the second radio resource block belong to different BWPs infrequency domain.

In one embodiment, the first radio resource block is reserved for the first bit block in the present disclosure.

In one embodiment, the first radio resource block is reserved for a bit carried by the first sub-signal in the present disclosure.

In one embodiment, the first radio resource block is reserved for information carried by the first sub-signal in the present disclosure.

In one embodiment, the first radio resource block comprises a first radio resource sub-block and a second radio resource sub-block, the first radio resource sub-block and the second radio resource sub-block are respectively reserved for information carried by the first sub-signal in the present disclosure and information carried the second sub-signal in the present disclosure.

In one subembodiment of the above embodiment, the first radio resource sub-block and the second radio resource sub-block are mutually-orthogonal in time-frequency domain.

In one subembodiment of the above embodiment, the second sub-signal only occupies the RE in the second radio resource sub-block out of the first radio resource sub-block and the second radio resource sub-block.

In one subembodiment of the above embodiment, the second sub-signal occupies the RE in the first radio resource sub-block and the RE in the second radio resource sub-block.

Embodiment 27

Embodiment 27 illustrates a schematic diagram of a resource mapping of a first radio resource block and a second radio resource block in time-frequency domain according to one embodiment of the present disclosure, as shown in FIG. 27.

In one embodiment, the first radio resource block comprises at least inconsecutive RBs in frequency domain.

In one embodiment, the first radio resource block comprises at least one inconsecutive PRBs in frequency domain.

In one embodiment, the second radio resource block comprises at least inconsecutive RBs in frequency domain.

In one embodiment, the second radio resource block comprises at least one inconsecutive PRBs in frequency domain.

Embodiment 28

Embodiment 28 illustrates a schematic diagram of a target parameter group comprising a target scaling coefficient according to one embodiment of the present disclosure; as shown in FIG. 28. In Embodiment 28, the target parameter group comprises the target scaling coefficient, the first parameter group in the present disclosure comprises a first scaling coefficient, and the second parameter group in the present disclosure comprises a second scaling coefficient. When the target parameter is the first parameter group, the target scaling coefficient is the first scaling coefficient; when the target parameter is the second parameter group, the target scaling coefficient is the second scaling coefficient; a number of REs occupied by the second sub-signal in the present disclosure in the first radio resource block in the present disclosure is not greater than a product of a number of REs comprised in the first radio resource block and the target scaling coefficient.

In one embodiment, a number of parameters comprised in the first parameter group, the second parameter group and the target parameter group are the same.

In one embodiment, the first scaling coefficient is not equal to the second scaling coefficient.

In one embodiment, the first scaling coefficient is not greater than the second scaling coefficient.

In one embodiment, the first scaling coefficient is less than the second scaling coefficient.

In one embodiment, the target scaling coefficient is a non-negative real number not greater than 1.

In one embodiment, the target scaling coefficient is a positive real number not greater than 1.

In one embodiment, the target scaling coefficient is equal to 1.

In one embodiment, the target scaling coefficient is less than 1.

In one embodiment, the target scaling coefficient is one of 0.5, 0.65, 0.8 or 1.

In one embodiment, the target scaling coefficient is higher-layer parameter scaling.

In one embodiment, the specific meaning of the higher-layer parameter scaling can be found in 3GPP TS38.212, section 6.3.2 and in 3GPP TS38.331.

In one embodiment, the target scaling coefficient is a.

In one embodiment, the specific meaning of the a can be found in 3GPP TS38.212, section 6.3.2.

In one embodiment, when the target parameter group comprises the target scaling coefficient, the first parameter group comprises the first scaling coefficient, and the second parameter group comprises the second scaling coefficient.

In one embodiment, the first scaling coefficient and the second scaling coefficient are respectively non-negative real numbers not greater than 1.

In one embodiment, the first scaling coefficient and the second scaling coefficient are respectively positive real numbers not greater than 1.

In one embodiment, the first scaling coefficient and the second scaling coefficient are respectively one of 0.5, 0.65, 0.8 or 1.

In one embodiment, the first scaling coefficient and the second scaling coefficient are respectively higher-layer parameter scaling.

In one embodiment, the first scaling coefficient and the second scaling coefficient are respectively a.

In one embodiment, the first scaling coefficient is equal to 1.

In one embodiment, the first scaling coefficient is less than 1.

In one embodiment, the second scaling coefficient is equal to 1.

In one embodiment, the second scaling coefficient is less than 1.

In one embodiment, a number of REs occupied by the second sub-signal in the first radio resource block is less than a product of a number of REs comprised in the first radio resource block and the target scaling coefficient.

In one embodiment, a number of REs occupied by the second sub-signal in the first radio resource block is equal to a product of a number of REs comprised in the first radio resource block and the target scaling coefficient.

Embodiment 29

Embodiment 29 illustrates a schematic diagram of a target parameter group comprising a target offset according to one embodiment of the present disclosure, as shown in FIG. 29. In Embodiment 29, the target parameter group comprises the target offset, the first parameter group in the present disclosure comprises a first offset, and the second parameter group in the present disclosure comprises a second offset. When the target parameter is the first parameter group, the target offset is the first offset; when the target parameter is the second parameter group, the target offset is the second offset.

In one embodiment, the first offset is not equal to the second offset.

In one embodiment, the first offset is not greater than the second offset.

In one embodiment, the first offset is less than the second offset.

In one embodiment, the target offset is a non-negative real number.

In one embodiment, the target offset is greater than 1.

In one embodiment, the target offset is equal to 1.

In one embodiment, the target offset is less than 1.

In one embodiment, the target offset is equal to 0.

In one embodiment, the target offset is greater than 0.

In one embodiment, the target offset is $\beta_{offset}^{HARQ-ACK}$.

In one embodiment, the specific meaning of the $\beta_{offset}^{HARQ-ACK}$ can be found in 3GPP TS38.212, section 6.3.2.

In one embodiment, the target offset is $\beta_{offset}^{CSI-1}$.

In one embodiment, the specific meaning of the $\beta_{offset}^{CSI-1}$ can be found in 3GPP TS38.212, section 6.3.2.

In one embodiment, the target offset is $\beta_{offset}^{CSI-2}$.

In one embodiment, the specific meaning of the $\beta_{offset}^{CSI-2}$ can be found in 3GPP TS38.212, section 6.3.2.

In one embodiment, the target offset is $\beta_{offset}^{AUL-UCI}$.

In one embodiment, the specific meaning of the $\beta_{offset}^{AUL-UCI}$ can be found in 3GPP TS36.212 (V15.3.0), section 5.2.

In one embodiment, the target offset is determined by higher-layer parameters betaOffsetACK-Index1, betaOffsetACK-Index2 and betaOffsetACK-Index3.

In one embodiment, the specific meanings of the higher-layer parameters betaOffsetACK-Index1, betaOffsetACK-Index2 and betaOffsetACK-Index3 can be found in 3GPP TS38.213, section 9.3 and in 3GPP TS38.331.

In one embodiment, the target offset is determined by higher-layer parameters betaOffsetCSI-Part1-Index1 and betaOffsetCSI-Part1-Index2.

In one embodiment, the specific meanings of the higher-layer parameters betaOffsetCSI-Part1-Index1 and betaOffsetCSI-Part1-Index2 can be found in 3GPP TS38.213, section 9.3 and in 3GPP TS38.331.

In one embodiment, the target offset is determined by higher-layer parameters betaOffsetCSI-Part2-Index1 and betaOffsetCSI-Part2-Index2.

In one embodiment, the specific meanings of the higher-layer parameters betaOffsetCSI-Part2-Index1 and betaOffsetCSI-Part2-Index2 can be found in 3GPP TS38.213, section 9.3 and in 3GPP TS38.331.

In one embodiment, when the target parameter group comprises the target offset, the first parameter group comprises the first offset, and the second parameter group comprises the second offset.

In one embodiment, the first offset and the second offset are respectively non-negative real numbers.

In one embodiment, the first offset and the second offset are respectively $\beta_{offset}^{HARQ-ACK}$.

In one embodiment, the first offset and the second offset are respectively $\beta_{offset}^{CSI-1}$.

In one embodiment, the first offset and the second offset are respectively $\beta_{offset}^{CSI-2}$.

In one embodiment, the first offset and the second offset are respectively $\beta_{offset}^{AUL-UCI}$.

In one embodiment, the first offset and the second offset are determined by higher-layer parameters betaOffsetACK-Index1, betaOffsetACK-Index2 and betaOffsetACK-Index3.

In one embodiment, the first offset and the second offset are determined by higher-layer parameters betaOffsetCSI-Part1-Index1 and betaOffsetCSI-Part1-Index2.

In one embodiment, the first offset and the second offset are determined by higher-layer parameters betaOffsetCSI-Part2-Index1 and betaOffsetCSI-Part2-Index2.

Embodiment 30

Embodiment 30 illustrates a schematic diagram of a target parameter group comprising a target scaling coefficient and a target offset according to one embodiment of the present disclosure, as shown in FIG. 30. In Embodiment 30, the target parameter group comprises the target scaling coefficient and the target offset, the first parameter group in the present disclosure comprises a first scaling coefficient and a first offset, and the second parameter group in the present disclosure comprises a second scaling coefficient and a second offset.

Embodiment 31

Embodiment 31 illustrates a schematic diagram of a first-type value being used to determine a number of REs occupied by a second sub-signal in a first radio resource block according to one embodiment of the present disclosure; as shown in FIG. 10. In Embodiment 31, a number of REs occupied by the second sub-signal in the first radio resource block is equal to a minimum value of a first value and a first limiting value, and the first value is obtained after a product of the first-type value and a number of bits comprised in the second bit block in the present disclosure is rounded up to an integer. In FIG. 31, the symbol $\lceil \cdot \rceil$ represents being rounded up to an integer.

In one embodiment, the first-type value is a positive real number.

In one embodiment, the first value is a minimum positive integer not less than the first-type value.

In one embodiment, the first limiting value is a positive integer.

In one embodiment, the first limiting value is $\lceil \alpha \Sigma_{l=l_0}^{N^{PUSCH}_{symb,all}-1} M_{sc}^{UCI}(l) \rceil$, where the $\alpha$ is a higher-layer parameter scaling, the $l_0$ is an index of a first multicarrier symbol occupied by a PUSCH and not comprising a DMRS, the $N_{symb,all}^{PUSCH}$ is a number of multicarrier symbols occupied by a PUSCH, and the $M_{sc}^{UCI}(l)$ is a number of REs that can be occupied by UCI on l-th multicarrier symbol. The first radio signal in the present disclosure is transmitted on the PUSCH. The specific meanings of the $\lceil \alpha \Sigma_{l=l_0}^{N^{PUSCH}_{symb,all}-1} M_{sc}^{UCI}(l) \rceil$, the $\alpha$, the $l_0$, the $N_{symb,all}^{PUSCH}$ and the $M_{sc}^{UCI}(l)$ can be found in 3GPP TS38.212, section 6.3.2.4.

In one embodiment, the first limiting value is $\lceil \alpha \Sigma_{l=0}^{N^{PUSCH}_{symb,all}-1} M_{sc}^{UCI}(l) \rceil - Q'_{ACK}$, and the $Q'_{ACK}$ is a number of REs occupied by an HARQ-ACK. The second bit block carries an HARQ-ACK. The specific meanings of the $\lceil \alpha \Sigma_{l=0}^{N^{PUSCH}_{symb,all}-1} M_{sc}^{UCI}(l) \rceil - Q'_{ACK}$, the $\alpha$, the $N_{symb,all}^{PUSCH}$, the $M_{sc}^{UCI}(l)$ and the $Q'_{ACK}$ can be found in 3GPP TS38.212, section 6.3.2.4.

In one embodiment, the first limiting value is $\Sigma_{l=0}^{N^{PUSCH}_{symb,all}-1} M_{sc}^{UCI}(l) - Q'_{ACK}$. The specific meanings of the $[\Sigma_{l=0}^{N^{PUSCH}_{symb,all}-1} M_{sc}^{UCI}(l)] - Q'_{ACK}$, the $N_{symb,all}^{PUSCH}$, the $M_{sc}^{UCI}(l)$ and the $Q'_{ACK}$ can be found in 3GPP TS38.212, section 6.3.2.4.

In one embodiment, the first limiting value is $\lceil \alpha \Sigma_{l=0}^{N^{PUSCH}_{symb,all}-1} M_{sc}^{UCI}(l) \rceil - Q'_{ACK} - Q'_{CSI-1}$, and the $Q'_{CSI-1}$ is a number of REs occupied by CSI part 1. The specific meanings of the $\lceil \alpha \Sigma_{l=0}^{N^{PUSCH}_{symb,all}-1} M_{sc}^{UCI}(l) \rceil - Q'_{ACK} - Q'_{CSI-1}$, the $\alpha$, the $N_{symb,all}^{PUSCH}$, the $M_{sc}^{UCI}(l)$, the $Q'_{ACK}$ and the $Q'_{CSI-1}$ can be found in 3GPP TS38.212, section 6.3.2.4.

In one embodiment, the first limiting value is $M_{sc}^{PUSCH} \cdot N_{symb}^{PUSCH}$, the $M_{sc}^{PUSCH}$ is a bandwidth configured by a latest AUL activation DCI, and the $N_{symb}^{PUSCH}$ is a number of multicarrier symbols allocated to a PUSCH. The first radio signal in the present disclosure is transmitted on the PUSCH. The specific meaning of the $M_{sc}^{PUSCH}$ and the $N_{symb}^{PUSCH}$ can be found in 3GPP TS36.212, section 5.2.2.

Embodiment 32

Embodiment 32 illustrates a schematic diagram of a relation between a first-type value and a target offset according to one embodiment of the present disclosure, as shown in FIG. 32. In Embodiment 32, the first-type value is equal to a product of a first-type reference value and the target offset, and the first-type reference value is related to a number of REs comprised in the first radio resource block in the present disclosure and a number of bits comprised in the first bit block in the present disclosure.

In one embodiment, the first-type value is linearly related to the target offset.

In one embodiment, the first-type reference value is a positive real number.

In one embodiment, the first-type reference value is equal to $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$ is a number of code blocks comprised in a PUSCH, the $K_r$ is a number of bits comprised in an r-th code block, the $N_{symb,all}^{PUSCH}$ is a number of multicarrier symbols occupied by a PUSCH, the $M_{sc}^{UCI}(l)$ is a number of REs that can be occupied by UCI on an l-th multicarrier symbol. The first radio signal in the present disclosure is transmitted on the PUSCH. The specific meanings of the $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$, the $K_r$, the $N_{symb,all}^{PUSCH}$ and the $M_{sc}^{UCI}(l)$ can be found in 3GPP TS38.212, section 6.3.2.4.

In one embodiment, the first-type reference value is equal to $$\frac{1}{R \cdot Q_m},$$

the R is a code rate of a PUSCH, and the $Q_m$ is a modulation order of a PUSCH. The first radio signal in the present disclosure is transmitted on the PUSCH. The specific meanings of the $$\frac{1}{R \cdot Q_m},$$

the R and the $Q_m$ can be found in 3GPP TS38.212, section 6.3.2.4.

In one embodiment, the first-type reference value is equal to $$\frac{M_{sc}^{PUSCH-initial(x)} N_{symb}^{PUSCH-initial(x)}}{\sum_{r=0}^{C^{(x)}-1} K_r^{(x)}},$$

the x is an index of one TB block corresponding to a largest $I_{MCS}$ among TB blocks carried by a PUSCH, the $C^{(x)}$ is a number of code blocks comprised in a TB block indexed as x, the $K_r^{(x)}$ is a number of bits comprised in an r-th code block in a TB block indexed as x, the $M_{sc}^{PUSCH-initial(x)}$ is a number of multicarrier symbols occupied by a first transmission of a TB block indexed as x, the $N_{symb}^{PUSCH-initial(x)}$ is a bandwidth occupied by a first transmission of a TB block indexed as x. The first radio signal in the present disclosure is transmitted on the PUSCH. The specific meanings of $$\frac{M_{sc}^{PUSCH-initial(x)} N_{symb}^{PUSCH-initial(x)}}{\sum_{r=0}^{C^{(x)}-1} K_r^{(x)}},$$

the x, the $C^{(x)}$, the $K_r^{(x)}$, the $M_{sc}^{PUSCH-initial(x)}$ and the $N_{symb}^{PUSCH-initial(x)}$ can found in 3GPP TS36.212, section 5.2.2.

Embodiment 33

Embodiment 33 illustrates a schematic diagram of a timing relation between the first signaling and the second signaling being used to determine the target parameter group according to one embodiment of the present disclosure; as shown in FIG. 33. In Embodiment 33, when the first signaling is not earlier than the second signaling in time domain, the target parameter group is the first parameter group in the present disclosure; when the first signaling is earlier than the second signaling in time domain, the target parameter group is the second parameter group in the present disclosure.

In one embodiment, the first signaling being not earlier than the second signaling in time domain includes: a start time of time-domain resources occupied by the first signaling is not earlier than a start time of time-domain resources occupied by the second signaling.

In one embodiment, the first signaling being not earlier than the second signaling in time domain includes: an end time of time-domain resources occupied by the first signaling is not earlier than an end time of time-domain resources occupied by the second signaling.

In one embodiment, the first signaling being not earlier than the second signaling in time domain includes: a start time of time-domain resources occupied by the first signaling is not earlier than an end time of time-domain resources occupied by the second signaling.

In one embodiment, the first signaling being not earlier than the second signaling in time domain includes: a start time of time-domain resources occupied by the first signaling is later than a start time of time-domain resources occupied by the second signaling.

In one embodiment, the first signaling being not earlier than the second signaling in time domain includes: an end time of time-domain resources occupied by the first signaling is later than an end time of time-domain resources occupied by the second signaling.

In one embodiment, the first signaling being not earlier than the second signaling in time domain includes: a start time of time-domain resources occupied by the first signaling is later than an end time of time-domain resources occupied by the second signaling.

In one embodiment, the first signaling being earlier than the second signaling in time domain includes: a start time of time-domain resources occupied by the first signaling is earlier than a start time of time-domain resources occupied by the second signaling.

In one embodiment, the first signaling being earlier than the second signaling in time domain includes: an end time of time-domain resources occupied by the first signaling is earlier than an end time of time-domain resources occupied by the second signaling.

In one embodiment, the first signaling being earlier than the second signaling in time domain includes: an end time of time-domain resources occupied by the first signaling is earlier than a start time of time-domain resources occupied by the second signaling.

Embodiment 34

Figure 34:
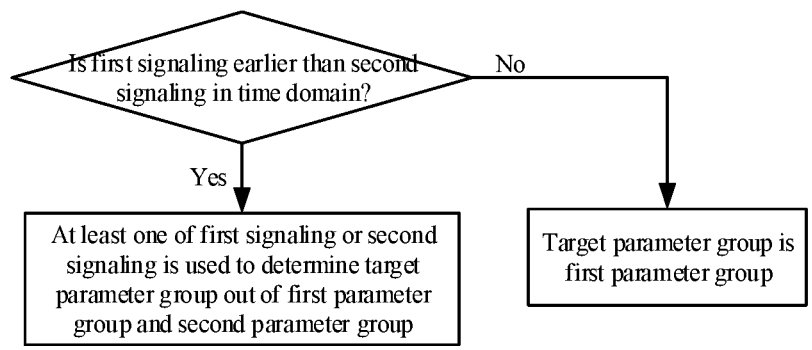
FIG. 34 illustrates a schematic diagram of a timing relation between the first signaling and the second signaling being used to determine the target parameter group according to one embodiment of the present disclosure.

Embodiment 34 illustrates a schematic diagram of a timing relation between the first signaling and the second signaling being used to determine the target parameter group according to one embodiment of the present disclosure, as shown in FIG. 34. In Embodiment 34, when the first signaling is not earlier than the second signaling in time domain, the target parameter group is the first parameter group in the present disclosure; when the first signaling is earlier than the second signaling in time domain, at least one of the first signaling or the second signaling is used to determine the target parameter group out of the first parameter group and the second parameter group in the present disclosure.

In one embodiment, when the first signaling is not earlier than the second signaling in time domain, the target parameter group is the first parameter group; when the first signaling is earlier than the second signaling in time domain, the first signaling is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, only the first signaling in the first signaling and the second signaling is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, the second signaling is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, only the second signaling in the first signaling and the second signaling is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, the first signaling and the second signaling are used to determine the target parameter group out of the first parameter group and the second parameter group.

In one embodiment, when the first signaling is earlier than the second signaling in time domain, a signaling identifier of the second signaling is used to determine the target parameter group out of the first parameter group and the second parameter group.

In one embodiment, the first signaling is earlier than the second signaling in time domain; when a signaling identifier of the second signaling is a signaling identifier in a first signaling identifier subset, the target parameter group is the first parameter group; when a signaling identifier of the second signaling is a signaling identifier in a second signaling identifier subset, the target parameter group is the second parameter group; the first signaling identifier subset and the second signaling identifier subset respectively comprise at least one signaling identifier.

In one subembodiment of the above embodiment, there does not exist a signaling identifier belonging to the first signaling identifier subset and the second signaling identifier subset at the same time.

In one subembodiment of the above embodiment, the first signaling identifier subset comprises a C-RNTI.

In one subembodiment of the above embodiment, the second signaling identifier subset comprises an MCS-C-RNTI.

In one embodiment, a signaling identifier of the second signaling is a signaling identifier in a candidate signaling identifier set, the candidate signaling identifier set comprises at least one signaling identifier, and the candidate signaling identifier set comprises a C-RNTI and an MCS-C-RNTI.

In one embodiment, when the first signaling is earlier than the second signaling in time domain, a signaling format (DCI format) of the second signaling is used to determine the target parameter group out of the first parameter group and the second parameter group.

In one embodiment, the first signaling is earlier than the second signaling in time domain; when a signaling format of the second signaling is a signaling format in a first signaling format subset, the target parameter group is the first parameter group; when a signaling format of the second signaling is a signaling format in a second signaling format subset, the target parameter group is the second parameter group; the first signaling format subset and the second signaling format subset respectively comprise at least one signaling format.

In one subembodiment of the above embodiment, there does not exist a signaling format belonging to the first signaling format subset and the second signaling format subset at the same time.

In one subembodiment of the above embodiment, the first signaling format subset comprises DCI format 1_0 and DCI format 1_1.

In one subembodiment of the above embodiment, the second signaling format subset does not DCI format 10 and DCI format 1_1.

In one embodiment, a signaling format of the second signaling is a signaling format in a candidate signaling format set, the candidate signaling format comprises at least one signaling format, and the candidate signaling format set comprises DCI format 1_0 and DCI format 1_1.

In one embodiment, the specific meanings of the DCI format 1_0 and the DCI format 1_1 can be found in 3GPP TS38.212.

In one embodiment, when the first signaling is earlier than the second signaling in time domain, the second signaling indicates the target parameter group out of the first parameter group and the second parameter group.

In one subembodiment of the above embodiment, the second signaling explicitly indicates the target parameter group out of the first parameter group and the second parameter group.

In one subembodiment of the above embodiment, the second signaling implicitly indicates the target parameter group out of the first parameter group and the second parameter group.

In one subembodiment of the above embodiment, when the second signaling comprises a fifth field, the target parameter group is the second parameter group, the fifth field in the second signaling indicates the second parameter group; when the second signaling does not comprise the fifth field, the target parameter group is the first parameter group.

In one subembodiment of the above embodiment, the second signaling comprises a fifth field, and the fifth field in the second signaling indicates the target parameter group out of the first parameter group and the second parameter group.

In one subembodiment of the above embodiment, the second signaling comprises a fifth field, and the fifth field in the second signaling indicates whether the target parameter group is the first parameter group.

In one embodiment, when the first signaling is earlier than the second signaling in time domain, a signaling identifier of the first signaling is used to determine the target parameter group out of the first parameter group and the second parameter group.

In one embodiment, the first signaling is earlier than the second signaling in time domain; when a signaling identifier of the first signaling is a signaling identifier in a first signaling identifier subset, the target parameter group is the first parameter group; when a signaling identifier of the first signaling is a signaling identifier in a second signaling identifier subset, the target parameter group is the second parameter group; the first signaling identifier subset and the second signaling identifier subset respectively comprise at least one signaling identifier.

In one embodiment, a signaling identifier of the first signaling is a signaling identifier in a candidate signaling identifier set, the candidate signaling identifier set comprises at least one signaling identifier, and the candidate signaling identifier set comprises a C-RNTI, a CS-RNTI and an MCS-C-RNTI.

In one embodiment, when the first signaling is earlier than the second signaling in time domain, a signaling identifier of the first signaling and a signaling identifier of the second signaling are used to determine the target parameter group out of the first parameter group and the second parameter group.

In one embodiment, the first signaling is earlier than the second signaling in time domain; when a signaling identifier of the first signaling and a signaling identifier of the second signaling belong to different signaling identifier subsets in M1 signaling identifier subsets, the target parameter group is the first parameter group; when a signaling identifier of the first signaling and a signaling identifier of the second signaling belong to a same signaling identifier subset in the M1 signaling identifier subsets, the target parameter group is the second parameter group; M1 is a positive integer greater than 1, and any of the M1 signaling identifier subsets comprises at least one signaling identifier.

In one embodiment, the first signaling is earlier than the second signaling in time domain; when a signaling identifier of the first signaling and a signaling identifier of the second signaling belong to a same signaling identifier subset in M1 signaling identifier subsets, the target parameter group is the first parameter group; when a signaling identifier of the first signaling and a signaling identifier of the second signaling belong to different signaling identifier subsets in the M1 signaling identifier subsets, the target parameter group is the second parameter group; M1 is a positive integer greater than 1, and any of the M1 signaling identifier subsets comprises at least one signaling identifier.

In one embodiment, there does not exist a signaling identifier that belongs to different signaling identifier subsets in the M1 signaling identifier subsets.

In one embodiment, when the first signaling is earlier than the second signaling in time domain, a signaling format (DCI format) of the first signaling is used to determine the target parameter group out of the first parameter group and the second parameter group.

In one embodiment, the first signaling is earlier than the second signaling in time domain; when a signaling format of the first signaling is a signaling format in a first signaling format subset, the target parameter group is the first parameter group; when a signaling format of the first signaling is a signaling format in a second signaling format subset, the target parameter group is the second parameter group. The first signaling format subset and the second signaling format subset respectively comprise at least one signaling format.

In one embodiment, a signaling format of the first signaling is a signaling format in a candidate signaling format set, the candidate signaling format set comprises at least one signaling format, and the candidate signaling format set comprises DCI format 0_0 and DCI format 0_1.

In one embodiment, when the first signaling is earlier than the second signaling in time domain, a signaling format (DCI format) of the first signaling and a signaling format of the second signaling are used to determine the target parameter group out of the first parameter group and the second parameter group.

In one embodiment, the first signaling is earlier than the second signaling in time domain; when a signaling format of the first signaling and a signaling format of the second signaling belong to different signaling format subsets in M2 signaling format subsets, the target parameter group is the first parameter group; when a signaling format of the first signaling and a signaling format of the second signaling belong to a same signaling format subset in the M2 signaling format subsets, the target parameter group is the second parameter group; M2 is a positive integer greater than 1, and any of the M2 signaling format subset comprises at least one signaling format.

In one embodiment, the first signaling is earlier than the second signaling in time domain; when a signaling format of the first signaling and a signaling format of the second signaling belong to a same signaling format subset in M2 signaling format subsets, the target parameter group is the first parameter group; when a signaling format of the first signaling and a signaling format of the second signaling belong to different signaling format subsets in the M2 signaling format subsets, the target parameter group is the second parameter group; M2 is a positive integer greater than 1, and any of the M2 signaling format subset comprises at least one signaling format.

In one embodiment, there does not exist a signaling format belonging to different signaling format subsets in the M2 signaling format subsets simultaneously.

In one embodiment, when the first signaling is earlier than the second signaling in time domain, a second time interval is used to determine the target parameter group out of the first parameter group and the second parameter group; the second time interval is a time interval between time-domain resources occupied by the second signaling and time-domain resources occupied by the second radio resource block in the present disclosure.

In one subembodiment of the above embodiment, the second signaling indicates the second time interval.

In one subembodiment of the above embodiment, the second signaling comprises a sixth field, and the sixth field in the second signaling indicates the second time interval. The sixth field in the second signaling comprises all or partial information in a PDSCH-to-HARQ_feedback timing indicator field.

In one subembodiment of the above embodiment, the second time interval is indicated by a higher-layer parameter dl-DataToUL-ACK.

In one subembodiment of the above embodiment, the second time interval is a non-negative integer.

In one subembodiment of the above embodiment, the second time interval is a positive integer.

In one subembodiment of the above embodiment, the second time interval is measured by slot.

In one subembodiment of the above embodiment, a value of the second time interval is K2, the second signaling belongs to n-th slot in time domain, and the second radio resource block belongs to n+K2-th slot in time domain.

In one subembodiment of the above embodiment, when the second time interval is greater than a first threshold, the target parameter group is the first parameter group; when the second time interval is not greater than the first threshold, the target parameter group is the second parameter group.

In one subembodiment of the above embodiment, when the second time interval is less than a first threshold, the target parameter group is the first parameter group; when the second time interval is not less than the first threshold, the target parameter group is the second parameter group.

In one embodiment, when the first signaling is earlier than the second signaling in time domain, a first time interval is used to determine the target parameter group out of the first parameter group and the second parameter group; the first time interval is a time interval between time-domain resources occupied by the first signaling and time-domain resources occupied by the first radio resource block in the present disclosure.

In one subembodiment of the above embodiment, the first signaling indicates the first time interval.

In one subembodiment of the above embodiment, the first time interval is a non-negative integer.

In one subembodiment of the above embodiment, the first time interval is a positive integer.

In one subembodiment of the above embodiment, the first time interval is measured by slot.

In one subembodiment of the above embodiment, a value of the first time interval is K3, the first signaling belongs to n-th slot in time domain, and the first radio resource block belongs to n+K3-th slot in time domain.

In one subembodiment of the above embodiment, the second field in the first signaling indicates the first time interval.

In one subembodiment of the above embodiment, when the first time interval is greater than a first threshold, the target parameter group is the first parameter group; when the first time interval is not greater than the first threshold, the target parameter group is the second parameter group.

In one subembodiment of the above embodiment, when the first time interval is less than a first threshold, the target parameter group is the first parameter group; when the first time interval is not less than the first threshold, the target parameter group is the second parameter group.

In one embodiment, when the first signaling is earlier than the second signaling in time domain, a first time interval and a second time interval are used together to determine the target parameter group out of the first parameter group and the second parameter group; the first time interval is a time interval between time-domain resources occupied by the first signaling and time-domain resources occupied by the first radio resource block, and the second time interval is a time interval between time-domain resources occupied by the second signaling and time-domain resources occupied by the second radio resource block.

In one subembodiment of the above embodiment, when a value obtained by the first time interval minus the second time interval is less than a second threshold, the target parameter group is the first parameter group; when a value obtained by the first time interval minus the second time interval is not less than a second threshold, the target parameter group is the second parameter group.

In one subembodiment of the above embodiment, when a value obtained by the first time interval minus the second time interval is greater than a second threshold, the target parameter group is the first parameter group; when a value obtained by the first time interval minus the second time interval is not greater than a second threshold, the target parameter group is the second parameter group.

In one embodiment, when the first signaling is earlier than the second signaling in time domain, the second radio resource block in the present disclosure is used to determine the target parameter group out of the first parameter group and the second parameter group.

In one embodiment, the first signaling is earlier than the second signaling in time domain; when the second radio resource block belongs to a first radio resource block set, the target parameter group is the first parameter group; when the second radio resource block belongs to a second radio resource block set, the target parameter group is the second parameter group; the first radio resource block set and the second radio resource block set respectively comprise at least one radio resource block.

In one subembodiment of the above embodiment, an intersection of the first radio resource block and the second radio resource block set is empty.

In one embodiment, when the first signaling is not earlier than the second signaling in time domain, the target parameter group is the first parameter group; when the first signaling is earlier than the second signaling in time domain, an MCS table corresponding to the second radio signal is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, an MCS table corresponding to the first sub-signal is used to determine the target parameter group out of the first parameter group and the second parameter group.

In one embodiment, when the first signaling is not earlier than the second signaling in time domain, the target parameter group is the first parameter group; when the first signaling is earlier than the second signaling in time domain, an MCS table corresponding to the second radio signal and an MCS table corresponding to the first sub-signal are used to determine the target parameter group out of the first parameter group and the second parameter group.

In one embodiment, when the first signaling is earlier than the second signaling in time domain, an MCS table corresponding to the second radio signal is used to determine the target parameter group out of the first parameter group and the second parameter group.

In one embodiment, the first signaling is earlier than the second signaling in time domain; when an MCS table corresponding to the second radio signal belongs to a first MCS table set, the target parameter group is the first parameter group; when an MCS table corresponding to the second radio signal belongs to a second MCS table set, the target parameter group is the second parameter group; the first MCS table set and the second MCS table set respectively comprise at least one table in Table 5.1.3.1-1, Table 5.1.3.1-2 and Table 5.1.3.1-3 in 3GPP TS38.214.

In one embodiment, there does not exist an MCS table belonging to the first MCS table set and the second MCS table set at the same time.

In one embodiment, the first MCS table set comprises Table 5.1.3.1-1 in 3GPP TS38.214.

In one embodiment, the first MCS table set comprises Table 5.1.3.1-2 in 3GPP TS38.214.

In one embodiment, the second MCS table set comprises Table 5.1.3.1-3 in 3GPP TS38.214.

In one embodiment, an MCS table corresponding to the second radio signal is one of Table 5.1.3.1-1, Table 5.1.3.1-2 or Table 5.1.3.1-3 in 3GPP TS38.214.

In one embodiment, a higher-layer parameter mcs-Table indicates an MCS table corresponding to the second radio signal.

In one embodiment, a PDSCH-Config Information Element (IE) is used to indicate an MCS table corresponding to the second radio signal.

In one embodiment, an mcs-Table field in a PDSCH-Config IE is used to indicate an MCS table corresponding to the second radio signal.

In one embodiment, the specific meaning of the higher-layer parameter mcs-Table can be found in 3GPP TS38.214, section 6.1.4, and in 3GPP TS38.331.

In one embodiment, the specific meaning of the PDSCH-Config IE can be found in 3GPP TS38.331.

In one embodiment, the specific meaning of the mcs-Table field can be found in 3GPP TS38.331.

In one embodiment, when the first signaling is earlier than the second signaling in time domain, an MCS table corresponding to the first sub-signal is used to determine the target parameter group out of the first parameter group and the second parameter group.

In one embodiment, the first signaling is earlier than the second signaling in time domain; an MCS table corresponding to the first sub-signal belongs to a first MCS table set, the target parameter group is the first parameter group; when an MCS table corresponding to the first sub-signal belongs to a second MCS table set, the target parameter group is the second parameter group; the first MCS table set and the second MCS table set respectively comprise at least one table in Table 5.1.3.1-1, Table 5.1.3.1-2 and Table 5.1.3.1-3 in 3GPP TS38.214.

In one embodiment, the first signaling indicates an MCS table corresponding to the first sub-signal.

In one embodiment, an MCS table corresponding to the first sub-signal is one of Table 5.1.3.1-1, Table 5.1.3.1-2 or Table 5.1.3.1-3 in 3GPP TS38.214.

In one embodiment, a higher-layer parameter mcs-Table is used to determine an MCS table corresponding to the first sub-signal.

In one embodiment, a PUSCH-Config IE is used to indicate an MCS table corresponding to the first sub-signal.

In one embodiment, an mcs-Table field in a PUSCH-Config IE is used to indicate an MCS table corresponding to the first sub-signal.

In one embodiment, an mcs-TableTransformPrecoder field in a PUSCH-Config IE is used to indicate an MCS corresponding to the first sub-signal.

In one embodiment, a ConfiguredGrantConfig IE is used to indicate an MCS table corresponding to the first sub-signal.

In one embodiment, an mcs-Table field in a ConfiguredGrantConfig IE is used to indicate an MCS table corresponding to the first sub-signal.

In one embodiment, an mcs-TableTransformPrecoder field in a ConfiguredGrantConfig IE is used to indicate an MCS table corresponding to the first sub-signal.

In one embodiment, the specific meaning of the PUSCH-Config IE can be found in 3GPP TS38.331.

In one embodiment, the specific meaning of the ConfiguredGrantConfig IE can be found in 3GPP TS38.331.

In one embodiment, the specific meaning of the mcs-TableTransformPrecoder field can be found in 3GPP TS38.331.

In one embodiment, when the first signaling is earlier than the second signaling in time domain, an MCS table corresponding to the first sub-signal and an MCS table corresponding to the second radio signal are used together to determine the target parameter group out of the first parameter group and the second parameter group.

In one embodiment, the first signaling is earlier than the second signaling in time domain; when an MCS table corresponding to the first sub-signal and an MCS table corresponding to the second radio signal respectively belong to a same MCS table subset in M3 MCS table subsets, the target parameter group is the first parameter group; when an MCS table corresponding to the first sub-signal and an MCS table corresponding to the second radio signal respectively belong to different MCS table subsets in the M3 MCS table subsets, the target parameter group is the second parameter group; M3 is a positive integer greater than 1, and any of the M3 MCS table subsets comprises at least one table in Table 5.1.3.1-1, Table 5.1.3.1-2 and Table 5.1.3.1-3 in 3GPP TS38.214.

In one embodiment, the first signaling is earlier than the second signaling in time domain; when an MCS table corresponding to the first sub-signal and an MCS table corresponding to the second radio signal respectively belong to different MCS table subsets in M3 MCS table subsets, the target parameter group is the first parameter group; when an MCS table corresponding to the first sub-signal and an MCS table corresponding to the second radio signal belong to a same MCS table subset in the M3 MCS table subsets, the target parameter group is the second parameter group; M3 is a positive integer greater than 1, and any of the M3 MCS table subsets comprises at least one table in Table 5.1.3.1-1, Table 5.1.3.1-2 and Table 5.1.3.1-3 in 3GPP TS38.214.

In one embodiment, there does not exist a Table in Table 5.1.3.1-1, Table 5.1.3.1-2 and Table 5.1.3.1-3 in 3GPP TS38.214 belonging to different MCS table subsets in the M3 MCS table subsets at the same time.

In one embodiment, when the first signaling is earlier than the second signaling in time domain, a CQI Table corresponding to the second bit block is used to determine the target parameter group out of the first parameter group and the second parameter group.

In one embodiment, the first signaling is earlier than the second signaling in time domain; when a CQI table corresponding to the second bit block belongs to a first CQI table set, the target parameter group is the first parameter group; when a CQI table corresponding to the second bit block belongs to a second CQI table, the target parameter group is the second parameter group; the first CQI table set and the second CQI table set respectively comprise at least one Table in Table 5.2.2.1-2, Table 5.2.2.1-3 and Table 5.2.2.1-4 in 3GPP TS38.214.

In one subembodiment of the above embodiment, there does not exists a CQI table belonging to the first CQI table set and the second CQI table set at the same time.

In one subembodiment of the above embodiment, the first MCS table set comprises Table 5.2.2.1-2 in 3GPP TS38.214.

In one subembodiment of the above embodiment, the first MCS table set comprises Table 5.2.2.1-3 in 3GPP TS38.214.

In one subembodiment of the above embodiment, the first MCS table set comprises Table 5.2.2.1-4 in 3GPP TS38.214.

In one embodiment, the second bit block carries a first CQI, and a CQI Table corresponding the second bit block refers to a cqi-Table corresponding to the first CQI.

In one embodiment, the second bit block carries a first CSI, and a CQI Table corresponding the second bit block refers to a cqi-Table of a CSI-ReportConfig corresponding to the first CSI.

In one embodiment, a CQI Table corresponding to the second bit block is one of Table 5.2.2.1-2, Table 5.2.2.1-3 or Table 5.2.2.1-4 in 3GPP TS38.214.

In one embodiment, a higher-layer parameter cqi-Table is used to indicate a CQI Table corresponding to the second bit block.

In one embodiment, a CSI-ReportConfig IE is used to indicate a CQI table corresponding to the second radio signal.

In one embodiment, a cqi-Table field in a CSI-ReportConfig IE is used to indicate a CQI table corresponding to the second radio signal.

In one embodiment, the specific meaning of the CSI-ReportConfig IE can be found in 3GPP TS38.331.

In one embodiment, the specific meaning of the cqi-Table can be found in 3GPP TS38.331.

Embodiment 35

Figure 35:
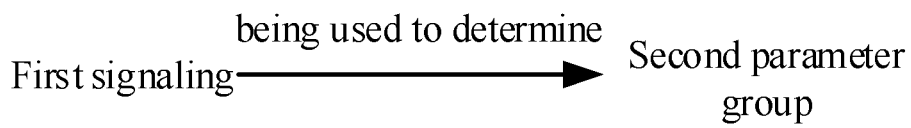
FIG. 35 illustrates a schematic diagram of a first signaling being used to determine a second parameter group according to one embodiment of the present disclosure.

Embodiment 35 illustrates a schematic diagram of a first signaling being used to determine a second parameter group according to one embodiment of the present disclosure, as shown in FIG. 35.

In one embodiment, the first signaling indicates the second parameter group.

In one embodiment, the first signaling explicitly indicates the second parameter group.

In one embodiment, the first signaling implicitly indicates the second parameter group.

In one embodiment, the second parameter group is one of K1 parameter groups, K1 being a positive integer greater than 1; the first signaling indicates the second parameter group in the K1 parameter groups.

In one embodiment, the second parameter group is one of the K parameter groups in the present disclosure, and the first signaling indicates the second parameter group out of the K parameter groups.

In one embodiment, a number of parameters comprised in the second parameter group is equal to a number of parameters comprised in the first parameter group in the present disclosure, and parameters comprised in the second parameter group respectively correspond to parameters comprised in the first parameter group; the first signaling indicates a difference between each parameter in the second parameter group and a parameter corresponding to the first parameter group.

In one embodiment, the second parameter group comprises the second offset, the first parameter group comprises the first offset, and the first signaling indicates a difference between the second offset and the first offset.

In one embodiment, the second parameter group comprises the second scaling coefficient, the first parameter group comprises the first scaling coefficient, and the first signaling indicates a difference between the second scaling coefficient and the first scaling coefficient.

Embodiment 36

Figure 36:
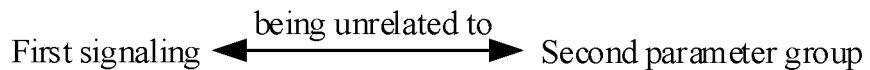
FIG. 36 illustrates a schematic diagram of a second parameter group being unrelated to a first signaling according to one embodiment of the present disclosure.

Embodiment 36 illustrates a schematic diagram of a second parameter group being unrelated to a first signaling according to one embodiment of the present disclosure, as shown in FIG. 36.

In one embodiment, the second parameter group is default.

In one embodiment, the second parameter group is fixed.

In one embodiment, the second parameter group is semi-statically configured.

In one embodiment, the second parameter group is configured by a higher-layer signaling.

In one embodiment, the second parameter group is configured by an RRC signaling.

In one embodiment, the second parameter group does not need to be configured by a physical-layer signaling.

In one embodiment, third information indicates the second parameter group, and the third information is configured by an RRC signaling.

In one subembodiment of the above embodiment, the third information comprises all or partial information in uci-OnPUSCH field.

In one subembodiment of the above embodiment, the third information comprises all or partial information in a uci-OnPUSCH field in a PUSCH-Config IE.

In one subembodiment of the above embodiment, the third information comprises all or partial information in a UCI-OnPUSCH.

In one subembodiment of the above embodiment, the third information comprises all or partial information in BetaOffsets.

In one embodiment, the second signaling in the present disclosure indicates the second parameter group.

In one embodiment, the second signaling in the present disclosure explicitly indicates the second parameter group.

In one embodiment, the second signaling in the present disclosure implicitly indicates the second parameter group.

In one embodiment, the second parameter group is one of K1 parameter groups, K1 being a positive integer greater than 1; the second signaling in the present disclosure indicates the second parameter group out of the K1 parameter groups.

In one embodiment, the second parameter group is one of the K parameter groups in the present disclosure, and the second signaling in the present disclosure indicates the second parameter group out of the K parameter groups.

Embodiment 37

Figure 37:
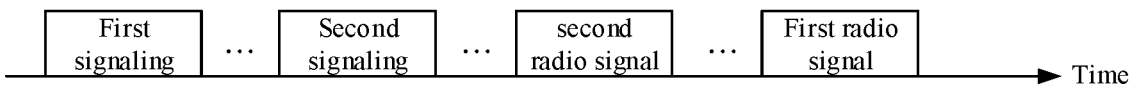
FIG. 37 illustrates a schematic diagram of a timing relation among a first signaling, a second signaling, a first radio signal and a second radio signal according to one embodiment of the present disclosure.

Embodiment 37 illustrates a schematic diagram of timing relations among a first signaling, a second signaling, a first radio signal and a second radio signal according to one embodiment of the present disclosure, as shown in FIG. 37. In Embodiment 37, the first signaling is not later than the second signaling in time domain, the second signaling is not later than the second radio signal in time domain, and the second radio signal is not later than the first radio signal in time domain.

In one embodiment, an end time of time-domain resources occupied by the first signaling is not later than a start time of time-domain resources occupied by the second signaling.

In one embodiment, an end time of time-domain resources occupied by the second signaling is not later than a start time of time-domain resources occupied by the second radio signal.

In one embodiment, an end time of time-domain resources occupied by the second radio signal is not later than a start time of time-domain resources occupied by the first radio signal.

In one embodiment, an end time of time-domain resources occupied by the first signaling is earlier than a start time of time-domain resources occupied by the second signaling.

In one embodiment, an end time of time-domain resources occupied by the second signaling is earlier than a start time of time-domain resources occupied by the second radio signal.

In one embodiment, an end time of time-domain resources occupied by the second radio signal is earlier than a start time of time-domain resources occupied by the first radio signal.

Embodiment 38

Figure 38:
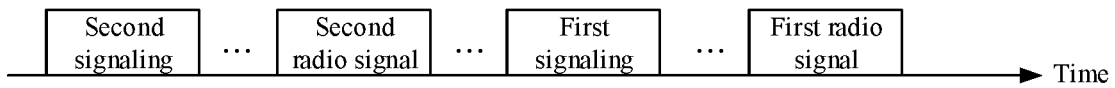
FIG. 38 illustrates a schematic diagram of a timing relation among a first signaling, a second signaling, a first radio signal and a second radio signal according to one embodiment of the present disclosure.

Embodiment 38 illustrates a schematic diagram of timing relations among a first signaling, a second signaling, a first radio signal and a second radio signal according to one embodiment of the present disclosure, as shown in FIG. 38. In Embodiment 38, the second signaling is not later than the second radio signal in time domain, the second radio signal is not later than the first signaling in time domain, and the first signaling is not later than the first radio signal.

In one embodiment, an end time of time-domain resources occupied by the second signaling is not later than a start time of time-domain resources occupied by the second radio signal.

In one embodiment, an end time of time-domain resources occupied by the second radio signal is not later than a start time of time-domain resources occupied by the first signaling.

In one embodiment, an end time of time-domain resources occupied by the first signaling is not later than a start time of time-domain resources occupied by the first radio signal.

In one embodiment, an end time of time-domain resources occupied by the second signaling is earlier than a start time of time-domain resources occupied by the second radio signal.

In one embodiment, an end time of time-domain resources occupied by the second radio signal is earlier than a start time of time-domain resources occupied by the first signaling.

In one embodiment, an end time of time-domain resources occupied by the first signaling is earlier than a start time of time-domain resources occupied by the first radio signal.

In one embodiment, an end time of time-domain resources occupied by the second signaling is not later than a start time of time-domain resources occupied by the first signaling.

In one embodiment, an end time of time-domain resources occupied by the second signaling is earlier than a start time of time-domain resources occupied by the first signaling.

Embodiment 39

Figure 39:
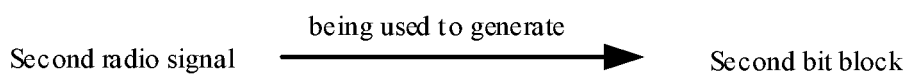
FIG. 39 illustrates a schematic diagram of a second radio signal being used to generate a second bit block according to one embodiment of the present disclosure.

Embodiment 39 illustrates a schematic diagram of a second radio signal being used to generate a second bit block according to one embodiment of the present disclosure, as shown in FIG. 39. In Embodiment 39, the second signaling in the present disclosure indicates scheduling information of the second radio signal, and the third bit block indicates whether the second radio signal is correctly received.

In one embodiment, the second signaling indicates time-frequency resources occupied by the second radio signal.

In one embodiment, the second signaling explicitly indicates time-frequency resources occupied by the second radio signal.

In one embodiment, the second signaling implicitly indicates time-frequency resources occupied by the second radio signal.

In one embodiment, scheduling information of the second radio signal comprises one or more of occupied time-domain resources, occupied frequency-domain resources, a scheduled MCS, configuration information of DMRS, an HARQ process number, an RV and an NDI.

In one embodiment, an end time of time-domain resources occupied by the second radio signal is earlier than a start time of the second radio resource block in the present disclosure.

In one embodiment, an end time of time-domain resources occupied by the second radio signal is earlier than a start time of the first radio resource block in the present disclosure.

In one embodiment, the second radio signal being used to generate the second bit block includes: the second bit block indicates whether the second radio signal is correctly received.

In one embodiment, the second radio signal being used to generate the second bit block includes: the second radio signal carries a third bit block, and the third bit block comprises a TB; the second bit block indicates whether the third bit block is correctly received.

In one embodiment, the second radio signal is transmitted on a downlink physical layer data channel (i.e., a downlink channel capable of bearing physical layer data).

In one embodiment, the second radio signal is transmitted on a PDSCH.

Embodiment 40

Figure 40:
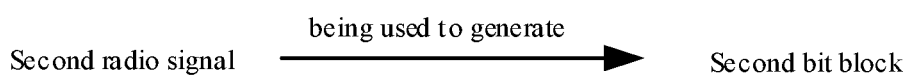
FIG. 40 illustrates a schematic diagram of a second radio signal being used to generate a second bit block according to one embodiment of the present disclosure.

Embodiment 40 illustrates a schematic diagram of a second radio signal being used to generate a second bit block according to one embodiment of the present disclosure, as shown in FIG. 40. In Embodiment 40, the second radio signal comprises a first downlink reference signal, and the second signaling in the present disclosure is used to determine configuration information of the first downlink reference signal. A measurement performed on the first downlink reference signal is used to determine the second bit block.

In one embodiment, the first downlink reference signal comprises a DMRS.

In one embodiment, the first downlink reference signal comprises a Channel-State Information Reference Signal (CSI-RS).

In one embodiment, configuration information of the first downlink reference signal comprises one or more of occupied time-domain resources, occupied frequency-domain resources, occupied code-domain resources, a RS sequence, a mapping mode, a DMRS type, a cyclic shift, a Orthogonal Cover Code (OCC), $w_f(k')$ and $w_t(l')$. The $w_f(k')$ and the $w_t(l')$ are spread spectrum sequences in frequency domain and time domain, and the specific meaning of the $w_f(k')$ and the $w_t(l')$ can be found in 3GPP TS38.211, section 7.4.1.

In one embodiment, a measurement performed on the first downlink reference signal is used to generate a first channel quality, and the second bit block carries the first channel quality.

In one subembodiment of the above embodiment, the first channel quality comprises a CQI.

In one subembodiment of the above embodiment, the first channel quality comprises a CRI.

In one subembodiment of the above embodiment, the first channel quality comprises a PMI.

In one subembodiment of the above embodiment, the first channel quality comprises an RSRP.

In one subembodiment of the above embodiment, the first channel quality comprises an RSRQ.

In one embodiment, the second signaling explicitly indicates configuration information of the first downlink reference signal.

In one embodiment, the second signaling implicitly indicates configuration information of the first downlink reference signal.

In one embodiment, the second signaling indicates an index of a reference signal resource corresponding to the first downlink reference signal.

In one embodiment, a reference signal resource corresponding to the first downlink reference signal comprises a CSI-RS resource.

In one embodiment, the second radio signal being used to generate the second bit block includes: a measurement performed on the second radio signal is used to determine the second bit block.

Embodiment 41

Figure 41:
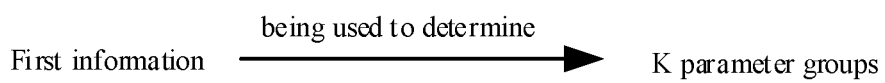
FIG. 41 illustrates a schematic diagram of first information being used to determine K parameter groups according to one embodiment of the present disclosure.

Embodiment 41 illustrates a schematic diagram of first information being used to determine K parameter groups according to one embodiment of the present disclosure, as shown in FIG. 41. In Embodiment 41, the first information is used to determine the K parameter groups; the first parameter group in the present disclosure is one of the K parameter groups.

In one embodiment, the first information is carried by a higher-layer signaling.

In one embodiment, the first information is carried by an RRC signaling.

In one embodiment, the first information is carried by a MAC CE signaling.

In one embodiment, the first information comprises all or partial information in a uci-OnPUSCH field.

In one embodiment, the first information comprises all or partial information in a uci-OnPUSCH field in a PUSCH-Config IE.

In one embodiment, the first information comprises all or partial information in a uci-OnPUSCH field in a ConfiguredGrantConfig IE.

In one embodiment, the first information comprises all or partial information of a UCI-OnPUSCH.

In one embodiment, the first information comprises all or partial information in a CG-UCI-OnPUSCH.

In one embodiment, the first information comprises all or partial information in BetaOffsets.

In one embodiment, the specific meaning of the uci-OnPUSCH field can be found in 3GPP TS38.331.

In one embodiment, the specific meaning of the uci-OnPUSCH can be found in 3GPP TS38.331.

In one embodiment, the specific meaning of the CG-UCI-OnPUSCH can be found in 3GPP TS38.331.

In one embodiment, the specific meaning of the BetaOffsets can be found in 3GPP TS38.331.

In one embodiment, the first information indicates the K parameter groups.

In one embodiment, the first information explicitly indicates the K parameter groups.

In one embodiment, the first information implicitly indicates the K parameter groups.

In one embodiment, the K is equal to 4.

In one embodiment, the K is greater than 4.

In one embodiment, any of the K parameter groups comprises at least one parameter.

In one embodiment, at least one parameter comprised in any of the K parameter groups comprises one or more of $\beta_{offset}^{HARQ-ACK}$, $\beta_{offset}^{CSI-1}$, $\beta_{offset}^{CSI-2}$, and $\alpha$.

In one embodiment, numbers of parameters comprised in any two of the K parameter groups are the same.

In one embodiment, numbers of parameters comprised in any two of the K parameter groups are the same, and parameters comprised in any two of the K parameter groups respectively correspond to each other. There exist a first reference parameter group and a second reference parameter group in the K parameter groups, and there exists a parameter in the first reference parameter group being not equal to a parameter corresponding to the second reference parameter group.

In one embodiment, the first signaling indicates an index of the first parameter group in the K parameter groups.

In one embodiment, the first information indicates the K candidate parameter groups, and any of the K candidate parameter groups comprises at least one parameter. The K candidate parameter groups respectively correspond to the K parameter groups. For any of the K parameter groups, and the given parameter group is a subset of a given candidate parameter group; the given candidate parameter group is one of the K candidate parameter groups corresponding to the given parameter group.

In one subembodiment of the above embodiment, a number of parameters comprised in the given parameter group is less than a number of parameters comprised in the given candidate parameter group.

In one subembodiment of the above embodiment, a number of bits comprised in the second bit block in the present disclosure is used to determine the given parameter group out of the given candidate parameter groups.

In one subembodiment of the above embodiment, the given parameter group comprises L1 parameters, L1 being a positive integer greater than 1; all parameters in the given candidate parameter group are divided into L1 parameter pools, any of the L1 parameter pools comprises at least one parameter in the given candidate parameter group, and there does not exist a parameter in the given candidate parameter group belonging to two of the L1 parameter pools at the same time. The L1 parameters respectively correspond to the L1 parameter pools, and any of the L1 parameters is one parameter in a corresponding parameter pool. A number of bits comprised in the second bit block in the present disclosure is used to determine a corresponding parameter in the L1 parameters out of at least one of the L1 parameter pools.

In one embodiment, the second parameter group in the present disclosure is one of the K parameter groups.

In one embodiment, the UE in the present disclosure receives second information, the second information indicates K1 parameter groups, and the second parameter group is one of the K1 parameter groups.

In one subembodiment of the above embodiment, the second information is carried by a higher-layer signaling.

In one subembodiment of the above embodiment, the second information is carried by an RRC signaling.

In one embodiment, the second information is carried by a MAC CE signaling.

In one subembodiment of the above embodiment, the second information and the first information are carried by different signalings.

In one subembodiment of the above embodiment, the second information and the first information are carried by a same signaling.

In one subembodiment of the above embodiment, the second information comprises all or partial information in a uci-OnPUSCH field.

In one subembodiment of the above embodiment, the second information comprises all or partial information in a uci-OnPUSCH field in a PUSCH-Config IE.

In one subembodiment of the above embodiment, the second information comprises all or partial information in a uci-OnPUSCH field in a ConfiguredGrantConfig IE.

In one subembodiment of the above embodiment, the second information comprises all or partial information in a UCI-OnPUSCH.

In one subembodiment of the above embodiment, the second information comprises all or partial information in a CG-UCI-OnPUSCH.

In one subembodiment of the above embodiment, the second information comprises all or partial information in BetaOffsets.

Embodiment 42

Figure 42:
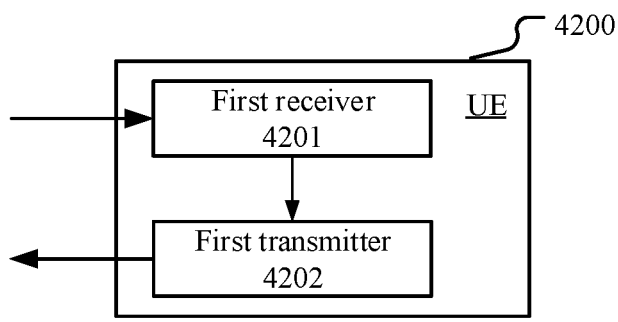
FIG. 42 illustrates a structural block diagram of a processing device in a UE according to one embodiment of the present disclosure.

Embodiment 42 illustrates a structural block diagram of a processing device of a UE according to one embodiment of the present disclosure, as shown in FIG. 42. In FIG. 12, a processing device 4200 in a UE comprises a first receiver 4201 and a first transmitter 4202.

In Embodiment 42, the first receiver 4201 receives a first signaling and a second signaling; and the first transmitter 4202 transmits a first radio signal in a first radio resource block.

In Embodiment 42, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the target parameter group comprises a target scaling coefficient; a number of REs occupied by the second sub-signal in the first radio resource block is not greater than a product of a number of REs comprised in the first radio resource block and the target scaling coefficient.

In one embodiment, the target parameter group comprises a target offset; a first-type value is used to determine a number of REs occupied by the second sub-signal in the first radio resource block, and the first-type value is related to the target offset.

In one embodiment, when the first signaling is not earlier than the second signaling in time domain, the target parameter group is the first parameter group.

In one embodiment, when the first signaling is earlier than the second signaling in time domain, the target parameter group is the second parameter group.

In one embodiment, wherein when the first signaling is earlier than the second signaling in time domain, only the first signaling in the first signaling and the second signaling is used to determine the target parameter group out of the first parameter group and the second parameter group.

In one embodiment, wherein when the first signaling is earlier than the second signaling in time domain, only the second signaling in the first signaling and the second signaling is used to determine the target parameter group out of the first parameter group and the second parameter group.

In one embodiment, when the first signaling is earlier than the second signaling in time domain, the first signaling and the second signaling are used to determine the target parameter group out of the first parameter group and the second parameter group.

In one embodiment, the first signaling is used to determine the second parameter group.

In one embodiment, the second parameter group is unrelated to the first signaling.

In one embodiment, the first receiver 4201 receives a second radio signal; herein, the second signaling is used to determine time-frequency resources occupied by the second radio signal, and the second radio signal is used to generate the second bit block.

In one embodiment, the first receiver 4201 receives first information; herein, the first information is used to determine K parameter groups, K being a positive integer greater than 1; the first parameter group is one of the K parameter groups; the first signaling indicates the first parameter group out of the K parameter groups.

In one embodiment, the first receiver 4201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 4202 comprises at least one of the antenna 452, the transmitter 454, the transmitting processor 468, the multi-antenna transmitting processor 457, the controller/processor 459, the memory 460, or the data source 467 in Embodiment 4.

Embodiment 43

Figure 43:
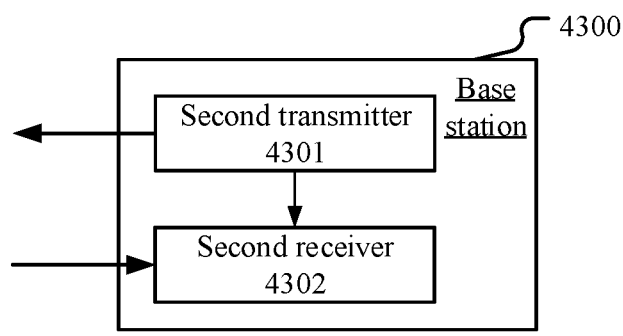
FIG. 43 illustrates a structural block diagram of a processing device in a base station according to one embodiment of the present disclosure.

Embodiment 43 illustrates a structural block diagram of a processing device of a base station according to one embodiment of the present disclosure, as shown in FIG. 43. In FIG. 43, a processing device 4300 in a base station comprises a second transmitter 4301 and a second received 4302.

In Embodiment 43, the second transmitter 4301 transmits a first signaling and a second signaling; and the second receiver receives a first radio signal in a first radio resource block.

In Embodiment 43, the first signaling is used to determine the first radio resource block and a size of a first bit block, and the second signaling is used to determine a second radio resource block and a second bit block; the first radio resource block is not orthogonal to the second radio resource block in time domain; the first radio signal comprises at least the second sub-signal in a first sub-signal and a second sub-signal, the first sub-signal carries the first bit block, and the second sub-signal carries the second bit block; the first signaling is used to determine a first parameter group, a target parameter group is used to determine a number of REs occupied by the second sub-signal in the first radio resource block, and the target parameter group is one of the first parameter group or a second parameter group; a timing relation between the first signaling and the second signaling is used to determine the target parameter group.

In one embodiment, the target parameter group comprises a target scaling coefficient; a number of REs occupied by the second sub-signal in the first radio resource block is not greater than a product of a number of REs comprised in the first radio resource block and the target scaling coefficient.

In one embodiment, the target parameter group comprises a target offset; a first-type value is used to determine a number of REs occupied by the second sub-signal in the first radio resource block, and the first-type value is related to the target offset.

In one embodiment, when the first signaling is not earlier than the second signaling in time domain, the target parameter group is the first parameter group.

In one embodiment, when the first signaling is earlier than the second signaling in time domain, the target parameter group is the second parameter group.

In one embodiment, wherein when the first signaling is earlier than the second signaling in time domain, only the first signaling in the first signaling and the second signaling is used to determine the target parameter group out of the first parameter group and the second parameter group.

In one embodiment, wherein when the first signaling is earlier than the second signaling in time domain, only the first signaling in the first signaling and the second signaling is used to determine the target parameter group out of the first parameter group and the second parameter group.

In one embodiment, when the first signaling is earlier than the second signaling in time domain, the first signaling and the second signaling are used to determine the target parameter group out of the first parameter group and the second parameter group.

In one embodiment, the first signaling is used to determine the second parameter group.

In one embodiment, the second parameter group is unrelated to the first signaling.

In one embodiment, the second transmitter 4301 transmits a second radio signal; herein, the second signaling is used to determine time-frequency resources occupied by the second radio signal, and the second radio signal is used to generate the second bit block.

In one embodiment, the second transmitter 4301 transmits first information; herein, the first information is used to determine K parameter groups, K being a positive integer greater than 1; the first parameter group is one of the K parameter groups; the first signaling indicates the first parameter group out of the K parameter groups.

In one embodiment, the second transmitter 4301 comprises at least one of the antenna 420, the transmitter 418, the transmitting processor 416, the multi-antenna transmitting processor 471, the controller/processor 475, or the memory 476 in Embodiment 4.

In one embodiment, the second receiver 4302 comprises at least one of the antenna 420, the receiver 418, the receiving processor 470, the multi-antenna receiving processor 472, the controller/processor 475, the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, a second signaling and a third radio signal, the first signaling and the second signaling respectively comprising first configuration information and second configuration information, and the first configuration information and the second configuration information being respectively for a first channel and a second channel; and
a first transmitter, transmitting a first radio signal on the first channel;
wherein the first radio signal comprises a first sub-signal and a second sub-signal; a first bit block is used to generate the first sub-signal, and a second bit block is used to generate the second sub-signal; the second bit block carries Uplink Control Information (UCI) and the third radio signal is used to generate the second bit block; a number of Resource Elements (REs) occupied by each bit in the first bit block averagely is related to the first configuration information; and a number of REs occupied by each bit in the second bit block averagely is related to the second configuration information.

2. The first node according to claim 1, wherein the first transmitter drops transmitting on the second channel, or, the first transmitter transmits a second radio signal on the second channel; wherein a third bit block is used to generate the second radio signal, and the third bit block is unrelated to the first bit block.

3. The first node according to claim 1, wherein the first receiver receives a third signaling; wherein the third signaling is used to determine time-frequency resources occupied by the third radio signal.

4. The first node according to claim 3, wherein the second signaling is associated with the third signaling.

5. The first node according to claim 1, wherein the second signaling is used to determine time-frequency resources occupied by the third radio signal.

6. The first node according to claim 1, wherein a first-type value and a first offset are used to determine a number of REs occupied by the second sub-signal; and the first-type value is related to the second configuration information.

7. A second node for wireless communications, comprising:

a second transmitter, transmitting a first signaling, a second signaling and a third radio signal, the first signaling and the second signaling respectively comprising first configuration information and second configuration information, and the first configuration information and the second configuration information being respectively for a first channel and a second channel; and a second receiver, receiving a first radio signal on the first channel;

wherein the first radio signal comprises a first sub-signal and a second sub-signal; a first bit block is used to generate the first sub-signal, and a second bit block is used to generate the second sub-signal; the second bit block carries Uplink Control Information (UCI) and the third radio signal is used to generate the second bit block; a number of REs occupied by each bit in the first bit block averagely is related to the first configuration information; and a number of REs occupied by each bit in the second bit block averagely is related to the second configuration information.

8. The second node according to claim 7, wherein the second receiver drops receiving on the second channel, or, the second receiver receives a second radio signal on the second channel; wherein a third bit block is used to generate the second radio signal, and the third bit block is unrelated to the first bit block.

9. The second node according to claim 7, wherein the second transmitter transmits a third signaling; wherein the third signaling is used to determine time-frequency resources occupied by the third radio signal.

10. The second node according to claim 9, wherein the second signaling is associated with the third signaling.

11. The second node according to claim 7, wherein the second signaling is used to determine time-frequency resources occupied by the third radio signal.

12. The second node according to claim 7, wherein a first-type value and a first offset are used to determine a number of REs occupied by the second sub-signal; and the first-type value is related to the second configuration information.

13. A method in a first node for wireless communications, comprising:

receiving a first signaling, a second signaling and a third radio signal, the first signaling and the second signaling respectively comprising first configuration information and second configuration information, and the first configuration information and the second configuration information being respectively for a first channel and a second channel; and transmitting a first radio signal on the first channel;

wherein the first radio signal comprises a first sub-signal and a second sub-signal; a first bit block is used to generate the first sub-signal, and a second bit block is used to generate the second sub-signal; the second bit block carries Uplink Control Information (UCI) and the third radio signal is used to generate the second bit block; a number of REs occupied by each bit in the first bit block averagely is related to the first configuration information; and a number of REs occupied by each bit in the second bit block averagely is related to the second configuration information.

14. The method according to claim 13, comprising:

dropping transmitting on the second channel, or transmitting a second radio signal on the second channel;

wherein a third bit block is used to generate the second radio signal, and the third bit block is unrelated to the first bit block.

15. The method according to claim 13, comprising:

receiving a third signaling, wherein the third signaling is used to determine time-frequency resources occupied by the third radio signal.

16. The method according to claim 15, wherein the second signaling is associated with the third signaling.

17. The method according to claim 13, wherein the second signaling is used to determine time-frequency resources occupied by the third radio signal.

18. The method according to claim 13, wherein a first-type value and a first offset are used to determine a number of REs occupied by the second sub-signal; and the first-type value is related to the second configuration information.

* * * * *